United States Patent
Ohzeki et al.

(10) Patent No.: US 8,419,164 B2
(45) Date of Patent: *Apr. 16, 2013

(54) IMAGE FORMING METHOD AND INK COMPOSITION

(75) Inventors: Tomoyuki Ohzeki, Kanagawa (JP); Jun Matsumoto, Kanagawa (JP); Masao Ikoshi, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 261 days.

This patent is subject to a terminal disclaimer.

(21) Appl. No.: 12/881,212

(22) Filed: Sep. 14, 2010

(65) Prior Publication Data

US 2011/0069117 A1     Mar. 24, 2011

(30) Foreign Application Priority Data

Sep. 18, 2009   (JP) .................... 2009-218011

(51) Int. Cl.
*B41J 2/14*     (2006.01)
(52) U.S. Cl.
USPC ............................................ 347/47
(58) Field of Classification Search .......... 347/40–43, 347/47; 427/466
See application file for complete search history.

(56) References Cited

U.S. PATENT DOCUMENTS

2011/0069116 A1   3/2011 Ohzeki et al.

FOREIGN PATENT DOCUMENTS

| JP | 9-227812 A    | 9/1997  |
|----|---------------|---------|
| JP | 9-286941 A    | 11/1997 |
| JP | 2001-329199 A | 11/2001 |
| JP | 2002206063 A  | 7/2002  |
| JP | 2003-165936 A | 6/2003  |
| JP | 3550637 B2    | 8/2004  |
| JP | 2004244620 A  | 9/2004  |
| JP | 2005239974 A  | 9/2005  |
| JP | 2007238743 A  | 9/2007  |
| JP | 2008266564 A  | 11/2008 |

*Primary Examiner* — Lamson Nguyen
(74) *Attorney, Agent, or Firm* — SOLARIS Intellectual Property Group, PLLC

(57) ABSTRACT

The present invention provides an image forming method and an ink composition whereby deterioration of a head plate, which is formed of silicon, is suppressed, and an image with higher precision is formed stably, the ink composition including an inorganic silicate compound and being ejected to form an image from an ink-jet head having a nozzle plate where a $C_8F_{17}C_2H_4SiCl_3$ film (fluorocarbon film) is provided on the surface thereof at a side toward the ink ejection direction of a nozzle.

13 Claims, 8 Drawing Sheets

IMAGE FORMING METHOD AND INK COMPOSITION

CROSS-REFERENCE TO RELATED APPLICATION

This application claims priority under 35 USC 119 from Japanese Patent Application No. 2009-218011 filed on Sep. 18, 2009, the disclosure of which is incorporated by reference herein.

BACKGROUND OF THE INVENTION

1. Field of Invention

The present invention relates to an image forming method in which an image is formed by discharging an ink composition, and an ink composition used for the same.

2. Description of the Related Art

In recent years, as a result of ever-increasing demand for the protection of resources, protection of the environment, enhancement of operational stability and the like, the conversion of inks into aqueous products has continued to proceed. The product qualities demanded from aqueous inks include fluidity, storage stability, glossiness of film, clarity, coloring ability and the like, as in the case of oil-based inks.

Since most pigments have significantly deteriorated aptitude such as pigment dispersibility with respect to an aqueous vehicle in comparison with the case of an oil-based vehicle, sufficient quality cannot be obtained by conventional dispersion methods. The use of various additives such as, for example, an aqueous pigment dispersion resin or a surfactant has been studied heretofore. However, an aqueous ink comparable to an oil-based ink which has existing high quality and sufficient aptitude such as pigment dispersibility has not been obtained.

With respect to these circumstances, for example, there is disclosed an aqueous ink composition which contains polymer particles and a colorant having a water-insoluble polymer coated thereon as a color material (for example, see Japanese Patent Application Laid-Open (JP-A) No. 2001-329199). Further, an aqueous inkjet recording liquid containing a pigment and colloidal silica, an ink composition containing a resin emulsion and an inorganic oxide colloid, and the like are disclosed (for example, see JP-A No. 9-227812, JP-A No. 9-286941, and Japanese Patent No. 3550637), and a good image can be formed by including colloidal silica or the like from the viewpoint of abrasion resistance, color unevenness, clarity, and the like.

On the other hand, an inkjet recording method is also disclosed (for example, see JP-A No. 9-286941), in which an ink composition is ejected from a recording head having a plating layer containing a fluorine-based polymer on the surface of a nozzle plate. Further, there is disclosed an aqueous ink composition which prevents the elution of glass, silicon, silicon oxide, or the like in contact with an ink, by using the zeta potential of the ink and the zeta potential between a member and a color material (for example, see JP-A No. 2003-165936).

SUMMARY OF THE INVENTION

According to an aspect of the invention, an image forming method and an ink composition whereby deterioration of a head plate, which is formed of silicon, is suppressed, and an image with higher precision is formed stably, and wherein the ink composition includes an inorganic silicate compound and is ejected to form an image from an inkjet head having a nozzle plate where a $C_8F_{17}C_2H_4SiCl_3$ film (fluorocarbon film) is provided on the surface thereof at a side toward the ink ejection direction of a nozzle, are provided.

BRIEF DESCRIPTION OF DRAWINGS

Exemplary embodiments of the present invention will be described in detail based on the following figures, wherein.

DETAILED DESCRIPTION

Figure 1:
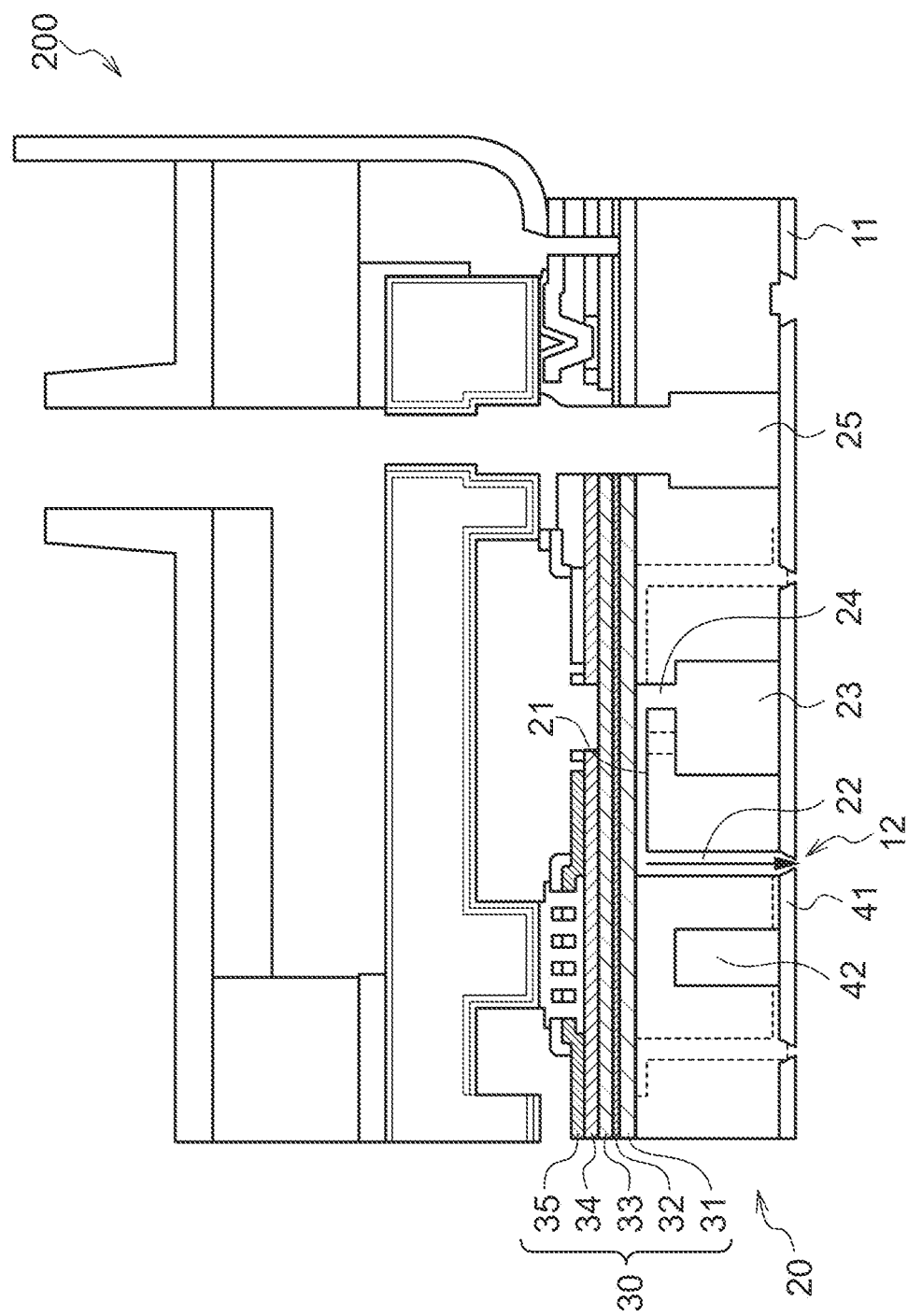
FIG. 1 is a schematic cross-sectional drawing showing one example of inner structure of inkjet head.

Among the conventional art described above, abrasion resistance of a formed image is improved in an aqueous ink composition containing polymer particles, but it is difficult to say that the composition is sufficient from the viewpoint of an ejection property. Further, when an inorganic oxide colloid is added in order to improve the image as in JP-A No. 9-286941 and when the added amount of the inorganic oxide colloid is too much, the ink ejection property from the inkjet head may be affected undesirably and the image quality may be damaged thereby.

On the other hand, when an inkjet head contacts with an ink, it is known that the ink tends to have an effect of causing the deterioration of a nozzle plate which constitutes a head and a decrease in the liquid repellent property of a liquid repellent film. However, a technique for forming higher quality image in which image forming properties such as the ejection property are not damaged, and the liquid repellent property is also improved has not yet been successfully provided.

The invention has been made in view of the above circumstances, and an object thereof is to provide an ink composition and an image forming method whereby decrease in the liquid repellent property of an inkjet head member is suppressed, and a more highly precise image can be formed stably. An aim of the invention is to achieve this object.

According to an aspect of the invention, when a nozzle plate of an inkjet head is formed of silicon, if a predetermined amount of an inorganic silicate compound is contained in the ink composition, there is an effect of preventing decrease in the liquid repellent property of the liquid repellent film, in response to these circumstances by which the liquid repellent property of a liquid repellent film is reduced due to the influence of the contact with the ink. In particular, it has been found that the effect is prominent in the case of using a structure where plural nozzles (ejection ports) are arranged two-dimensionally and a large amount of ink flows in the nozzles such that a highly precise image of, for example, 1200 dpi, or the like is obtained. The invention has been accomplished on the basis of this knowledge. Further, there is no case in which the ejection property is damaged during ink ejection.

Exemplary embodiments according to the aspect of the invention include, but are not limited to the following items <1> to <18>.

<1> An image forming method including ejecting an ink composition including an inorganic silicate compound from an inkjet head having a nozzle plate to form an image, the nozzle plate including a liquid repellent film in at least a part, and the liquid repellent film including a fluoroalkylsilane moiety.

<2> The image forming method according to the item <1>, wherein the liquid repellent film including a fluoroalkylsilane moiety is formed by using a compound represented by the following Formula (1):

$$C_nF_{2n+1}-C_mH_{2m}-Si-X_3 \quad \text{Formula (1)}$$

wherein, in Formula (1), n represents an integer of 1 or more; m represents an integer of 0 or more; X represents an alkoxy group, an amino group, or a halogen atom; and a part of X may be substituted with an alkyl group.

<3> The image forming method according to the item <1> or the item <2>, wherein the liquid repellent film is formed by chemical vapor deposition.

<4> The image forming method according to any one of the items <1> to <3>, wherein a content of the inorganic silicate compound in the ink composition is in a range of from 0.0005% by mass to 0.5% by mass with respect to a total mass of the ink composition.

<5> The image forming method according to any one of the items <1> to <4>, wherein at least a part of the nozzle plate includes silicon.

<6> The image forming method according to any one of the items <1> to <5>, wherein the nozzle plate further includes a film which includes at least one selected from the group consisting of a metal oxide, a metal nitride and a metal other than silicon.

<7> The image forming method according to any one of the items <1> to <6>, wherein at least a part of the nozzle plate is provided with a film which includes $SiO_2$ or tantalum oxide.

<8> The image forming method according to any one of the items <1> to <7>, wherein the nozzle plate has plural ejection ports which eject the ink composition, the inkjet head further includes plural pressure chambers respectively communicating with the plural ejection ports of the nozzle plate, plural ink supply flow paths respectively supplying the ink composition to the plural pressure chambers, a common liquid chamber supplying the ink composition to the plural ink supply flow paths, and plural pressure generation units respectively deforming the plural pressure chambers, and an amount of change in volume within each pressure chamber is controlled by driving the respective pressure generation unit to eject the ink composition.

<9> The image forming method according to the item <8>, wherein the pressure generation units are piezo elements.

<10> The image forming method according to the item <8> or the item <9>, wherein the plural ejection ports are arranged two-dimensionally in a matrix form.

<11> The image forming method according to the item <10>, wherein the inkjet head forms an image at a drawing resolution of 1200 dpi or higher with a single pulse ejection from the nozzle plate.

<12> The image forming method according to any one of the items <8> to <11>, wherein the inkjet head further includes electrical wiring which is arranged so as to penetrate the common liquid chamber and supplies driving signals to the pressure generation units.

<13> The image forming method according to the item <12>, wherein the pressure generation units are disposed on the opposite side of the pressure chamber from a side thereof where the nozzle plate is arranged, and the common liquid chamber is disposed on the opposite side of the pressure generation units from a side thereof where the pressure chambers are arranged.

<14> The image forming method according to any one of the items <1> to <13>, wherein the ink composition further includes a pigment, a water-soluble organic solvent, and resin particles.

<15> The image forming method according to any one of the items <1> to <14>, wherein a pH of the ink composition is in a range of from 7.5 to 10.0 at a temperature of 25° C.

<16> The image forming method according to the item <14> or the item <15>, wherein the resin particles are self-dispersing polymer particles.

<17> The image forming method according to any one of the items <1> to <16>, wherein the inorganic silicate compound is colloidal silica.

<18> An ink composition including an inorganic silicate compound and being used for the image forming method according to any one of the items <1> to <17>.

An image forming method of the exemplary embodiment of the invention is described in detail below, and an ink composition is also described in detail through the description.

An image forming method of the exemplary embodiment of the invention is constituted to include a process (hereinafter, refer to "ink ejection process") wherein the ink composition containing an inorganic silicate compound is ejected from the ink-jet head having the nozzle plate where the liquid repellent film is provided in at least a part to form an image, and can be constituted to provide another process, if necessary. The exemplary embodiment of the invention further preferably has a process (hereinafter, "treatment liquid applying process") which applies a treatment liquid to be able to form an aggregate upon contact with the ink composition on a recording medium.

In the exemplary embodiment of the invention, the ink composition is constituted by containing the inorganic silicate compound, which contacts with the nozzle plate where the liquid repellent film consisting of a film containing fluoroalkylsilane is provided in at least a part of the inkjet head, and thereby the liquid repellent property of the liquid repellent film is prevented from being reduced while having a good ejection property.

Therefore, an occurrence of the ejection defect due to changing the size of the ink droplet, the ejection rate or the ejection direction during ejection, or the like is suppressed, and thereby a high quality image can be formed stably. The effect of suppressing the occurrence of the ejection defect becomes prominent when a part of nozzle plate is formed of silicon. That is to say, when a part of nozzle plate is formed of silicon ink is penetrated in through, for example, a pinhole from the liquid repellent film, silicon which is located at the lower layer is eroded to easily cause deterioration. However, in exemplary embodiments of the invention, a high quality image can be formed stably due to suppressing the deterioration.

[Ink Ejection Process]

The ink ejection process uses an inkjet head which has a nozzle plate provided with a liquid repellent film including a fluoroalkylsilane moiety in at least one part thereof and an ink composition (hereinafter, simply referred to "ink") including an inorganic silicate compound (a content thereof in the ink composition is preferably in a range of from 0.0005% by mass to 0.5% by mass with respect to a total mass of the ink composition) is ejected to form an image. In this process, the ink composition can be provided selectively on the recording medium and can form a desirable visible image.

Image recording utilizing the inkjet method can be performed, specifically, by supplying energy thereby ejecting a liquid composition to a desired recording medium, that is, plain paper, resin-coated paper, paper used exclusively for inkjet recording described, for example, in JP-A Nos. 8-169172, 8-27693, 2-276670, 7-276789, 9-323475, 62-238783, 10-153989, 10-217473, 10-235995, 10-337947, and 10-217597, films, common use paper for electrophotography, clothes, glass, metals, ceramics, etc. As the inkjet recording method suitable to the exemplary embodiment of the invention, a method described in JP-A No. 2003-306623, in columns (0093) to (0105) may be applicable.

The inkjet method is not particularly limited and may be of any known system, for example, a charge control system of ejecting an ink utilizing an electrostatic attraction force, a drop on demand system of utilizing a vibration pressure of a piezo element (pressure pulse system), an acoustic inkjet system of converting electric signals into acoustic beams, irradiating them to an ink, and ejecting the ink utilizing a radiation pressure, and a thermal inkjet system of heating an ink to form bubbles and utilizing the resultant pressure (BUBBLEJET (registered trade mark)). Examples of the inkjet method include a system of injecting a number of ink droplets of low concentration, a so-called "photo-ink" each in a small volume, a system of improving an image quality using plural inks of a substantially identical hue and of different concentrations, and a system of using a colorless transparent ink.

In the exemplary embodiments of the invention, there is preferred a method where a pressure generation unit (for example, piezo element) using the pressure pulse method is used, the pressure generation unit is driven to control an amount of change in volume within each pressure chamber and thereby the droplet diameter of the ink composition to be ejected from the nozzle is changed to eject the ink composition from the nozzle; and a method where the pressure generation unit is driven many times, to thereby control the number of droplets ejected from the nozzle, and plural droplets are combined before landing. In this case, it is more important to suppress erosion of the silicon portion of the nozzle plate due to ink. A multiple tone image can be stably recorded with the ink composition of the exemplary embodiment of the invention.

The inkjet head used in the inkjet method may be either an on-demand system or a continuous system. The ejection system includes, specifically, for example, an electric-mechanical conversion system (for example, single cavity type, double cavity type, bender type, piston type, share mode type, and shared wall type, etc.), an electric-thermal conversion system (for example, thermal inkjet type, BUBBLEJET (registered trade mark) type, etc.), an electrostatic attraction system (for example, electric field control type, and slit jet type, etc.), and an electric ejecting system (for example, spark jet type, etc.) and any of the ejection systems may be used.

Ink nozzles, etc. used for recording by the inkjet method are not particularly limited but can be selected properly depending on the purpose.

As an inkjet head, there are a shuttle type where a short serial head is used to record while scanning the head in the width direction of the recording medium and a line head type (single-pass type) where a recording device is arranged in correspondence with the entire area of one side of the recording medium and the line head is used. The single-pass type forms an image on the whole face of a recording medium due to an operation where a full line head and the recording medium are relatively moved once, using the full line head which covers the whole area of the recording medium. For example, the single-pass type is described in JP-A Nos. 2005-96443, and 2005-280346. That is to say, the single-pass type can perform image recording on the whole face of the recording medium by scanning the recording medium in the direction orthogonal to the device arrangement direction of the full line head, and a transferring system such as a carriage which scans the short head is not necessary. Further, since a complicated scanning control of the movement of the carriage and the recording medium is not necessary and only the recording medium is moved, a high recording rate can be realized in comparison with the shuttle type. The image forming method according to exemplary embodiments of the invention can be applied to all these types; however, when the method is generally applied to the single-pass type, a high precise nozzle arrangement and high ejection frequency are required, and therefore suppression of erosion due to ink is more important. There is a large effect on the improvement of ejection precision due to ink composition of the exemplary embodiment of the invention and prevention of erosion due to contact of the ink with the nozzle plate.

Furthermore, in the ink discharging (ejecting) step according to the exemplary embodiment of the invention, when a line method is employed, recording can be suitably performed not only using one type of the ink composition, but also using two or more types of ink compositions, by setting the ejection (droplet ejection) interval between the first ejected ink composition (n-th color (n≧1), for example, the second color) and the subsequently ejected ink composition ((n+1)-th color, for example, the third color), at 1 second or less. According to the exemplary embodiment of the invention, by setting the ejection interval at 1 second or less in the line method, an image having excellent abrasion resistance and suppressed occurrence of blocking can be obtained under high speed recording that is faster than that conventionally obtained, while preventing the spreading caused by the interference between ink droplets or mixed colors. Further, an image having excellent hue and drawing property (reproducibility of fine lines or fine parts in an image) can be obtained.

The volume of a droplet to be ejected from the inkjet head is preferably 0.5 to 12 pL (picoliter) from the viewpoint of obtaining a high precise image. Further, a method where plural ink droplet volumes are combined to form an image is preferred with respect to correction of unevenness or stripes during formation of a highlight image. In this case, the volume of the small droplets forming the highlight image is preferably 0.5 to 4 pL, the volume of the medium droplets to be mainly used is preferably 2 to 8 pL, and the volume of the large droplets to be used in the correction of unevenness or stripe is preferably 6 to 12 pL.

(InkJet Head Having Silicone Nozzle Plate)

The inkjet head employed in the image forming method has a nozzle plate. At least a part of the nozzle plate contains silicone. FIG. 1 is a schematic diagram showing one example of an internal structure of the inkjet head.

FIG. 1 shows an inkjet head 200 having a nozzle plate 11 and an ink supplying unit 20 which is provided on a opposite side from the ink ejecting direction of the nozzle plate. The nozzle plate 11 has plural ejection openings 12 through which inks are ejected.

Figure 2:
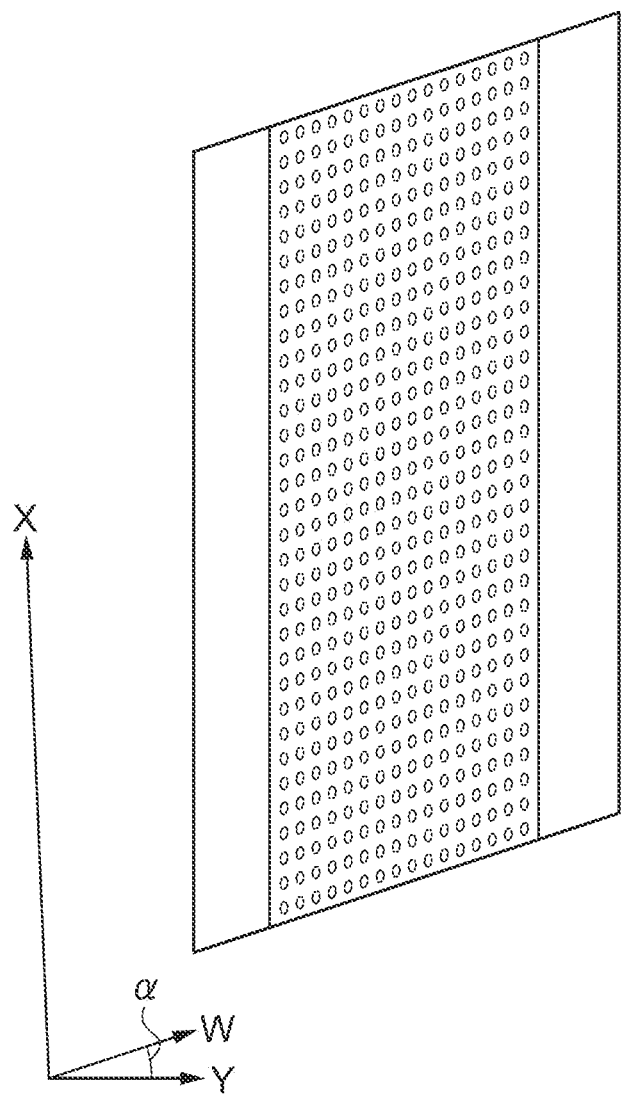
FIG. 2 is a schematic drawing showing one example of the ejection port arrangement of the nozzle plate.

As typically shown in FIG. 2, the ejector ports (nozzles) (32×64) are arranged two-dimensionally in the nozzle plate 11. The nozzle plate is formed in part or on entirely of silicon. A structure may be used where silicon is exposed within a nozzle port and on the surface of the ink discharging direction side, which are preferably coated (or provided) with a film which contains at least one kind selected from the group consisting of metal (including silicon) oxide and nitride, and a metal (other than silicon).

Further, a deposited film (a liquid repellent film containing fluoroalkylsilane moiety) of fluoroalkylsilane by using $C_8F_{17}C_2H_4SiCl_3$ as a film (hereinafter, referred to as "fluorocarbon film") containing fluorocarbons is formed by chemical vapor deposition method on the surface of the plate.

The fluorocarbon film can be formed by, for example, coating with fluorocarbon-based resin, chemical vapor deposition, eutectoid plating with a fluorocarbon-based polymer or the like, or a water repellent process of a fluorine silane process, an aminosilane process, plasma polymerization of a fluorocarbon, or the like.

A method forming the liquid repellent film of the fluoroalkylsilane includes the following methods.

As a first example, there is a method where a monomolecular film or a polymer film having a water repellent property is formed by reacting fluoroalkyl trichlorosilane of $CF_3(CF_2)_8C_2H_4SiCl_3$, or the like with base material (See Japanese Patent Application Nos. 2500816, 2525536). In the chemical formula, $CF_3(CF_2)_8C_2H_4$— represents a fluoroalkyl group, and —$SiCl_3$ represents a trichlorosilyl group. In this method, the base material where an active hydrogen is present on the surface is exposed to a solution in which a fluoroalkyl trichlorosilane is dissolved, and chlorosilyl group (—SiCl) is reacted with active hydrogen to form a Si—O bond with the base material. As a result, a fluoroalkyl chain is fixed to the base material through Si—O bond. Herein, the fluoroalkyl chain provides the water repellent property to the film. The water repellent film is a monomolecular film or a polymer film according to the forming conditions of the film.

As a second example, there is a method where a porous base material which impregnates a compound containing a fluoroalkyl chain such as fluoroalkyl alkoxysilane including $CF_3(CF_2)_8C_2H_4Si(OCH_3)_3$ or the like is heated under vacuum, and the compound is evaporated to provide a water repellent property in the surface of the base material (see JP-A NO. 6-143586). In this method, there is proposed a method in which an intermediate layer of silicon dioxide, or the like is provided in order to increase adhesiveness between a water repellent film and the base material.

As a third example, there is a method in which fluoroalkyl silane is formed by chemical vapor deposition on the surface of the base material by using a compound such as fluoroalkyl trichlorosilane such as $CF_3(CF_2)_8C_2H_4SiCl_3$, or the like (see JP-A No. 2000-282240).

As a fourth example, there is a method in which oxide fine particles such as zirconia and alumina are formed on the surface of the base material, and then fluoroalkyl chlorosilane or fluoroalkyl alkoxysilane, or the like is coated thereon (see JP-A No. 6-171094).

As a fifth example, there is a method in which a mixed solution which adds metal alkoxide to fluoroalkyl alkoxy silane is hydrolyzed, dehydrated and polymerized, and then this solution is coated and fired on the base material, to thereby form a water repellent film in which molecules having a fluoroalkyl chain in the metal oxide are mixed (See Japanese Patent Application Nos. 2687060, 2874391, 2729714, 2555797). In this method, the fluoroalkyl chain provides the film with a water repellent property, and the metal oxide provides the film with high mechanical strength.

Among these forming methods above, chemical vapor deposition included as the third example is preferable.

In the case of the chemical vapor deposition, a container into which fluorocarbon material such as fluoroalkyl silane has been put and a silicone substrate are put in an airtight container made from Teflon (Trademark) and the like, the whole airtight container is placed in an electrical furnace and fluoroalkyl silane is evaporated by raising the temperature, and thereby a molecule such as fluoroalkylsilane is deposited on the surface of the silicon substrate, and thereby chemical vapor deposition can be performed. Thus, by chemical vapor deposition, for example a monomolecular film of fluorinated alkyl silane can be formed on the nozzle plate. In this case, the deposited surface of silicon substrate is preferably hydrophilized. Specifically, for example the surface of the silicon substrate is washed by using ultraviolet light (wavelength 172 nm), and thereby organic impurities are removed to obtain a clean surface. At this time, the silicon surface is spontaneously oxidized to coat the surface with $SiO_2$ film, and therefore water vapor in the air is adsorbed directly on the surface, and the surface is coated with an OH group to become a hydrophilic surface.

Another embodiment of the chemical vapor deposition method includes the method described below.

The liquid repellent film of fluorinated alkyl silane, for example fluoroalkyl trichloro silane such as $CF_3(CF_2)_8C_2H_4SiCl_3$ and water vapor at low pressure is introduced into a CVD reactor and thereby can be deposited on the uncoated outer surface of the base. The partial pressure of fluoroalkyl trichlorosilane such as $CF_3(CF_2)_8C_2H_4SiCl_3$ can be set to between 0.05 to 1 torr (6.67 to 133.3 Pa) (for example, 0.1 to 0.5 torr (13.3 to 66.5 Pa)), and the partial pressure of $H_2O$ can be set to between 0.05 to 20 torr (for example, 0.1 to 2 torr). The deposition temperature can be set to between room temperature and 100° C. A coating process can be performed using, for example, a Molecular Vapor Deposition (MVD)™ machine from Applied Micro Structures, Inc.

The liquid repellent film of the exemplary embodiment of the invention is a film formed by using fluorinated alkyl silane as the fluorocarbon. In particular, it is preferable to use the silane coupling compound represented by Formula (1) below.

$$C_nF_{2n+1}\text{—}C_mH_{2m}\text{—Si—}X_3 \qquad \text{Formula (1)}$$

In Formula (1), n represents an integer of 1 or more, and m represents an integer of 0 or more. X represents an alkoxy group, an amino group, or a halogen atom. Further, a part of X may be substituted with an alkyl group.

Examples of the fluorinated alkyl silane include fluoroalkyl trichlorosilane such as $C_8F_{17}C_2H_4SiCl_3$ and $CF_3(CF_2)_8C_2H_4SiCl_3$, or fluoroalkyl alkoxy silane such as $CF_3(CF_2)_8C_2H_4Si(OCH_3)_3$, 3,3,3-trifluoropropyl trimethoxy silane, tridecafluoro-1,1,2,2-tetrahydrooctyltrimethoxy silane, heptadecafluoro-1,1,2,2-tetrahydrodecyl trimethoxy silane, or the like.

In embodiments, a fluorocarbon film, which is a film formed by chemical vapor deposition method using a silane coupling compound represented by Formula (1), is preferable.

In Formula (1), from the viewpoints of the liquid repellent property and the durability of liquid repellent film, it is preferable that n represents an integer of 1 to 14, m represents an integer of 0 or 1 to 5, X represents an alkoxy group or halogen atom; further, it is preferable that n represents an integer of 1 to 12, m represents an integer of 0 or 1 to 3, X represents an alkoxy group or halogen atom.

The thickness of liquid repellent film is not particularly limited, but is preferable in the range of from 0.2 nm to 30 nm, and is more preferable in the range of from 0.4 nm to 20 nm. The thickness of liquid repellent film has no particular problems in the range exceeding 30 nm, but when the thickness is 30 nm or less, it is advantageous from the viewpoint of uniformity of the film. When the thickness is 0.2 nm or more, the water repellent property with regard to ink is good.

High quality image recording can be performed with a high resolution of 1200 dpi by high speed single-pass (one pass of the recording medium) due to the nozzle plate. That is to say, plural nozzles of the nozzle plate are disposed two-dimensionally in a matrix form, and an ink supply unit which is fixed to the nozzle has the flow path configuration allowing large volumes of ink to be ejected with high frequency (ejected with so-called high duty). Silicon, which is easily used in a semiconductor process, is used in part or in the whole in order to obtain a high precise image. Specifically, when a part or the whole of the nozzle plate is formed of silicon, for example, single crystal silicon and polysilicon can be used as silicon. In the nozzle plate formed of silicon, erosion due to ink is recognized as a general problem, and erosion prevention using various protective films can be examined. However, it is very difficult task to completely prevent erosion of the nozzle plate due to ink resulting from defects, or the like in the protective film, such as silicon oxide. In particular, as the frequency of ink ejection, such as in the high speed single-pass type, is high and fresh ink readily contacts the silicon and the protective film at all times, erosion of the silicon due to ink easily proceeds. Further, in the high speed single-pass type where high precision is required, there is high level of a demand for a response to the deterioration of ejection precision due to ink erosion.

In embodiments, the ink composition to be used in ejection contains an inorganic silicate compound, and thereby the deterioration of the easily eroded silicon can be effectively prevented.

The nozzle plates can be coated by forming a film which contains at least one kind selected from the group consisting of metal (including silicon) oxide and nitride, and metal (excluding silicon). Specifically, when a part or the whole of the nozzle plate is formed of silicon, for example, single crystal silicon and polysilicon. Further, when a part or the whole of the nozzle plate is formed of silicon, for example, there may be provided a film such as a metal oxide, for example silicon oxide, titanium oxide, chromium oxide, or the like or metal nitride such as titanium nitride, silicon nitride, or the like, or metal such as zirconium, on the single crystal silicon substrate. The silicon oxide may be, for example, $SiO_2$ film formed by oxidizing the whole or a part of the silicon surface of the nozzle plate formed of silicon. A film such as tantalum oxide (preferably, such as tantalum pentoxide ($Ta_2O_5$)) or zirconium, chromium, titanium, glass, or the like may be formed on a part or the entirety of the silicon surface. Further, a part of the silicon may be constituted to be replaced with glass (for example, borosilicate glass, photosensitive glass, quartz glass, soda-lime glass). A film consisting of tantalum pentoxide, or the like as well as tantalum oxide has excellent ink resistance; in particular good erosion resistance with respect to alkaline ink is obtained.

An embodiment of the method forming the $SiO_2$ film is described. For example, $SiCl_4$ and water vapor is introduced into a chemical vapor deposition (CVD) reactor in which an uncoated silicon substrate is provided, and thereby an $SiO_2$ film can be formed on the silicon substrate. After a valve between a CVD chamber and a vacuum pump pumps out fluid and empties the chamber, the valve is closed, and $SiCl_4$ and $H_2O$ vapor are introduced to the chamber. The partial pressure of $SiCl_4$ can be set between 0.05 and 40 torr (6.67 to $5.3 \times 10^3$ Pa) (for example, 0.1 to 5 torr (13.3 to 666.5 Pa), and the partial pressure of $H_2O$ can be set between 0.05 and 20 torr (for example 0.2 to 10 torr). The deposition temperature is generally between room temperature and 100° C. Further, in another embodiment, $SiO_2$ film can be formed on the silicon substrate by sputtering. The surface to be coated with $SiO_2$ film is preferably cleaned before forming the $SiO_2$ film (for example, by applying oxygen plasma).

Figure 3:
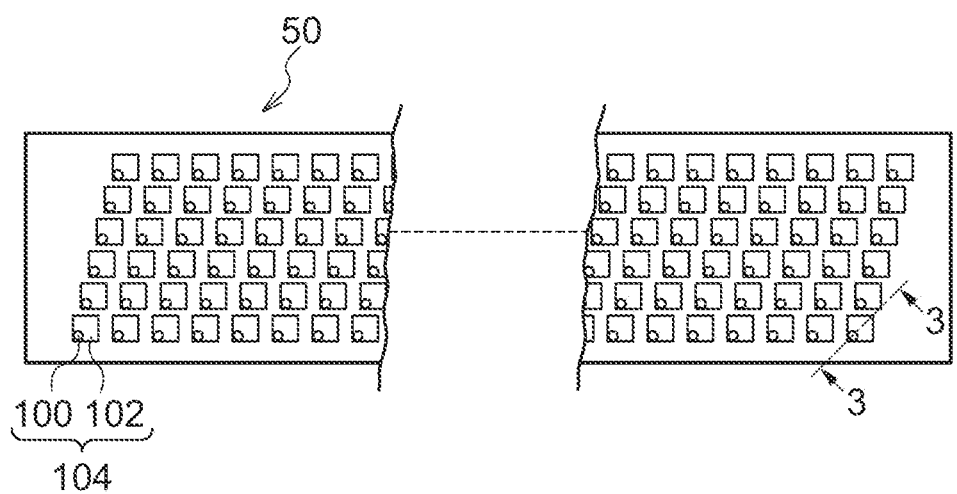
FIG. 3 is a plane perspective diagram showing one example of head structure.
Figure 4:
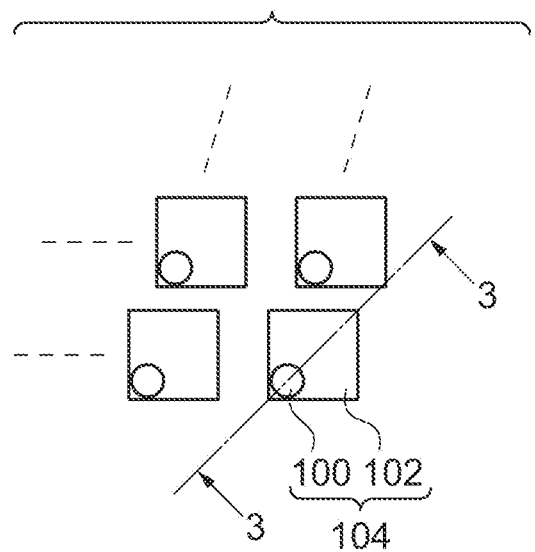
FIG. 4 is a magnified drawing magnifying and showing a part of FIG. 3.

The configuration example of the inkjet head including the nozzle plate having plural ejection ports (nozzles) which are arranged two-dimensionally is described in reference to FIG. 3 to FIG. 4. FIG. 3 is a plane perspective diagram showing one example of the head structure, and FIG. 4 is a magnified drawing magnifying and showing a part of FIG. 3.

In order to densify dot pitch recorded on the recording medium, it is necessary that the nozzle pitch is densified in head 50. The head 50 has a structure where plural ink chamber units 104 which consist of nozzle 100 ejecting the ink droplets and pressure chamber 102 corresponding to the nozzle 100 is disposed in zigzag in a matrix form, as showed in FIGS. 3 and 4. Thereby, an apparent densified nozzle pitch is attempted. That is to say, the head 50 is a full line head which provides at least one nozzle row where the plural nozzles 100 ejecting ink are arranged over the length corresponding to the whole width of the recording medium in the direction (principal scanning direction) substantially orthogonal to the transfer direction (sub-scanning direction) of the recording medium, as shown in FIGS. 3 and 4.

Figure 5:
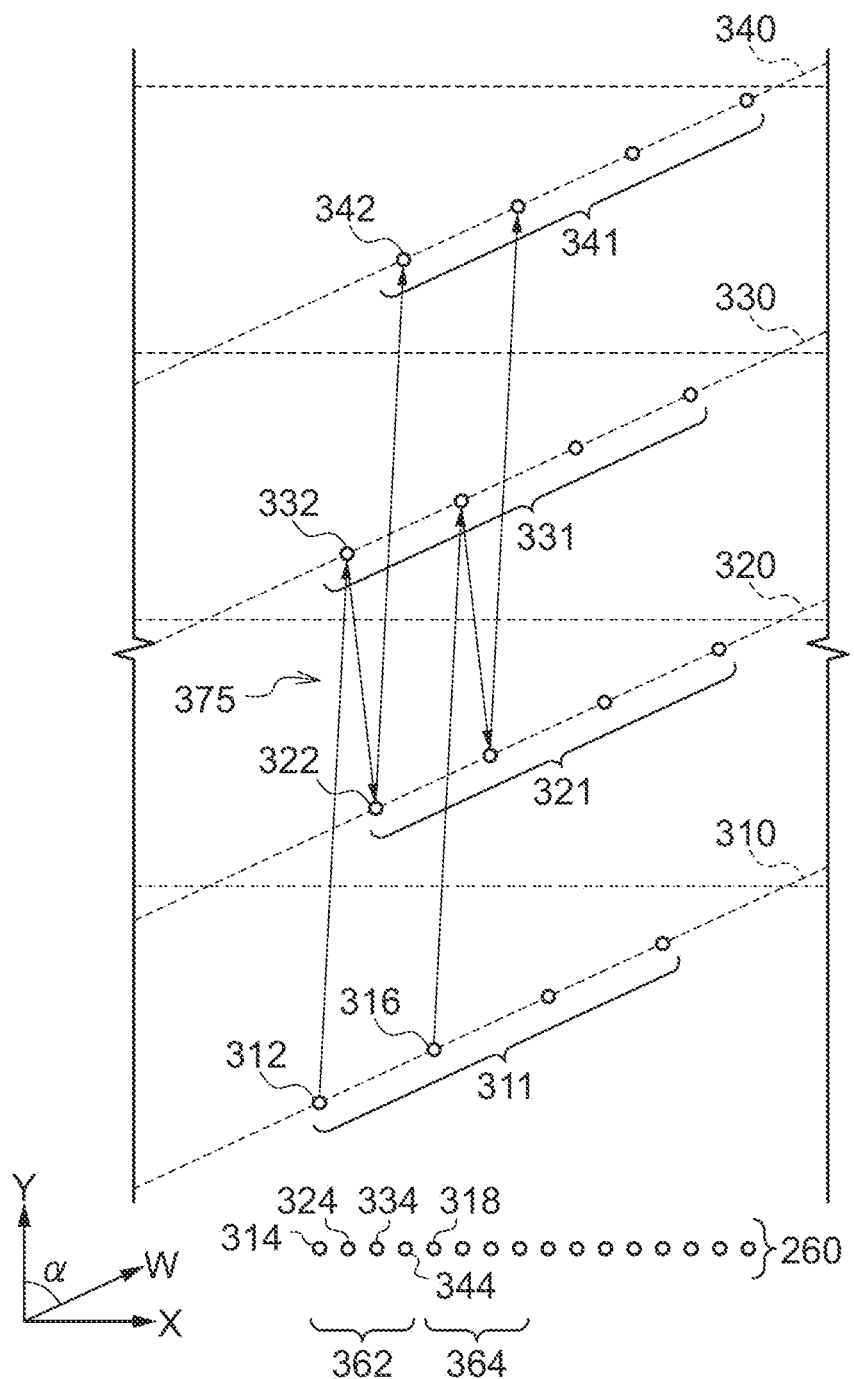
FIG. 5 is a magnified drawing magnifying and showing a part of two dimensional nozzle arrangement (32×64).

One example of a case where ink is ejected from the nozzle plate having the plural nozzles is described in reference to FIG. 5. In FIG. 5, four rows of nozzle rows from 311 to 341 are shown, but substantially, the total of 64 rows are disposed in one head module with a repeated arrangement pattern in the same manner as the four rows. 32 nozzles are arranged in each nozzle row. In FIG. 5, Y direction is paper transfer direction (sub-scanning direction), and X direction is longitudinal direction (principal scanning direction) of the line head. When one principal scanning line 260 is ejected, dot 314 is ejected from nozzle 312 of nozzle row 311. The dot 324 adjacent to dot 314 in the principal scanning direction is ejected from nozzle 332 of nozzle row 331 in the next two rows with respect to nozzle row 311. The dot 334 adjacent to dot 324 in the principal scanning direction is ejected from nozzle row 322 of nozzle row 321 adjacent to nozzle row 311. The dot 344 adjacent to dot 334 in the principal scanning direction is ejected from nozzle 342 of nozzle row 341 in the next three rows with respect to nozzle row 311. Thus, four nozzle rows are used one by one in the prescribed pattern (nozzle sequence 375 in FIG. 5), and the adjacent dot (for example, a group of adjacent four dots such as 362 or 364 in FIG. 5) in the principal scanning direction is ejected.

In FIG. 1, the ink supply unit 20 is equipped with plural pressure chambers 21, which respectively communicate with the plural ejection openings (ejection ports) 12 of the nozzle plate 11 through the nozzle communication path 22, plural ink supplying paths 23 that respectively supply ink to the plural pressure chambers 21, a common liquid chamber 25 that supplies ink to the plural ink supplying paths 23, and a pressure generation unit 30 that respectively transforms the plural pressure chambers 21.

The ink supplying paths 23 locate between the ink supply unit 20 and the nozzle plate 11, and an ink which has been supplied to the common liquid chamber 25 is introduced to the ink supplying path 23. One terminal of a supply regulating path 24 which is connected with the pressure chambers 21 is connected to the ink supplying path 23 so that an amount of an ink supplied from the ink supplying path 23 to the pressure chamber 21 which is located adjacent to the pressure generation unit 30 may be regulated to be a desired one. This system may enable to supply a plenty of amount of ink to the plural ejection openings.

The pressure generation unit 30 is an actuator (piezo device) which is constituted by sequentially stacking a vibration plate 31, an adhesive layer 32, a lower electrode 33, a piezoelectric body layer 34, and an upper electrode 35, from the pressure chamber 21 side. The pressure generation unit 30 is such that an electrical wire supplying a driving signal from the exterior is connected to be driven. The piezoelectric body layer is joined with electrode on the vibration plate (pressing plate) 31 which constitutes the upper face of pressure chamber 21. The actuator is deformed according to an image signal by applying an electric voltage to the electrode. The ink is ejected from the nozzle through the nozzle communicating path. When the ink is ejected, new ink is supplied to the pressure chamber 21 through the ink supply path 23 from the common liquid chamber 25.

A circulation aperture 41 which continuously collects an ink to a circulation path 42 is provided in the vicinity of the ejection opening 12. Increase of viscosity of an ink in the vicinity of the ejection opening during non-driving period may be suppressed thereby.

Figure 6:
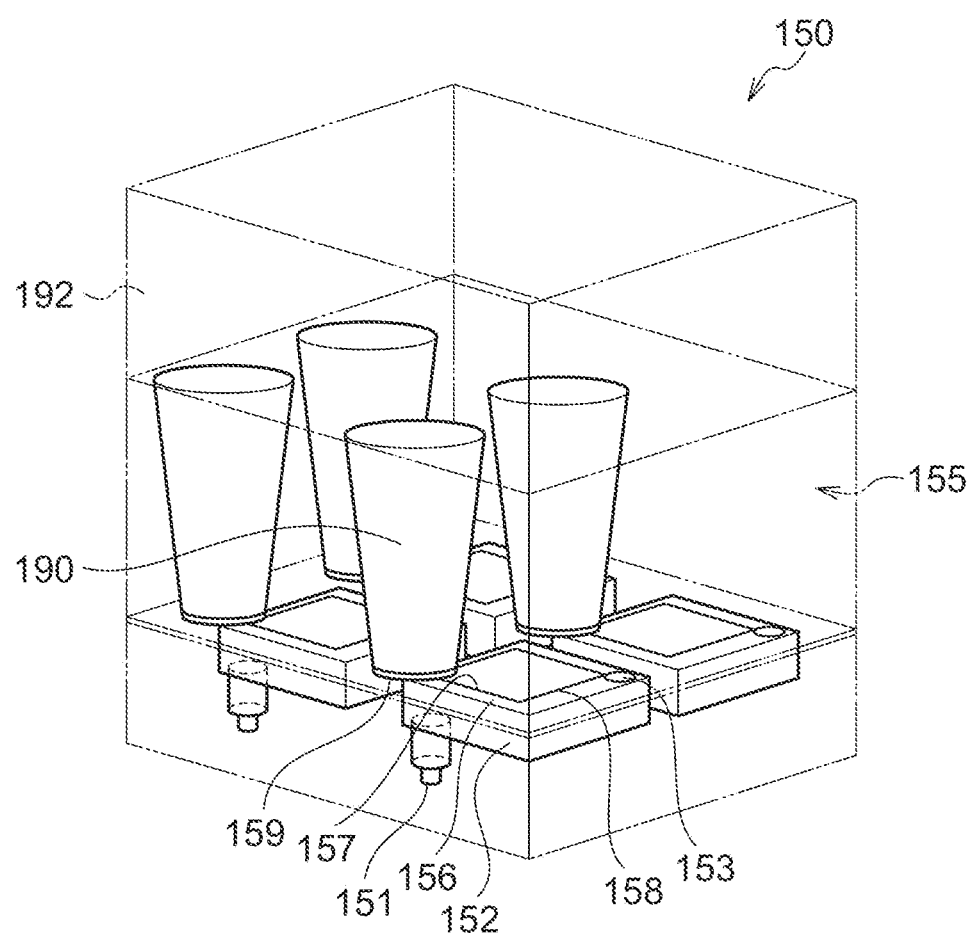
FIG. 6 is a perspective diagram magnifying and showing a part of another example of the head structure.
Figure 7:
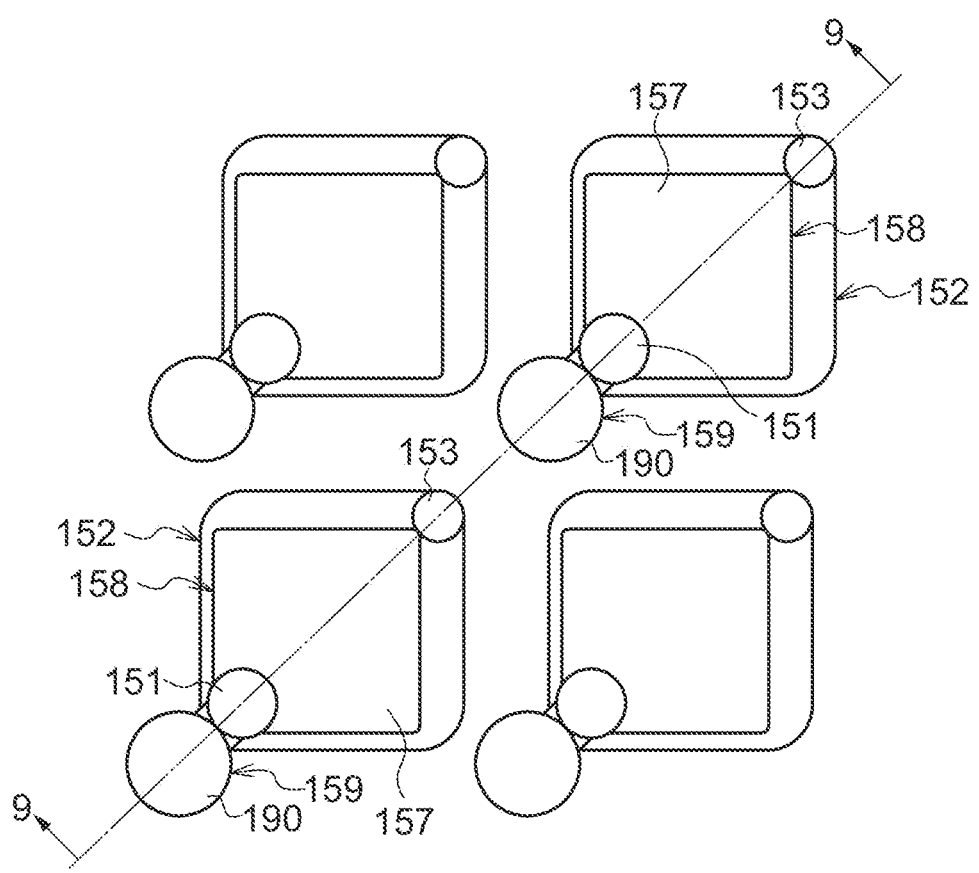
FIG. 7 is a plane perspective diagram magnifying and showing a part of the pressure chamber.
Figure 8:
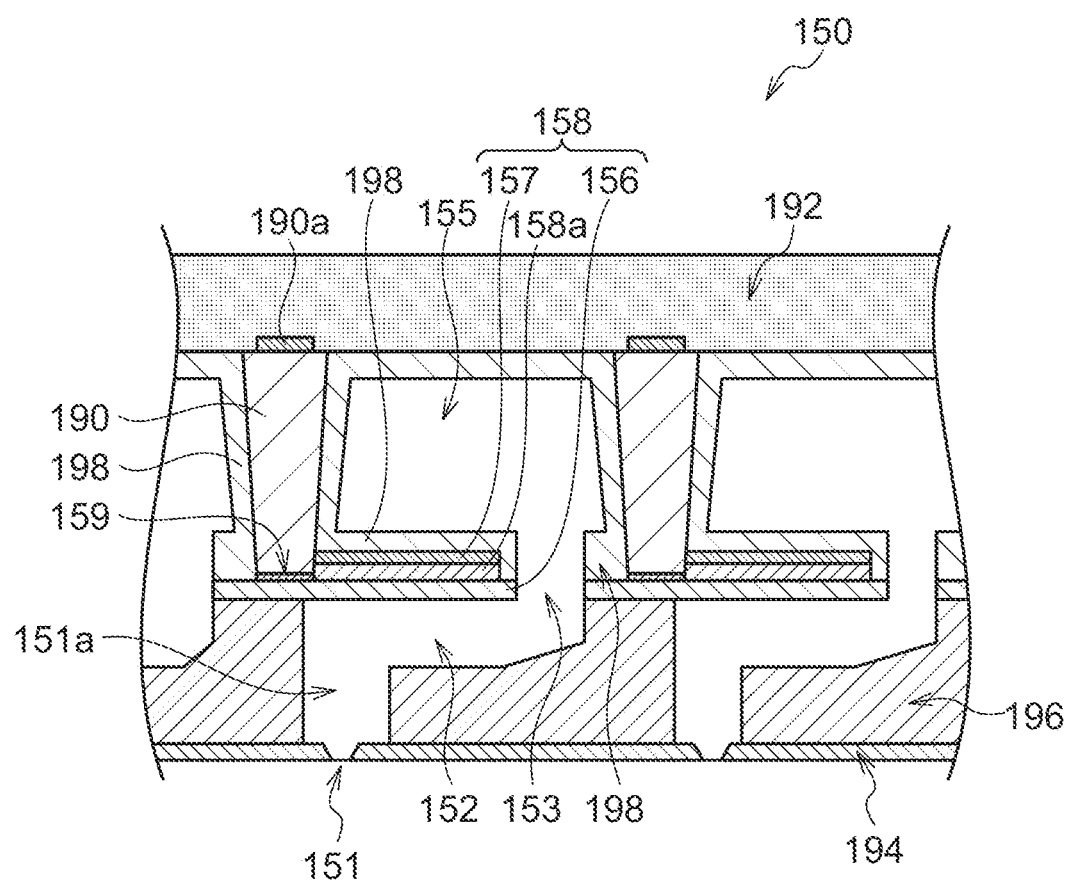
FIG. 8 is a cross-sectional drawing along line 9-9 of FIG. 7.

FIG. 6 is a perspective diagram showing another preferable example of the inner structure of inkjet head. FIG. 7 is a plane perspective diagram magnifying and showing a part of the pressure chamber. FIG. 8 is a cross-sectional drawing along line 9-9 of FIG. 7.

In order to densify the nozzle pitch, the inkjet head has the nozzle plate 194, plural pressure chambers 152 respectively communicating with the plural nozzles (ejection port) 151 of the nozzle plate, the plural ink supply flow paths 153 which supply ink to the plural pressure chambers 152, a common liquid chamber 155 which supplies the ink composition to each of the plural ink supply flow paths 153, pressure generation units 158 which respectively deform the plural pressure chambers 152, and electrical wirings 190 which respectively supply driving signals to the pressure generation units 158.

In order to obtain a higher precise image, the configuration of the inkjet head, shown in FIGS. 6 to 8, in part or as a whole uses silicon, which is easily used in a semiconductor process, and the rear face flow path design is used as flow path configuration where large volumes of ink can be ejected with high frequency. Through the rear face flow path design, large volumes of ink can be supplied to the nozzle disposed such that a higher precise image can be formed. As a result, fresh ink readily contacts the nozzle plate at all times. Even though the protective film is formed on the nozzle plate surface or inside the nozzle plate, silicon erosion in the nozzle plate main body easily proceeds through contact with ink due to ink penetration at a defective portion, or the like of film. In embodiments, through the addition of an inorganic silicate compound to ink composition used in ejection, deterioration of silicon, which is likely to be eroded, can be effectively prevented.

In the head 150, vibration plate 156, which forms the upper face of pressure chamber 152, is disposed on the upper side of the pressure chamber 152 having nozzle 151 and ink supply flow path 153. The piezoelectric device 158 (piezo actuator) is disposed as the pressure generation unit which consists of a piezoelectric body, such as a piezo which sandwiches an electrode at the upper and lower sides of portion corresponding to each pressure chamber 152 on vibration plate 156. The piezoelectric body 158 has separate electrode 157 on the upper face. The electrode pad 159 is drawn and formed as an electrode connecting section from the edge face of the separate electrode 157 to outside. The electrical wiring 190 on the electrode pad 159 is stood substantially vertically to the face including the piezoelectric device 158 (pressure generation unit). The multilayer flexible cable 192 is disposed on the electrical wiring 190 which is stood substantially vertically with respect to the face including the piezoelectric device 158, and the driving signal is supplied through the wiring from head driver to the separate electrode 157 of the piezoelectric device 158.

The space of the columnar electrical wiring (electrical column) 190, between where the vibration plate 156 and the flexible cable 192 are aligned, is a common liquid chamber 155 for supplying ink to pressure generating chamber 152 through the ink supply flow path 153 from hereto.

The electrical wiring 190 which is stood as a vertical column on the electrode pad 159 drawn from the separate electrode 157 to pressure chamber 152 supports the flexible cable 192 from below, and the space of the common liquid chamber 155 is formed. The electrical wiring 190 is formed to penetrate the common liquid chamber 155. Further, the electrical wiring 190 is formed with respect to the piezoelectric device 158 (of the separate electrode 157) one by one and is corresponded to one-on-one. However, in order to decrease number of wirings (electrical column number), one electrical wiring 190 may correspond to plural piezoelectric devices 158 such that the wirings for some piezoelectric devices 158 collectively form one electrical wiring 190. Further, wiring for not only separate electrodes 157 but a common electrode (vibrating plate 156) may be formed as the electrical wiring 190.

As shown in FIG. 6, the nozzle 151 is formed on the bottom face, and the ink supply flow path 153 is provided at the upper face of the diagonal corner to the nozzle 151. The ink supply flow path 153 penetrates the vibrating plate 156 and the common liquid chamber 155 and the pressure chamber 152 thereon is directly connected through the ink supply flow path 153. Thereby, the common liquid chamber 155 and the pressure chamber 152 can be directly fluidically connected.

The vibrating plate 156 is common to each pressure chamber 152 and forms one plate. The piezoelectric device 158 for deforming the pressure chamber 152 is disposed in the portion corresponding to the pressure chamber 152 of the vibrating plate 156. The electrode (common electrode and separate electrode) for driving the device by applying the electric voltage to the piezoelectric device 158 is formed at the upper and lower faces so as to sandwich the piezoelectric device 158.

The vibrating plate 156 may be formed of a conductive thin film such as, for example SUS, or the like to serve as a common electrode. In this case, in order that the piezoelectric device 158 is individually driven, a separate electrode 157 is formed in the upper face of piezoelectric device 158.

As described above, the electrode pad 159 is drawn from the separate electrode 157, and the electrical wiring 190 (electric column) which stands vertically on the electrode pad 159, and penetrates the common liquid chamber 155 is formed. In the electrical wiring 190 (electric column), the electrical wiring 190 is formed in a tapered shape during the production process as shown in FIG. 7.

The multilayer flexible cable 192 is formed on columnar electrical wiring 190. The electrical wiring 190 is a column to support the multilayer flexible cable 192, the vibrating plate 156 is used as the floor, the multilayer flexible cable 192 is used as the ceiling, and the space for the common liquid chamber 155 is secured. Further, the electrical wirings 190 are respectively connected to separate wirings (not shown) to supply driving signals to each electrodes 157, and thereby piezoelectric devices 158 are driven.

FIG. 7 shows a plane perspective diagram magnifying a part of the pressure chamber 152. As described above, the pressure chamber 152 is substantially square in shape, and the nozzle 151 and the ink supply flow path 153 are formed at diagonally opposed corners to each other, the electrode pads 159 is drawn to the nozzle 151 side, and the electrical wirings (electrical column) 190 are formed thereon.

As shown in FIG. 8, the head 150 is formed by laminating plural thin films, or the like.

The flow path plate 196 is laminated where the nozzle flow path 151a or the like, which connects the pressure chamber 152, the ink supply port 153 and the pressure chamber 152 with the nozzle 151, is formed on the nozzle plate 194 forming the nozzle 151. Here, the flow path plate 196 is represented as one plate although, in practice, the flow path plate 196 may be formed by laminating plural plates.

Further, a part or the whole of the nozzle plate 194 is formed of silicon. A structure may be used where the silicon is exposed within the nozzle port and on a surface thereof at a side toward the ink ejection direction of the nozzle, which are preferably coated with a film which contains at least one kind selected from the group consisting of metal (including silicon) oxide, metal nitride, and metal (excluding silicon). Among them, the nozzle plate is most preferably provided with $SiO_2$ film formed by a method of chemical vapor deposition (CVD), in at least a part thereof or entirely.

Further, the surface thereof at a side toward the ink ejection direction of the nozzle plate may be coated with a liquid repellent film in order that wettability due to ink is suppressed to prevent ink stain in the vicinity of nozzle. As the liquid repellent film, a film including fluorocarbon is preferably used.

Further, in exemplary embodiments of the invention, a deposited film including a fluoroalkylsilane moiety is formed by the chemical vapor deposition (CVD) method using $C_8F_{17}C_2H_4SiCl_3$ on $SiO_2$ film.

The vibration plate 156 forming the upper face of the pressure chamber 152 is laminated on the flow path plate 196. The vibration plate 156 preferably serves as a common electrode for driving the piezoelectric device 158 together with the separate electrode 157. Further, an opening corresponding to ink supply flow path 153 of the pressure chamber 152 is provided in the vibrating plate 156, to thereby directly communicate the common liquid chamber 155 formed on the vibrating plate 156 with the pressure chamber 152.

The piezoelectric body 158a is formed in the portion corresponding to substantially the entire face of the upper face of the pressure chamber 152 on the vibrating plate 156 (common electrode) and the separate electrode 157 is formed in the upper face of the piezoelectric body 158a.

The piezoelectric body 158a, which is interposed between the common electrode (vibrating plate 156) and separate electrode 157 on the upper and lower side, modifies the pressure chamber 152 to reduce the volume thereof when an electric voltage is applied by the common electrode 156 and the separate electrode 157, and constitutes a piezoelectric device 158 (piezoelectric actuator) for ejecting ink from the nozzle 151.

The edge of the nozzle 151 of the separate electrode 157 forms the electrode pad 159 as the electrode connecting section which is drawn outward. The columnar electrical wiring 190 (electric column) is formed vertically on the electrode pad 159 so as to penetrate the common liquid chamber 155.

The multilayer flexible cable 192 is formed on the electrical wiring 190. Each wiring (not shown) formed in the multilayer flexible cable 192 connects the electrode pad 190a to the electrical wiring 190, a driving signal is supplied through the electrical wiring 190 in order to drive each piezoelectric device 158.

The space where the columnar electrical wiring 190 (electric column) between the vibration plate 156 and the multilayer flexible cable 192 is aligned is the common liquid chamber 155 filled with ink in order to supply ink to the pressure chamber 152 which pools ink. Here, in order to fill the ink, insulation and protective films 198 are formed on the ink contacting surfaces of the vibrating plate 156, the separate electrode 157, the piezoelectric body 158a, and the electrical wiring 190, as well as the multilayer flexible cable 192.

The common liquid chamber which has been conventionally on the same side as the pressure chamber with respect to the vibration plate is disposed here on the vibration plate and is provided in opposition to the pressure chamber. Therefore, the conventionally required pipe, or the like for introducing ink to the pressure chamber from the common liquid chamber is not necessary. Further, the size of the common liquid chamber can be increased, and thereby ink can be satisfactorily supplied and densification of the nozzles can be attained. With the achievement of densification, the nozzles can be driven at a high frequency. Wiring to the separate electrode of each piezoelectric device is stood vertically from the electrode pad of the separate electrode, and is made to penetrate the common liquid chamber. Therefore, the wiring for supplying a driving signal to each piezoelectric device can be densified. Further, the common liquid chamber is disposed on the vibrating plate, the common liquid chamber and pressure chamber is directly connected through the ink supply port. Thereby, the common liquid chamber and pressure chamber can be directly fluidically connected, and the common liquid chamber is disposed on the vibrating plate. Therefore, the length of the nozzle flow path 151a from the pressure chamber 152 to nozzle 151 can be shortened over conventional methods. Even in the case of densification, high viscosity ink (for example, about 20 cp to 50 cp) can be ejected. Further, a flow path structure can be made which is able to promptly refill after ejection.

Further, the inner structure of inkjet head, shown in FIGS. 6 to 8 is described in [0090] to [0113] of JP-A No. 2006-111000.

[Treatment Liquid Applying Step]

In an image forming method of the exemplary embodiment of the invention, a treatment liquid applying step may be provided, which performs imaging by applying a treatment liquid configured to form aggregates when contacted with the ink composition, to a recording medium, and placing the treatment liquid in contact with an ink composition. In this case, dispersed particles of the polymer particles or coloring material (for example, pigment) in the ink composition aggregate, and an image is fixed to the recording medium. In addition, the details and preferred embodiments of the respective components in the treatment liquid are as described previously.

Application of the treatment liquid may be performed by applying known methods such as a coating method, an inkjet method, and an immersion method. The coating method may be performed by a known coating method using a bar coater, an extrusion die coater, an air doctor coater, a bread coater, a rod coater, a knife coater, a squeeze coater, or a reverse roll coater. Details of the inkjet method are as described above.

The treatment liquid discharging step may be provided before or after the ink applying step using the ink composition.

In embodiments, an embodiment in which the ink discharging step is provided after the treatment liquid is applied in a treatment liquid applying step, is preferable. That is, an embodiment in which, before application of the ink composition on the recording medium, a treatment liquid for aggregating a coloring material (preferably pigment) in the ink composition is applied in advance, and the ink composition is applied so as to contact the treatment liquid applied on the recording medium to form an image, is preferable. Thereby, inkjet recording may be speeded-up and, even when high speed recording is performed, an image having high density, and high resolution is obtained.

The amount of application of the treatment liquid is not particularly limited so long as the liquid can aggregate the ink composition, but can be an amount resulting in an amount of application of the aggregated component (for example, a carboxylic acid or a cationic organic compound having a valency of 2 or greater) of 0.1 g/m$^2$ or more. Among them, an amount resulting in an amount of application of the aggregated component of 0.1 to 1.0 g/m$^2$ is preferred, and an amount resulting in 0.2 to 0.8 g/m$^2$ is more preferred. When the amount of application of the aggregated component is 0.1 g/m$^2$ or more, the aggregation reaction proceeds satisfactorily, and when the amount is 1.0 g/m$^2$ or less, the glossiness is not very high, and is preferable.

According to the exemplary embodiment of the invention, it is preferable to provide an ink discharging step after the treatment liquid applying step, and to further provide a heating drying step of heating and drying the treatment liquid on the recording medium, during a period from after applying the treatment liquid onto the recording medium until the ink composition is applied. By heating and drying the treatment liquid previously before the ink discharging step, ink coloring properties such as the prevention of spreading becomes good, and a visible image having good color density and hue can be recorded.

The heating and drying can be carried out by a known heating means such as heater, an air blowing means utilizing air blowing such as dryer, or a means combining these. Examples of the heating method include a method of supplying heat by a heater or the like, from the surface of the recording medium opposite the surface applied with the treatment liquid, a method of blowing a warm air or hot air to the surface of the recording medium applied with the treatment liquid, a method of heating using an infrared heater, or the like. Heating can also be performed by combining these methods.

[Heating Fixing Step]

It is preferable that the image forming method of the exemplary embodiment of the invention includes, after the ink applying step, a heating fixing step for heating and fixing the ink image formed by the application of the ink composition by placing the image in contact with a heated surface. By adding a heating fixing treatment, fixing of the image on the recording medium is achieved, and the resistance of the image to abrasion can be further enhanced.

Heating can be preferably performed at the glass transition temperature (Tg) or higher of the polymer particle in the image. Since heating is performed at the Tg temperature or higher, the film is formed to strengthen the image. The heating temperature is preferably in the temperature region of Tg+10° C. or higher. Specifically, the heating temperature is preferably in a range of from 40° C. to 150° C., more preferably in a range of from 50° C. to 100° C., and even more preferably in a range of from 60° C. to 90° C.

From the viewpoint of surface smoothing, a pressure during pressurization together with heating is preferably in a range of from 0.1 MPa to 3.0 MPa, more preferably in a range of from 0.1 MPa to 1.0 MPa, and even more preferably in a range of 0.1 MPa to 0.5 MPa.

The heating method is not particularly limited, but methods of non-contact drying such as a method of heating with a heat generator such as a nichrome wire heater; a method of supplying warm air or hot air; and a method of heating with a halogen lamp, an infrared lamp or the like, may be suitably exemplified. The method of heating and pressing is not particularly limited, but methods of performing heating and fixing by contact such as, for example, a method of pressing a heat plate to the image-formed surface of the recording medium, and a method of passing the image through a pair of rollers using a heating and pressing apparatus equipped with a pair of heating and pressing rollers, a pair of heating and pressing belts, or a heating and pressing belt disposed on the side of the image-recorded surface of the recording medium and a retaining roller disposed on the opposite side, may be suitably mentioned.

In the case of heat and pressing, a NIP time of 1 msec to 10 sec is preferable, more preferable is 2 ms to 1 s, and even more preferable is 4 msec to 100 msec. Further, a NIP width of 0.1 mm to 100 mm is preferable, more preferable is 0.5 mm to 50 mm, and even more preferable is 1 mm to 10 mm.

As the heating and pressing roller, a metal roller made from metal or a roller having a coating layer including an elastic body around a metal bar core and a surface layer (referred to as separate layer) provided if necessary, may be used. For example, the latter bar core can be constituted by a cylindrical body made from iron, aluminum, SUS, or the like. The surface of the bar core is preferably coated with the coating layer at least in part. In particular, the coating layer may be preferably formed of a silicon resin or fluorocarbon resin having mold releasability. Further, a heat generation unit is preferably built into the bar core of one side of the heating and pressing roller, and heating and pressing process are simultaneously preformed by passing the recording medium between rollers or heating may be performed through sandwiching the recording medium using two heating rollers, if necessary. For example, the heat generation unit is preferably a halogen lamp heater, a ceramic heater, a nichrome wire, or the like.

A belt base material which constitutes a heating and pressing belt used in the heating and pressing unit is preferably a seamless electroformed nickel, the thickness of the base material is preferably 10 to 100 μm. Further, aluminum, iron, polyethylene, or the like, other than nickel can be used as the material of belt base material. When silicon resin or fluorocarbon resin is provided, the thickness of layer which is formed by using the resins is preferably 1 to 50 μm, and more preferably 10 to 30 μm.

Further, in order to realize the pressure (NIP pressure), elastic members such as springs with tensile force are selected and are disposed in both ends of rollers such as a heating and pressing roller so as to obtain the desired NIP pressure in consideration of the NIP gap.

The speed of conveyance of the recording medium when a heating and pressing roller or a heating and pressing belt is used is preferably in the range of 200 mm/second to 700 mm/second, more preferably 300 mm/second to 650 mm/second, and further preferably 400 mm/second to 600 mm/second.

—Recording Medium—

The image forming method of the exemplary embodiment of the invention is to record an image on the recording medium.

The recording medium is not particularly limited, and general printing paper including cellulose as a main component such as so-called high-quality paper, coated paper, and art paper may be used. The general printing paper including cellulose as a main component absorbs and dries an ink relatively slowly, easily causes coloring material movement after a droplet is spotted, and allows image quality to easily deteriorate in image recording by a general inkjet method using an aqueous ink. However, according to the image forming method of the exemplary embodiment of the invention, coloring material movement is suppressed, and a high-quality image excellent in color density and hue may be recorded.

As the recording medium, a recording medium which is generally commercially available may be used, and examples include high quality paper such as OK Prince High Quality (trade name, manufactured by Oji Paper Co., Ltd.), Shiorai (trade name, manufactured by Nippon Paper Industries Co., Ltd.), and New NP High Quality (trade name, manufactured by Nippon Paper Industries Co., Ltd.), fine coated paper such as OK Ever Lite Coat (trade name, manufactured by Oji Paper Co., Ltd.) and Aurora S (trade name, Nippon Paper Industries Co., Ltd.), light coated paper (A3) such as OK Coat L (trade name, manufactured by Oji Paper Co., Ltd.) and Aurora L (trade name, manufactured by Nippon Paper Industries Co., Ltd.), coated paper (A2, B2) such as OK Top Coat+ (trade name, manufactured by Oji Paper Co., Ltd.) and Aurora Coat (trade name, manufactured by Nippon Paper Industries Co., Ltd.), and an art paper (A1) such as OK Kanefuji+ (trade name, manufactured by Oji Paper Co., Ltd.) and Tokubishi Art (trade name, manufactured by Nippon Paper Industries Co., Ltd.). Further, various papers for photography for use in inkjet recording may be used.

Among the above, a recording medium having a water-absorption coefficient Ka of 0.05 $mL/m^2 \cdot ms^{1/2}$ to 0.5 $mL/m^2 \cdot ms^{1/2}$ is preferable, a recording medium having a water-absorption coefficient Ka of 0.1 $mL/m^2 \cdot ms^{1/2}$ to 0.4 $mL/m^2 \cdot ms^{1/2}$ is more preferable, and a recording medium having a water-absorption coefficient Ka of 0.2 $mL/m^2 \cdot ms^{1/2}$ to 0.3 $mL/m^2 \cdot ms^{1/2}$ is even more preferable from the viewpoints of the large suppression effect on color material movement and obtaining high quality image having good color density and color hue compared to conventional methods.

The water-absorption coefficient Ka has the same definition as that described in JAPAN·TAPPI·Paper Pulp Testing Method No 51:2000 (published by Japan Technical Association of the Pulp and Paper Industry). Specifically, the absorption coefficient Ka is calculated from difference of the transferring amount of water in contact time 100 ms and 900 ms by using Automatic Scanning Absorptometer KM500Win (trade name, manufactured by Kumagai Riki Kogyo Co., Ltd.).

Among recording mediums, there is preferred a so-called coated paper used in general offset printing, or the like. The coated paper is a coating layer provided by applying a coating material on the surface of a high-quality paper, a neutralized paper, or the like which mainly use cellulose and are generally not surface-treated. The coated paper easily causes problems in quality in gloss or abrasion resistance of the image, or the like in forming an image by a conventional water-based inkjet method. In the image forming method of the exemplary embodiment of the invention, gloss unevenness can be suppressed to obtain good image having glossy and abrasion resistance. In particular, the coated paper is preferably used which has base paper and a coating layer including kaolin and/or calcium bicarbonate. More specifically, an art paper, a coated paper, a lightweight coated paper or a micro coated paper are more preferred.

—Ink Composition—

The ink composition of the exemplary embodiment of the invention includes an inorganic silicate compound and is generally composed by including a further colorant such as a pigment or dye, and further, is composed by using another component if necessary. In embodiments, the composition which contains pigments and an inorganic silicate compound is preferable. The pigment (hereinafter, referred to as "resin-coated pigment") is coated with a water insoluble resin including a structural unit having an acidic group.

By using an ink composition constituted by including an inorganic silicate compound and preferably a resin-coated pigment, deterioration by erosion of the nozzle plate of the inkjet head is suppressed and is excellent in the ejection reliability of ink. Further, the abrasion resistance of the formed image is increased.

The liquid repellent film is provided to a member constituting the inkjet head to give the liquid repellent property in order to maintain the ejection performance of the ink. For example, the liquid repellent property can be given to the surface of the head member, preferably the silicon surface by a surface treatment using the fluorine material. It is known that the liquid repellent property of the inkjet head member is deteriorated slowly due to long-term use of the inkjet head. Meanwhile, in particular, in order that a fine nozzle (ink ejection port) is formed precisely, the nozzle plate is formed by containing silicon in some cases. In the inkjet head having the silicon nozzle plate formed by the use of silicon, even though a fluorocarbon film as well as a liquid repellent film are provided at the surface thereof, deterioration of the liquid repellent property or deterioration of the liquid repellent property of the nozzle plate due to ink penetration through a pinhole generated in the film, or deformation of the silicon due to ink penetration through a pinhole, or the like has an effect on the ink ejection property in some cases.

When the ink composition of the exemplary embodiment of the invention is used in an inkjet head having such (preferably formed of silicon) a nozzle plate, deterioration of the liquid repellent property of the head member and further deterioration of the silicon under the liquid repellent film can be prevented effectively.

The ink composition of the exemplary embodiment of the invention contains at least one kind of an inorganic silicate compound. The inorganic silicate compound may be widely selected from silicic acid and silicate; in particular, salt with alkali metal and alkali earth metal of silicic acid such as sodium silicate, potassium silicate, calcium silicate, and magnesium silicate, or anhydrous silicic acid (silica) is preferable. An alkali solution of an alkali metal salt of silicic acid which is referred to as water glass is preferably used as the silicate. The anhydrous silicic acid (silica) is not particularly limited, but colloidal silica is preferably used.

As far as the alkali metal salt of silicic acid is a compound which is constituted by silicon dioxide and metallic oxide and has water solubility, it is not particularly limited. The alkali metal salt of silicic acid includes alkali metal salt of metasilicic acid, alkali metal salt of orthosilicic acid, or the like. Further, an ammonium salt of silicic acid including an ammonium salt of metasilicic acid, ammonium salt of orthosilicic acid, or the like may be also used. The silicate salt having water solubility may be used alone or in a combination with two or more kinds thereof.

Specifically, the alkali metal salt of silicic acid is preferably at least one kind of compound represented by the following formula (S).

$$x(M_2O) \cdot y(SiO_2) \qquad \text{Formula (S)}$$

In Formula (S), M represents sodium or potassium, x represents 1 or 2, y represents an integer of 1 to 4. The alkali metal salt of silicic acid represented by Formula (S) is referred as the alkali metal salt of silicic acid when x=1, y=1, alkali metal salt of orthosilicic acid when x=2, y=1, and both are alkali metal salt of silicic acid having water solubility.

As the alkali metal salt of silicic acid having water solubility, a commercial compound (for example, water glass), or one obtained by solving silicic acid and carbonate or hydroxide of alkali metal may be used.

Among them, from the viewpoints of suppressing elution of the portion contacting the ink composition of the inkjet head (particularly, nozzle plate or ink flow path), and an erosion according to the elution, incorporating at least one kind selected from alkali metal salt of silicic acid such as sodium silicate and potassium silicate in the ink composition is preferable. The alkali metal salt of silicic acid renders to obtain good ink dispersibility to the ink composition in comparison with salt other than alkali metal, for example ammonium salt of silicic acid (for example, tetramethyl ammonium salt of silicic acid, or the like). Further, in the case of ammonium salt, or the like, a volatile compound can be produced in some cases, and thus an alkali metal salt of silicic acid is preferable from the viewpoint that over time odors are hardly generated.

Colloidal silica is colloid that comprises fine particles of inorganic oxides including silicon, in which an average particle diameter of the fine particles is several hundred nm or less. Colloidal silica includes silicon dioxide (including hydrates thereof) as a main component and may contain aluminate as a minor component. Examples of the aluminate, which may be contained as a minor component, include sodium aluminate and potassium aluminate.

Further, inorganic salts such as sodium hydroxide, potassium hydroxide, lithium hydroxide, and ammonium hydroxide or organic salts such as tetramethylammonium hydroxide may be contained in the colloidal silica. These inorganic salts and organic salts function, for example, as a stabilizer of colloid.

The dispersing medium for colloidal silica is not particularly limited and may be any of water, an organic solvent, or a mixture of water and an organic solvent. The organic solvent may be a water-soluble organic solvent or a water-insoluble organic solvent. However, the organic solvent is preferably a water-soluble organic solvent. Specific examples thereof include methanol, ethanol, isopropyl alcohol, and n-propanol.

There is no particular limitation on the method for producing colloidal silica, and colloidal silica can be produced by a generally used method. For example, colloidal silica can be produced through an Aerosil synthesis by thermal decomposition of silicon tetrachloride, or may be produced from water glass. Alternatively, colloidal silica can be produced according to a liquid phase synthesis method including hydrolysis of an alkoxide (see, for example, "Seni to Kogyo", vol. 60, No. 7, page 376, 2004), or the like.

There is no particular limitation on the average particle diameter of the particles contained in the colloidal silica according to the present invention. For example, the average particle diameter may be set from 1 nm to 200 nm. The average particle diameter is preferably from 1 nm to 100 nm, more preferably from 3 nm to 50 nm, even more preferably from 3 nm to 25 nm, and particularly preferably from 5 nm to 20 nm.

When the average particle diameter is 200 nm or less, damages (for example, lowering of liquid repellency or the like) caused by ink to the members which construct the inkjet head, such as a substrate, a protective film, a liquid-repellent film, and the like, may be more effectively suppressed. It is thought that, by making the average particle diameter smaller, a total surface area of particles increases, so that damages to the members which construct the inkjet head is more effectively suppressed. Moreover, it is preferable that the average particle diameter of the particles is 200 nm or less, also from the viewpoints of discharge reliability of the ink composition and suppression of the abrasive effect caused by the particles.

In the present invention, the average particle diameter of the colloidal silica is represented by a volume average particle diameter. The volume average particle diameter can be determined according to a general method for dispersed particles such as a light scattering method or a laser diffraction method.

The shape of the colloidal silica is not particularly limited so long as it does not disturb the ejection performance of the ink. For example, the shape may be a spherical shape, a long shape, a needle-like shape, or a shape like a string of beads. Above all, it is preferred that the colloidal silica is spherical, from the viewpoint of dischargeability of ink.

The colloidal silica, which can be used in the present invention, may be produced by the production method described above, or may be a commercially available product. Specific examples of the commercially available product include LUDOX AM, LUDOX AS, LUDOX LS, LUDOX TM, and LUDOX HS (all trade names, manufactured by E.I. Du Pont de Nemours & Co.); SNOWTEX S, SNOWTEX XS, SNOWTEX 20, SNOWTEX 30, SNOWTEX 40, SNOWTEX N, SNOWTEX C, and SNOWTEX O (all trade names, manufactured by Nissan Chemical Industries, Ltd.); SYTON C-30 and SYTON ZOO (all trade names, manufactured by Monsanto Co.); NALCOAG-1060 and NALCOAG-ID21 to 64 (all trade names, manufactured by Nalco Chem. Co.); METHANOL SOL, IPA SOL, MEK SOL, and TOLUENE SOL (all trade names, manufactured by Fuso Chemical Co., Ltd.), CATALOID-S, CATALOID-F120, CATALOID SI-350, CATALOID SI-500, CATALOID SI-30, CATALOID S-20L, CATALOID S-20H, CATALOID S-30L, CATALOID S-30H, CATALOID SI-40, and OSCAL-1432 (isopropyl alcohol sol) (all trade names, manufactured by JGC Catalysts and Chemicals Ltd.); ADELITE (trade name, manufactured by Asahidenka Co., Ltd.); and, as examples of colloidal silica in the shape of a string of beads, SNOWTEX ST-UP, SNOWTEX PS-S, SNOWTEX PS-M, SNOWTEX ST-OUP, SNOWTEX PS-SO, and SNOWTEX PS-MO (all trade names, manufactured by Nissan Chemical Industries, Ltd.). These products are easily available.

The pH of the above commercially available colloidal silica dispersion liquid is often adjusted to pH of acidic or alkaline. This is because the region where colloidal silica is stably dispersed exists in an acidic side or alkaline side. In the case of adding a commercially available colloidal silica dispersion liquid to the ink composition, the pH of the region where the colloidal silica is stably dispersed and the pH of the ink composition should be taken in consideration.

The content of the colloidal silica in the ink composition, while not particularly limited, can be for example 0.0005% by mass to 0.5% by mass with respect to the total amount (entire mass) of the ink composition. The content of the inorganic silicate compound is preferably 0.001% by mass to 0.5% by mass with respect to the total amount of the ink composition, more preferred is 0.01% by mass to 0.5% by mass of the total amount of the ink composition, and particularly preferred is 0.01% by mass to 0.3% by mass of the total amount of the ink composition. When the content of the ink composition is the upper limit or less, the ejection properties of the ink composition is more improved, further influence on inkjet head due to abrasive effect of silica particle can be suppressed more effectively. Further, when the content of the ink composition is the lower limit or higher, shape deformation by deterioration due to erosion of the nozzle plate and decrease in liquid repellent property can be suppressed more effectively.

Further, in the ink composition of the exemplary embodiment of the invention, it is preferable that the content of colloidal silica which has volume average particle diameter of 3 nm to 25 nm is 0.001% by mass to 0.5% by mass with respect to the total amount of the ink composition, from the viewpoints of suppression of the decrease in liquid repellent property of the inkjet head member and the ink ejection properties. It is more preferred that the content of colloidal silica which has volume average particle diameter of 3 nm to 20 nm is 0.01% by mass to 0.5% by mass of the total amount of the ink composition.

[Colorant]

The ink composition of the exemplary embodiment of the invention can contain color elements such as pigments or dyes as colorants. In embodiments, it is preferred to contain at least one kind of pigment which is coated with a water-insoluble resin including a structural unit having an acidic group. Thereby, the ink composition of the exemplary embodiment of the invention is excellent in ink ejection reliability and is excellent in abrasion resistance of the formed image therewith. In this case, a specific form of pigment is not particularly limited, as long as there is a form where the whole or a part of the surface of the pigment particles is coated with the water insoluble resin.

<Pigment>

The pigment used in the exemplary embodiment of the invention is not particularly limited, and may be appropriately selected according to the intended use. The pigment includes an organic pigment and an inorganic pigment.

Examples of the organic pigment include azo pigments, polycyclic pigments, dye chelates, nitro pigments, nitroso pigments, and aniline black. Among them, azo pigments and polycyclic pigments are more preferable.

Examples of the azo pigments include azo lakes, insoluble azo pigments, condensed azo pigments, and chelate azo pigments.

Examples of the polycyclic pigment include phthalocyanine pigments, perylene pigments, perinone pigments, anthraquinone pigments, quinacridone pigments, dioxazine pigments, indigo pigments, thioindigo pigments, isoindolinone pigments, and quinophthalone pigments.

Examples of the dye chelates include basic dye chelates and acidic dye chelates.

Examples of the inorganic pigments include titanium oxide, iron oxide, calcium carbonate, barium sulfate, aluminium hydroxide, barium yellow, cadmium red, chrome yellow, and carbon black. Among them, carbon black is particularly preferable. Carbon black may be produced by a known method such as a contact method, a furnace method, or a thermal method.

These pigments may be used alone or in a combination of two or more of them selected from one or more groups above.

(Water-Insoluble Resin)

The water-insoluble resin contains at least one structural unit having an acidic group, and may further contain one or more other structural unit(s) if necessary. In preferable embodiments, in view of achieving stable presence in the ink composition, reducing adhering and accumulation of aggregates, and enabling easy removal of adhered aggregates, the water-insoluble resin may preferably contain at least one hydrophilic structural unit (A) and at least one hydrophobic structural unit (B). In more preferable embodiments, the acidic group may be contained in one of the hydrophilic structural unit (A).

The "water-insoluble polymer" herein refers to a polymer whose dissolved amount to 100 g of water at 25° C. is 5 g or smaller when the polymer is dissolved in the water. The "dissolved amount" is an amount of (a part of) the water-insoluble polymer dissolved in a solvent (water) when acidic groups of the water-insoluble polymer are completely neutralized with sodium hydroxide.

Hydrophilic Structural Unit

There is no particular limitation to the hydrophilic structural unit in the water-insoluble polymer as long as it contains at least one hydrophilic functional group. The hydrophilic structural unit may contain an ionic hydrophilic group or a nonionic hydrophilic group. In preferable embodiments, the hydrophilic structural unit may have an acidic group. The hydrophilic structural unit having an acidic group may be derived from a monomer including an acidic group, or may be a structural unit formed by introducing, by a macromolecular reaction, an acidic group to a structural unit having no acidic group in a polymer chain which has been formed by polymerization.

The acid group is not particularly limited and may include, from the viewpoint of stability of the emulsion state or dispersion state, a carboxy group, a phosphoric acid group, and a sulfonic acid group. Among these, a carboxy group is preferable from the viewpoint of dispersion stability in an ink composition.

As a monomer having an acid group (acid group containing monomer), a monomer having an acid group and an ethylenically unsaturated bond is preferable. Examples of the monomer having an acid group may include an unsaturated carboxylic acid monomer, an unsaturated sulfonic acid monomer, and an unsaturated phosphoric acid monomer.

Examples of the unsaturated carboxylic monomer may include acrylic acid, methacrylic acid, crotonic acid, itaconic acid, maleic acid, fumaric acid, citraconic acid, and 2-methacryloyloxymethyl succinic acid. Examples of the unsaturated sulfonic acid monomer may include styrenesulfonic acid, 2-acrylamido-2-methylpropanesulfonic acid, 3-sulfopropyl (meth)acrylate, and bis(3-sulfopropyl) itaconate. Examples of the unsaturated phosphoric acid monomer may include vinylphosphonic acid, vinyl phosphate, bis(methacryloxyethyl) phosphate, diphenyl-2-acryloyloxyethyl phosphate, diphenyl-2-methacryloyloxyethyl phosphate, and dibutyl-2-acryloyloxyethyl phosphate.

Among the acid group containing monomers, from the viewpoints of dispersion stability and ejection stability, an unsaturated carboxylic monomer is preferable, and acrylic acid and methacrylic acid are more preferable. Specifically, the structural unit having an acid group is preferably a structural unit derived from (meth)acrylic acid.

In the water-insoluble resin, either or both of a structural unit derived from acrylic acid and a structural unit derived from methacrylic acid are preferably incorporated.

When the hydrophilic group includes a basic group, examples of the basic group include an amino group and an amido group in which a nitrogen atom is unsubstituted.

Examples of the hydrophilic structural unit (A) having a basic group include a structural unit derived from a monomer having a basic hydrophilic group. Examples of the monomer having a basic hydrophilic group include (meth)acrylate having a basic hydrophilic group, (meth)acrylamide having a basic hydrophilic group, and vinyl monomers such as vinyl esters having a basic hydrophilic group.

A monomer which provides the hydrophilic structural unit having a basic hydrophilic group may preferably have a functional group which can form a polymer such as an ethylenically unsaturated bond and a basic hydrophilic functional group. Such monomer may be selected from known monomers, and specific examples thereof which may be preferably used include (meth)acrylamides, aminoethyl (meth)acrylates, and aminopropyl (meth)acrylates.

When the hydrophilic group includes a nonionic hydrophilic group, examples of the nonionic hydrophilic group include a hydroxyl group and alkylene oxides such as polyethylene oxide or polypropylene oxide described below.

Examples of the hydrophilic structural unit (A) having a nonionic hydrophilic group include a unit derived from a monomer having a nonionic hydrophilic group. Examples of the monomer having a nonionic hydrophilic group include (meth)acrylate having a nonionic hydrophilic group, (meth) acrylamide having a nonionic hydrophilic group, and vinyl monomers such as vinyl esters having a hydrophilic group.

The monomer that forms the hydrophilic structural unit having a nonionic hydrophilic group is preferably a monomer that has a functional group capable of forming a polymer such as an ethylenically unsaturated bond and a nonionic hydrophilic functional group, and may be selected from known monomers. Preferable specific examples of the monomer may include hydroxyethyl (meth)acrylate, hydroxybutyl (meth)acrylate, and (meth)acrylate that contains an alkyleneoxide polymer.

The hydrophilic structural unit (A) having a nonionic hydrophilic group may be formed by polymerization of corresponding monomers, but may be formed by introducing a hydrophilic functional group into a polymer chain after polymerization.

As the hydrophilic structural unit having a nonionic hydrophilic group, a hydrophilic structural unit having an alkylene oxide structure is more preferable. As the alkylene moiety of the alkylene oxide structure, from the viewpoint of hydrophilicity, an alkylene moiety having 1 to 6 carbon atoms is preferable, an alkylene moiety having 2 to 6 carbon atoms is more preferable, and an alkylene moiety having 2 to 4 carbon atoms is particularly preferable. The polymerization degree of the alkylene oxide structure is preferably 1 to 120, more preferably 1 to 60, and particularly preferably 1 to 30.

In a preferable embodiment, the hydrophilic structural unit having a nonionic hydrophilic group is a hydrophilic structural unit having hydroxy group. The number of hydroxy groups in the structural unit is not particularly limited and is preferably 1 to 4, more preferably 1 to 3, and still more preferably 1 or 2, from the viewpoints of the hydrophilicity of the water-insoluble resin and compatibility with a solvent and other monomers at the time of polymerization.

In the foregoing description, the content of the hydrophilic structural unit varies, for example, depending on the ratio of the hydrophobic structural unit (B) described later. For example, when the water-insoluble resin is composed of acrylic acid and/or methacrylic acid (hydrophilic structural unit (A)) and the hydrophobic structural unit (B) described later, the content of acrylic acid and/or methacrylic acid is determined by "100−(% by mass of the hydrophobic structural unit)".

The hydrophilic structural units (A) may be used alone or as a mixture of two or more of them.

—Hydrophobic Structural Unit—

In embodiments, the water-insoluble polymer may preferably further have at least one hydrophobic structural unit (B) other than the structural unit having an acidic group. There is no particular limitation to the hydrophobic structural unit in the water-insoluble polymer as long as it contains at least one hydrophobic functional group. In embodiments, the hydrophobic structural unit may preferably include at least one structural unit having an aromatic ring, and may more preferably include a structural unit represented by the following Formula (1).

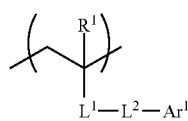

Formula (1)

In Formula (1), $R_1$ represents a hydrogen atom or a methyl group. $L_1$ represents an unsubstituted or substituted phenylene group. $L_2$ represents a single bond or a divalent linking group. $Ar^1$ represents a monovalent group derived from a condensed aromatic ring having 8 or more carbon atoms, a heterocycle having an aromatic ring condensed therein, or a compound having two or more benzene rings linked to each other.

In Formula (1), $R_1$ represents a hydrogen atom or a methyl group, and preferably a methyl group.

$L_1$ represents an unsubstituted or substituted phenylene group. An unsubstituted phenylene group is preferable as $L_1$. $L_2$ represents a single bond or a divalent linking group. The divalent linking group is preferably a linking group having 1 to 30 carbon atoms, more preferably a linking group having 1 to 25 carbon atoms, even more preferably a linking group having 1 to 20 carbon atoms, and particularly preferably a linking group having 1 to 15 carbon atoms. Particularly preferable examples of the linking group include an alkyleneoxy group having 1 to 25 carbon atoms (more preferably 1 to 10 carbon atoms), an imino group (—NH—), a sulfamoyl group, a divalent linking group including an alkylene group such as an alkylene group having 1 to 20 carbon atoms (more preferably 1 to 15 carbon atoms) or an ethylene oxide group [—(CH$_2$CH$_2$O)$_n$—, n=1 to 6], and a combination of two or more thereof.

$Ar^1$ represents a monovalent group derived from a condensed aromatic ring having 8 or more carbon atoms, a heterocycle having an aromatic ring condensed therein, or a compound having two or more benzene rings linked to each other.

The "condensed aromatic ring having 8 or more carbon atoms" may be an aromatic ring having two or more benzene rings condensed therein or an aromatic ring having 8 or more carbon atoms composed of at least one aromatic ring and a ring formed by an alicyclic hydrocarbon condensed with the aromatic ring. Specific examples include naphthalene, anthracene, fluorene, phenanthrene, and acenaphthene.

The "heterocycle having an aromatic ring condensed therein" is a compound consisting of a heteroatom-free aromatic compound (preferably a benzene ring) and a heteroatom-containing cyclic compound condensed with each other. The heteroatom-containing cyclic compound is preferably a five- or six-membered ring. The heteroatom is preferably a nitrogen atom, an oxygen atom or a sulfur atom. The heteroatom-containing cyclic compound may have a plurality of heteroatoms. In this case, the heteroatoms may be the same as or different from each other. Specific examples of the heterocycle having an aromatic ring condensed therein include phthalimide, acridone, carbazole, benzoxazole, and benzothiazole.

Examples of the compound having two or more benzene rings linked to each other include compounds having two or more benzene rings linked to each other via a single bond or a linking group having 1 or 2 carbon atoms.

Specific examples of the monovalent group derived from a compound having two or more benzene rings linked to each other include a biphenyl group, a terphenyl group, a diphenylmethyl group, a triphenylmethyl group and the like.

Specific examples of monomers that forms the structural unit represented by Formula (1) include the following monomers. The present invention is not limited to these monomers.

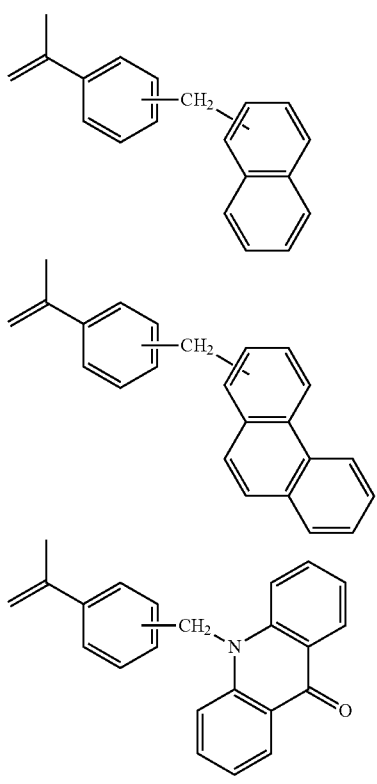

M-25/M-27

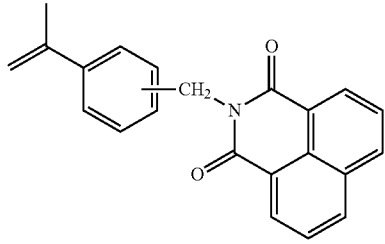

M-28/M-29

M-25/M-27

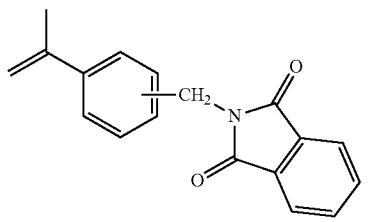

M-28/M-29

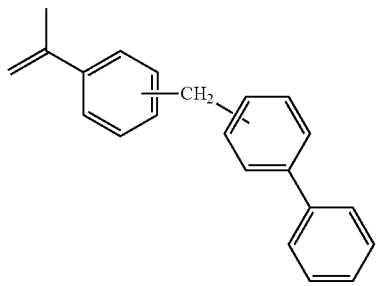

M-25/M-27 represents a mixture of monomers M-25 and M-27, each of which has the substituent at m- or p-position.

M-28/M-29 represents a mixture of monomers M-28 and M-29, each of which has the substituent at m- or p-position.

$Ar^1$ in the structural unit represented by Formula (1) is preferably a monovalent group derived from acridone or phthalimide from the viewpoint of the dispersion stability of the coated pigment, and more preferably a monovalent group derived from acridone.

As the structural unit represented by Formula (1), from the viewpoint of dispersion stability of the pigment, a structural unit that is specified by selecting an unsubstituted phenylene group as $L_1$, a divalent linking group (preferably methylene) as $L_2$, and a monovalent group derived from acridone as $Ar^1$ is preferable.

The content of the structural unit represented by Formula (1) in the copolymer is preferably in the range of from 5% by mass to 25% by mass, with respect to the total mass of the copolymer, and more preferably in the range of from 10% by mass to 18% by mass.

When the content is 5% by mass or more, generation of image defects such as white spots tends to be suppressed markedly desirably, on the other hand, when the content is 25% by mass or less, problems of production suitability caused by lowering the solubility of the copolymer in a polymerization reaction liquid (for example, methyl ethyl ketone) tend not to be brought about desirably.

The water-insoluble resin in the preferable exemplary embodiment of the invention may include a structural unit represented by the following Formula (2) other than the structural unit represented by Formula (1).

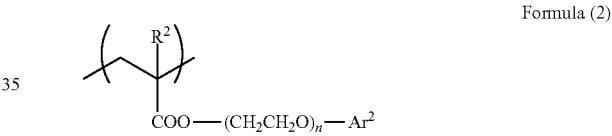

Formula (2)

In Formula (2), $R^2$ represents a hydrogen atom or a methyl group, and preferably a methyl group. $Ar^2$ represents a monovalent group derived from an unsubstituted or substituted aromatic ring (aromatic ring group). When the aromatic ring is substituted by a substituent, examples of the substituent include a halogen atom, an alkyl group, an alkoxy group, a hydroxy group, a cyano group and, an alkoxycarbonyl group, and the aromatic ring may form a condensed ring. When the aromatic ring forms a condensed ring, the condensed ring may be, for example, a condensed aromatic ring having 8 or more carbon atoms, or an aromatic ring having a heterocycle condensed therein. Further, $Ar^2$ may be a monovalent group derived from a compound having two or more aromatic rings linked to each other.

In Formula (2), each of "a condensed aromatic ring having 8 or more carbon atoms" and "an aromatic ring having a heterocycle condensed therein" has the same definition as "a condensed aromatic ring having 8 or more carbon atoms" and "an aromatic ring having a heterocycle condensed therein" in Formula (1) respectively. Further, "a monovalent group derived from a compound having two or more aromatic rings linked to each other" in Formula (2) preferably includes "a monovalent group derived from a compound having two or more aromatic rings linked to each other" in Formula (1).

The aromatic ring group represented by $Ar^2$ is linked via an ester group and an ethylene oxide chain to the main chain of the water-insoluble resin, and the aromatic ring group is not directly linked to the main chain, and thus a suitable distance is maintained between the hydrophobic aromatic ring and the hydrophilic structural unit, so that the water-insoluble resin interacts readily with, and is adsorbed firmly onto, a pigment to improve dispersibility.

In particular, the aromatic ring group represented by $Ar^2$ is preferably an unsubstituted phenyl group or an unsubstituted naphthyl group, and particularly preferably an unsubstituted phenyl group.

n is an average repeating number of the ethyleneoxy units in the water-insoluble resin used for the resin-coated pigment contained in the aqueous ink composition. n is in the range of 1 to 6, and preferably 1 to 2.

Specific examples of monomers that forms the structural unit represented by Formula (2) include the following monomers.

structural unit (A) and a hydrophobic structural unit (B), from the viewpoint of allowing the water-insoluble resin to be stably present in an aqueous ink, to reduce adhesion or deposition of the aggregate, and to facilitate removal of the adhered aggregate. Herein, the hydrophobic structural unit (B) preferably includes the structural unit represented by Formula (1) or Formula (2) above.

The water-insoluble resin of the present invention may further have an additional hydrophobic structural unit (B') other than the structural unit represented by Formula (1) and the structural unit represented by Formula (2). Examples of the hydrophobic structural unit (B') may include a structural units derived from vinyl monomers such as (meth)acrylates, (meth)acrylamides, styrenes or vinylesters which do not

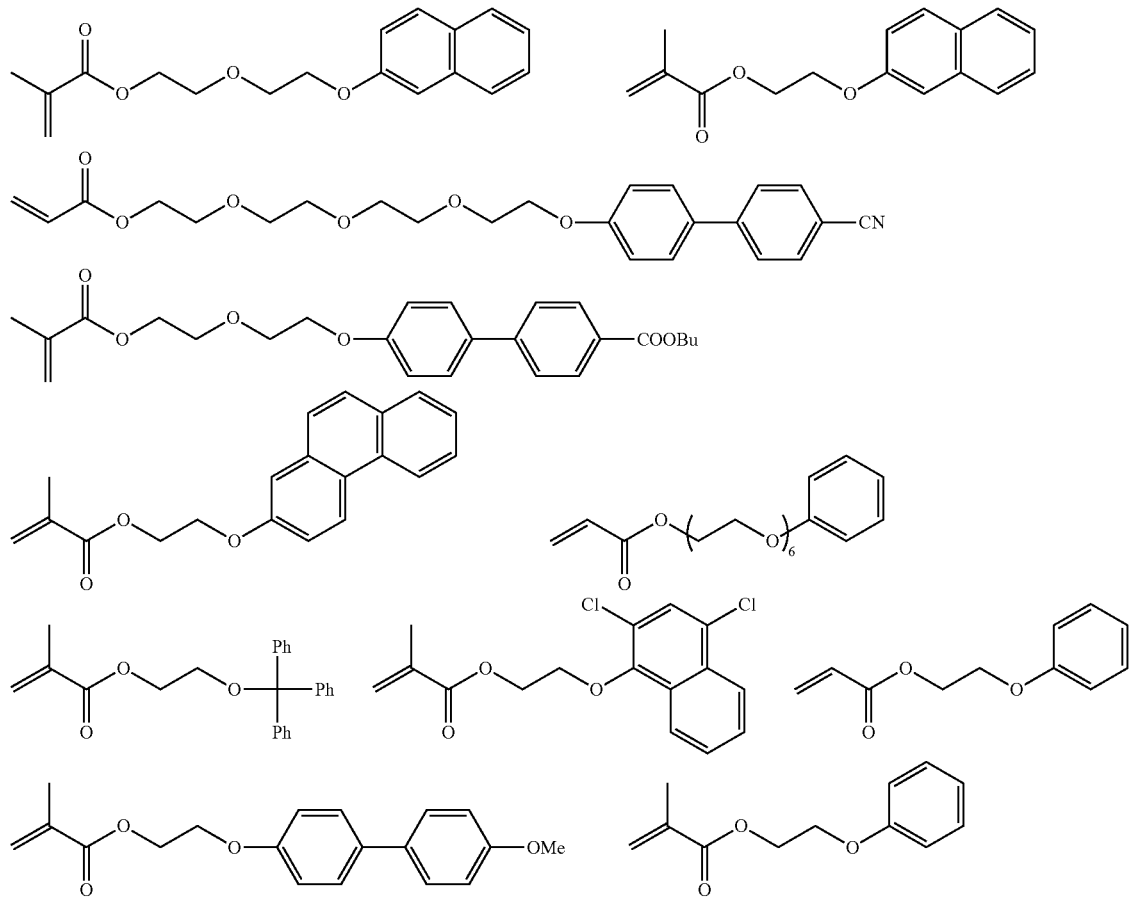

From the viewpoint of dispersion stability, it is particularly preferable that in the structural unit represented by Formula (2), $R^2$ is a methyl group, $Ar^2$ is an unsubstituted phenyl group, and n is 1 to 2.

The content of the structural unit of Formula (1) in the water-insoluble resin is preferably in the range of 30% by mass to 70% by mass, and more preferably in the range of 40% by mass to 50% by mass, based on the total mass of the water-insoluble resin. When the content is 30% by mass or more, dispersibility is good, and when the content is 70% by mass or less, the adhesion and deposition of the aggregate may be prevented, the removability of adhered aggregate (maintenance properties) is good, and generation of imaging defects such as white spots may be prevented.

The water-insoluble resin in the exemplary embodiment of the invention is preferably a resin including a hydrophilic belong to the hydrophilic structural unit (A) (for example, those having no hydrophilic functional group), a hydrophobic structural unit having an aromatic ring that is linked to an atom of the main chain thereof through a linking group, and the like. These structural units may be used one kind alone or two or more kinds in combination.

Examples of the (meth)acrylates include methyl (meth)acrylate, ethyl (meth)acrylate, butyl (meth)acrylate, isobutyl (meth)acrylate, and hexyl (meth)acrylate. Among them, methyl (meth)acrylate, ethyl (meth)acrylate, and butyl (meth)acrylate are preferable, and methyl (meth)acrylate and ethyl (meth)acrylate are particularly preferable.

Examples of the (meth)acrylamides include N-cyclohexyl (meth)acrylamide, N-(2-methoxyethyl) (meth)acrylamide, N,N-diallyl (meth)acrylamide, and N-allyl (meth)acrylamide.

Examples of the styrenes include styrene, methylstyrene, dimethylstyrene, trimethylstyrene, ethylstyrene, isopropylstyrene, n-butylstyrene, tert-butylstyrene, methoxystyrene, butoxystyrene, acetoxystyrene, chlorostyrene, dichlorostyrene, bromostyrene, chloromethylstyrene, hydroxystyrene protected by a group removable with an acidic substance (for example, t-Boc), methyl vinyl benzoate, α-methylstyrene, and vinylnaphthalene. Among them, styrene and α-methylstyrene are preferable.

Examples of the vinyl esters include vinyl acetate, vinyl chloroacetate, vinyl propionate, vinyl butyrate, vinyl methoxyacetate, and vinyl benzoate. Among them, vinyl acetate is preferable.

The above-described "hydrophobic structural unit containing an aromatic ring that is linked to an atom in the main chain via a linking group" is preferably a structural unit wherein the proportion of the aromatic ring linked to an atom in the main chain of the copolymer via a linking group is from 15% by mass to 27% by mass, more preferably from 15% by mass to 25% by mass, and even more preferably from 15% by mass to 20% by mass with respect to the copolymer.

The aromatic ring is linked to the atom in the main chain of the copolymer not directly but via a linking group. Therefore, an adequate distance is kept between the hydrophobic aromatic ring and the hydrophilic structural unit, so that the copolymer readily interacts with the pigment and is firmly adsorbed thereon, thus improving the dispersibility of the pigment.

The "hydrophobic structural unit containing an aromatic ring that is linked to an atom in the main chain via a linking group" is preferably a structural unit represented by the following Formula (3) (excluding the structural unit represented by Formula (1) and the structural unit represented by Formula (2)).

Formula (3)

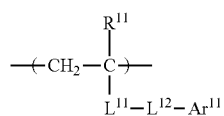

In Formula (3), $R^{11}$ represents a hydrogen atom, a methyl group, or a halogen atom. $L^{11}$ represents *—COO—, *—COO—, *—CONR$^{12}$—, or *—O—, and $R^{12}$ represents a hydrogen atom or an alkyl group having 1 to 10 carbon atoms. In the group represented by $L^{11}$, an asterisk (*) denotes a bond connected to the main chain.

$L^{12}$ represents a single bond or a divalent linking group having 1 to 30 carbon atoms. When $L^{12}$ is a divalent linking group, it is preferably a linking group having 1 to 25 carbon atoms, more preferably a linking group having 1 to 20 carbon atoms, and even more preferably a linking group having 1 to 15 carbon atoms.

Among them, particularly preferable examples include an alkyleneoxy group having 1 to 25 (more preferably 1 to 10 carbon atoms) carbon atoms, an imino group (—NH—), a sulfamoyl group, and divalent linking groups containing an alkylene group, such as an alkylene group having 1 to 20 carbon atoms (more preferably 1 to 15 carbon atoms) or an ethylene oxide group [—(CH$_2$CH$_2$O)$_n$—, n=1 to 6], and combinations of two or more of these groups.

In Formula (3), $Ar^{11}$ represents a monovalent group derived from an aromatic ring.

The aromatic ring group which derives the monovalent group represented by $Ar^{11}$ is not particularly limited, and examples of the aromatic ring include a benzene ring, a condensed aromatic ring having eight or more carbon atoms, an aromatic ring condensed with a heterocycle, and a compound having two or more benzene rings linked to each other. The details about the condensed aromatic ring having eight or more carbon atoms, the aromatic ring condensed with a heterocycle, and a compound having two or more benzene rings linked to each other have been described above.

Specific examples of a monomer capable of forming the "hydrophobic structural unit containing an aromatic ring that is linked to an atom in the main chain via a linking group" are shown below. However, the invention is not limited to the following specific examples.

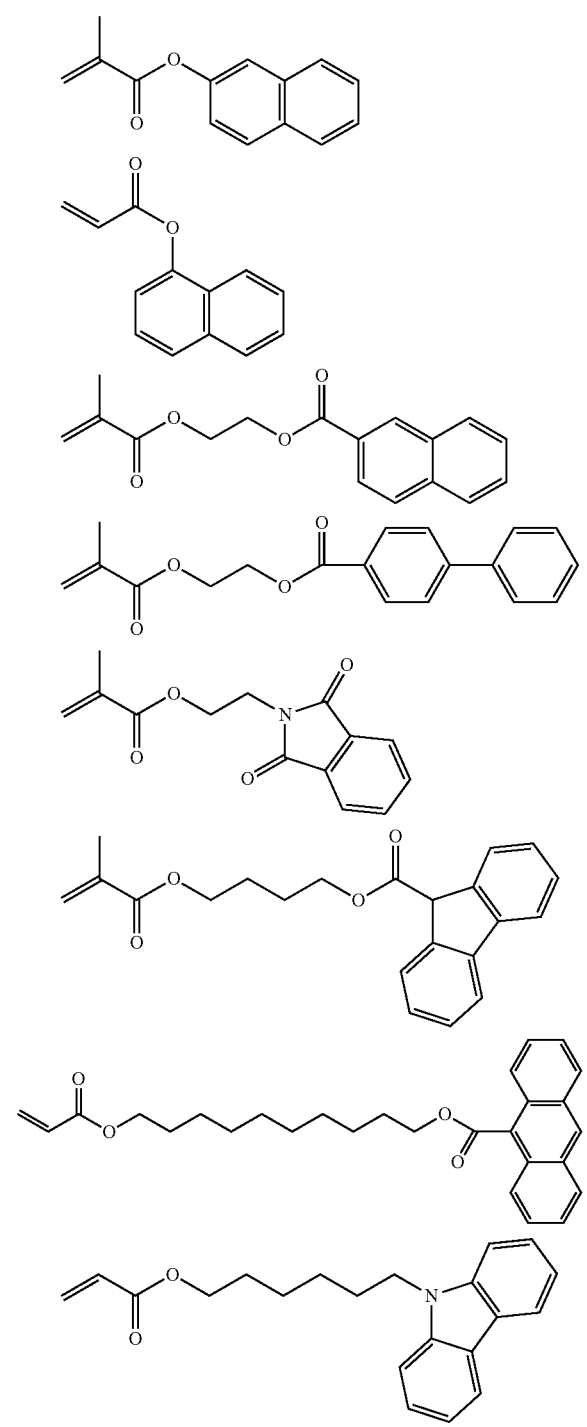

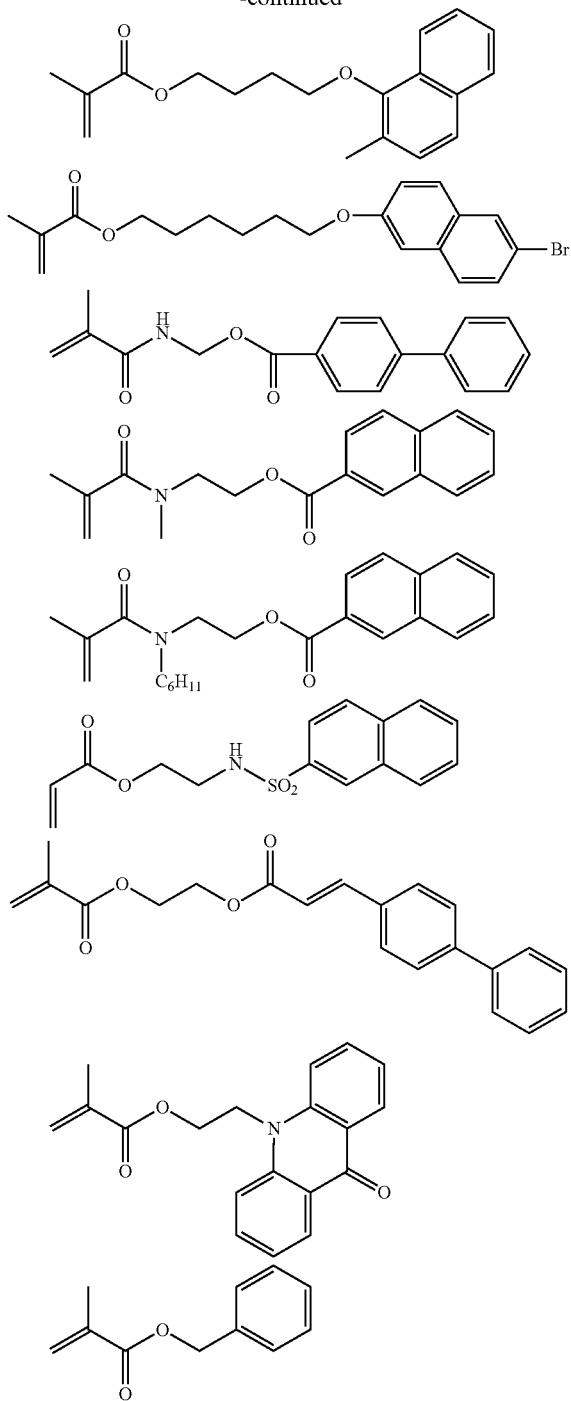

The water-insoluble resin of the present invention is, among the above, preferably characterized in that the hydrophilic structural unit (A) is (meth)acrylic acid and the hydrophobic structural unit (B) is at least one kind selected from (i) a structural unit represented by Formula (1) (preferably a structural unit derived from the foregoing M-25/M-27 or M-28/M-29), (ii) a structural unit represented by Formula (2) (preferably a structural unit derived from phenoxyethyl (meth)acrylate), and (iii) a hydrophobic structural unit (B') other than the foregoing structural units (preferably a structural unit derived from methyl (meth)acrylate, ethyl (meth)acrylate, or benzyl methacrylate).

Furthermore, the water-insoluble resin of the present invention is preferably characterized in that the hydrophilic structural unit (A) is (meth)acrylic acid and the hydrophobic structural unit (B) contains at least one kind of the above (i) and (ii).

Particularly, the water-insoluble resin of the present invention is preferably characterized in that the hydrophilic structural unit (A) is (meth)acrylic acid and the hydrophobic structural unit (B) contains at least one kind of the above (i) and (ii) and further contains (iii).

In the water-insoluble resin in the exemplary embodiment of the invention, although the ratio of the hydrophilic structural unit (A) to the hydrophobic structural unit (B) (including the structural unit represented by Formula (2), the structural unit represented by Formula (1) and the other hydrophobic structural units (B') depends on the degrees of the hydrophilicity and hydrophobicity of these components, the content of the hydrophilic structural units (A) in the water-insoluble resin is preferably 15% by mass or less. The content of the hydrophobic structural units (B) is preferably more than 80% by mass, and more preferably 85% by mass or more with respect to the total mass of the water-insoluble resin.

When the content of the hydrophilic structural unit (A) is 15% by mass or less, the amount of the component that dissolves itself in the aqueous medium is decreased, which results in the improvement of pigment properties such as dispersibility, whereby good ink ejection properties are achieved during inkjet recording.

The content ratio of the hydrophilic structural unit (A) is preferably more than 0% by mass but 15% by mass or less, more preferably from 2% by mass to 15% by mass, even more preferably from 5% by mass to 15% by mass, and particularly preferably from 8% by mass to 12% by mass with respect to the total mass of the water-insoluble resin.

In embodiments, the acid value of the water-insoluble resin is preferably from 30 mgKOH/g to 100 mgKOH/g, more preferably from 30 mgKOH/g to 85 mgKOH/g, and particularly preferably from 50 mgKOH/g to 85 mgKOH/g from the viewpoints of pigment dispersibility and storage stability.

The acid value is defined as the mass (mg) of KOH necessary for completely neutralizing 1 g of the water-insoluble resin, and measured by the method described in Japanese Industrial Standard (JIS K0070, 1992), the disclosure of which is incorporated by reference herein.

The weight average molecular weight (Mw) of the water-insoluble resin in the exemplary embodiment of the invention is preferably 30,000 or more, more preferably from 30,000 to 150,000, even more preferably from 30,000 to 100,000, and particularly preferably from 30,000 to 80,000. If the molecular weight is 30000 or more, the water-insoluble resin may provide a good steric repulsion effect as a dispersant, and is readily adsorbed on the pigment owing to the steric effect.

The number average molecular weight (Mn) of the water-insoluble resin is preferably about 1,000 to about 100,000, and particularly preferably about 3,000 to about 50,000. When the number average molecular weight is within the above-described range, the water-insoluble resin may serve as a coating on the pigment or a coating of the ink composition. The water-insoluble resin in the exemplary embodiment of the invention is preferably used in the form of an alkali metal salt or an organic amine salt.

The molecular weight distribution of the water-insoluble resin in the exemplary embodiment of the invention (weight average molecular weight/number average molecular weight) is preferably from 1 to 6, and more preferably from 1 to 4.

When the molecular weight distribution is within the above-described range, the resulting ink has improved dispersion stability and ejection stability.

The number average molecular weight and the weight average molecular weight are measured by the differential refractometer detection with THF as a solvent in a GPC analyzer using columns TSKgel Super HZM-H, TSKgel Super HZ4000 and TSKgel Super HZ2000 (trade name; all manufactured by Tosoh Corporation), and is obtained in terms of polystyrene used as a reference material.

The water-insoluble resin in the exemplary embodiment of the invention may be synthesized by any polymerization method, for example, solution polymerization, precipitation polymerization, suspension polymerization, bulk polymerization, or emulsion polymerization. The polymerization reaction may be carried out under a known system, such as a batch, semi-continuous, or continuous system. Initiation of the polymerization may be carried out with a radical initiator, or photoirradiation or radiation-irradiation. These methods of polymerization and initiation of polymerization are described in, for example, "Kobunshi Gosei Hoho" by Teiji Tsuruta, Revised Edition (published by Nikkan Kogyo Shimbun, Ltd., 1971) and "Kobunshi Gosei no Jikkenho" by Takayuki Ohtu and Masaetu Kinoshita (published by Kagaku-Dojin Publishing Company Inc., 1972) pages 124 to 154.

Among these polymerization methods, a solution polymerization method using a radical initiator is preferable. Examples of the solvent used in the solution polymerization method include various organic solvents such as ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol, and 1-butanol. These solvents may be used alone or in a combination of two or more of them, or may be mixed with water as a mixed solution. The polymerization temperature should be chosen in consideration of the molecular weight of the intended polymer and the type of the initiator, and is usually from 0° C. to 100° C., and is preferably from 50° C. to 100° C. The reaction pressure may be appropriately selected, and is usually from 1 kg/cm$^2$ to 100 kg/cm$^2$, and particularly preferably from about 1 kg/cm$^2$ to about 30 kg/cm$^2$. The reaction period may be about 5 hours to about 30 hours. The resulting resin may be subjected to purification treatment such as reprecipitation.

Specific examples of preferable water-insoluble resins in the exemplary embodiment of the invention are shown below. The invention is not limited to these examples. In the following Formula, a, b and c each independently represent the content of the correspondent structural unit % by mass in the polymer.

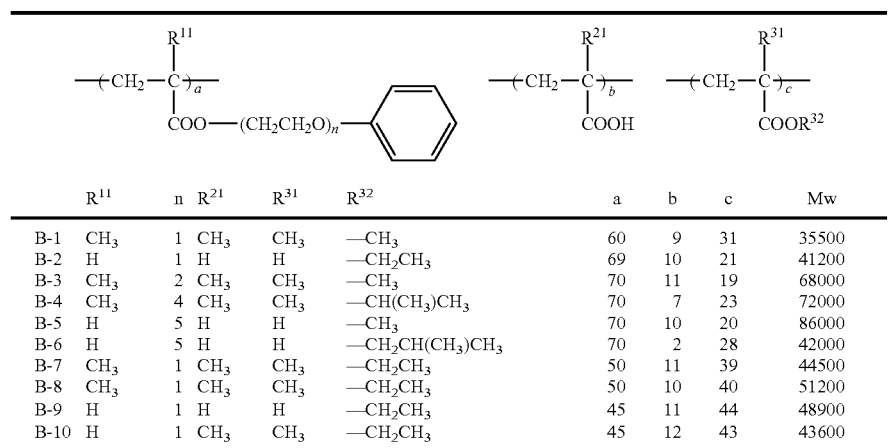

| | $R^{11}$ | n | $R^{21}$ | $R^{31}$ | $R^{32}$ | a | b | c | Mw |
|---|---|---|---|---|---|---|---|---|---|
| B-1 | CH$_3$ | 1 | CH$_3$ | CH$_3$ | —CH$_3$ | 60 | 9 | 31 | 35500 |
| B-2 | H | 1 | H | H | —CH$_2$CH$_3$ | 69 | 10 | 21 | 41200 |
| B-3 | CH$_3$ | 2 | CH$_3$ | CH$_3$ | —CH$_3$ | 70 | 11 | 19 | 68000 |
| B-4 | CH$_3$ | 4 | CH$_3$ | CH$_3$ | —CH(CH$_3$)CH$_3$ | 70 | 7 | 23 | 72000 |
| B-5 | H | 5 | H | H | —CH$_3$ | 70 | 10 | 20 | 86000 |
| B-6 | H | 5 | H | H | —CH$_2$CH(CH$_3$)CH$_3$ | 70 | 2 | 28 | 42000 |
| B-7 | CH$_3$ | 1 | CH$_3$ | CH$_3$ | —CH$_2$CH$_3$ | 50 | 11 | 39 | 44500 |
| B-8 | CH$_3$ | 1 | CH$_3$ | CH$_3$ | —CH$_2$CH$_3$ | 50 | 10 | 40 | 51200 |
| B-9 | H | 1 | H | H | —CH$_2$CH$_3$ | 45 | 11 | 44 | 48900 |
| B-10 | H | 1 | CH$_3$ | CH$_3$ | —CH$_2$CH$_3$ | 45 | 12 | 43 | 43600 |

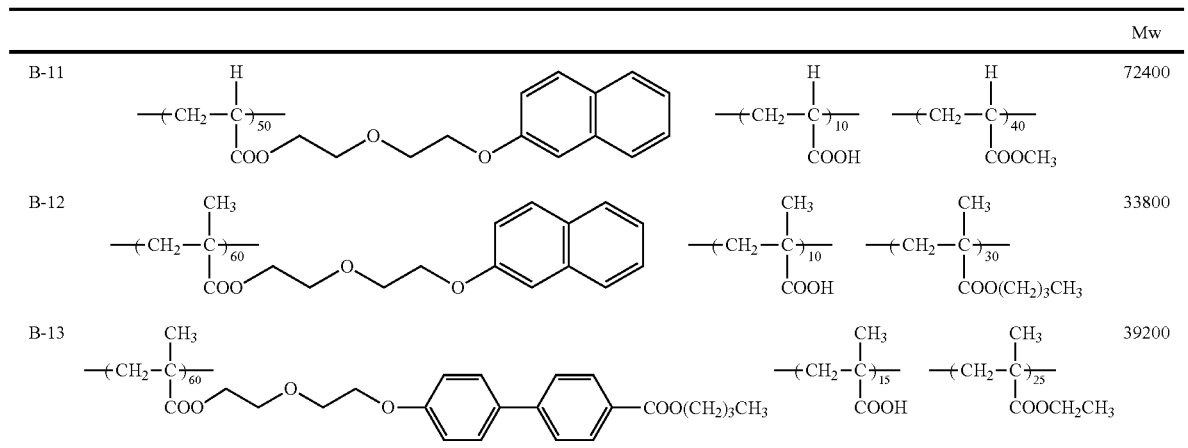

| | Mw |
|---|---|
| B-11 | 72400 |
| B-12 | 33800 |
| B-13 | 39200 |

The weight ratio (p:r) between the pigment (p) and the water-insoluble resin (r) in the exemplary embodiment of the invention is preferably from 100:25 to 100:140, and more preferably from 100:25 to 100:50. When the proportion of the water-insoluble resin is 25 or more, dispersion stability and abrasion resistance tend to improve, and when 140 or less, dispersion stability tends to improve.

The resin-coated pigment (capsulated pigment) in the exemplary embodiment of the invention may be produced using a water-insoluble resin and a pigment by a known physical or chemical method such as that described in JP-A Nos. 9-151342, 10-140065, 11-209672, 11-172180, 10-25440, and 11-43636. Specific examples of the method include the phase inversion method and acid precipitation method described in JP-A Nos. 9-151342 and 10-140065. Of these methods, the phase inversion method is preferable from the viewpoint of dispersion stability.

Basically, the phase inversion method is a self dispersion (phase inversion emulsification) method comprising dispersing in water a mixed melt of a pigment and a resin having self dispersibility or solubility. The mixed melt may contain a curing agent or a polymer compound. The mixed melt refers to a state where undissolved components are mixed and/or a state where dissolved components are mixed. Details about the "phase inversion method" are described in JP-A No. 10-140065.

In the ink composition in the exemplary embodiment of the invention, the resin-coated pigment is preferably prepared using the water-insoluble resin through a preparation method of preparing a dispersion of the resin-coated pigment including, for example, the following steps (1) and (2). The ink composition of the exemplary embodiment of the invention may be prepared by preparing a dispersion of the resin-coated pigment in accordance with the above-described preparation method, followed by preparing an ink composition from the obtained dispersion of the resin-coated pigment, water, and a hydrophilic organic solvent.

Step (1): a mixture containing a water-insoluble resin including the structural unit having an acidic group, an organic solvent, a neutralizing agent, a pigment, and water is dispersed with a stirrer or the like to obtain a dispersion.

Step (2): at least a part of the organic solvent is removed from the dispersion.

The stirring method is not particularly limited, and may use a common mixing stirrer or, if necessary, a disperser such as an ultrasonic disperser, a high-pressure homogenizer, or a bead mill.

Examples of the organic solvent preferable herein include alcohol solvents, ketone solvents, and ether solvents. Examples of the alcohol solvents include isopropyl alcohol, n-butanol, t-butanol, and ethanol. Examples of the ketone solvents include acetone, methyl ethyl ketone, diethyl ketone, and methyl isobutyl ketone. Examples of the ether solvents include dibutyl ether and dioxane. Among these solvents, ketone solvents such as methyl ethyl ketone and alcohol solvents such as isopropyl alcohol are preferable, and methyl ethyl ketone is more preferable.

The neutralizing agent may be preferably used in the process (1) for neutralizing a part or all of the acidic groups so that the water-insoluble resin can form a stable emulsion or dispersion in water. Examples of the neutralizing agent include alcohol amines (such as diethanolamine, triethanolamine, and 2-amino-2-ethyl-1,3-propanediol), alkali metal hydroxides (such as lithium hydroxide, sodium hydroxide, and potassium hydroxide), ammonium hydroxide (such as ammonium hydroxide and quaternary ammonium hydroxide), phosphonium hydroxides, and alkali metal carbonates. Among them, sodium hydroxide and potassium hydroxide may be preferably used.

The water-insoluble resin may have a neutralization degree of from 70% to 95%. When the neutralization degree is 70% or higher, generation of white spots in an image formed from the ink may be suppressed. When the neutralization degree is 95% or lower, abrasion resistance of an image formed from the ink may be improved.

The neutralization degree may be preferably from 70% to 90%, and more preferably from 75% to 90%. By adjusting the neutralization degree within the above range, generation of white spots in an image formed from the ink may be effectively suppressed, and abrasion resistance of an image formed from the ink may be effectively improved.

The "neutralization degree" herein referred is a ratio (%) of an equivalent of a neutralizer with respect to one equivalent of the acid group. Namely, the neutralization degree of the water-insoluble resin is defined as a ratio of the total equivalence of the neutralizer to the total equivalence of the acid group contained in the water-insoluble resin, and is obtained in accordance with the following equality.

Neutralization degree of water-insoluble resin= (total equivalence of neutralizer)/total equivalence of acid group in water-insoluble resin)×100 (%)

In the process (2), the organic solvent is evaporated from the dispersion prepared in the process (1) by a common procedure such as vacuum distillation to convert the phase into a water system, thereby obtaining a dispersion of resin-coated pigment particles, the particle surface of the pigment being coated with the water-insoluble resin. The obtained dispersion is substantially free from the organic solvent. The amount of the organic solvent may be preferably 0.2% by mass or less, and more preferably 0.1% by mass or less.

More specifically, the method for forming the dispersion of the water-insoluble resin may include: (1) mixing an acid group-containing water-insoluble resin or its solution in an organic solvent with a basic compound (neutralizing agent), thereby carrying out neutralization; (2) mixing the obtained mixed solution with a pigment to make a suspension, and then subjecting the suspension to dispersing by using a disperser or the like to obtain a pigment dispersion; and (3) removing the organic solvent by, for example, distillation, thereby coating the pigment with a water-insoluble resin having a structural unit having an acid group, and dispersing the coated pigment particles in an aqueous medium to provide an aqueous dispersion.

The method is further specifically described in JP-A Nos. 11-209672 and 11-172180.

The dispersing may be carried out by using, for example, a ball mill, a roll mill, a bead mill, a high-pressure homogenizer, a high-speed stirring disperser, or an ultrasonic homogenizer.

The average particle diameter of the pigment covered with the water-insoluble resin may be preferably in the range of 10 nm to 200 nm, more preferably in the range of 10 nm to 150 nm, and even more preferably in the range of 10 nm to 100 nm. When the average particle diameter is 200 nm or less, the color reproducibility and dotting property of the ink under inkjet recording system may become favorable. When the average particle diameter is 10 nm or more, light fastness may become favorable.

There is no particular limitation to the particle size distribution of the pigment covered with the water-insoluble resin. The polymer particles may have either a broad particle size distribution or a monodisperse particle size distribution. Two or more colored particles, each of which having a monodisperse particle size distribution, may be used in combination as a mixture.

The average particle diameter and the particle size distribution of the pigment covered with the water-insoluble resin may be measured by, for example, the dynamic light scattering method.

The pigment covered with the water-insoluble resin may be used singly or in a combination of two or more thereof.

From the viewpoint of the density of an image formed from the ink composition, the content of the pigment covered with the water-insoluble resin in the ink composition may be preferably from 0.1% by mass to 25% by mass, more preferably from 1% by mass to 20% by mass, even more preferably from 1.5% by mass to 15% by mass, and further preferably from 1.5% by mass to 10% by mass, with respect to the total amount of the ink composition.

The ratio of the content of colloidal silica to the content of the water-insoluble resin (colloidal silica/water-insoluble resin) in the ink composition may be preferably from 0.0001 to 0.5, more preferably from 0.0001 to 0.3, and even more preferably from 0.001 to 0.05, in terms of mass from the viewpoints of suppression of shape deformation due to erosion of the nozzle plate and suppression of deterioration of the liquid-repellency of the inkjet head member.

In embodiments which may be preferable in view of ink ejection reliability, abrasion resistance of an image formed from the ink composition, and suppression of deterioration of the liquid-repellency of the inkjet head member, the water-insoluble resin may have an acid value of from 50 mgKOH/g to 90 mgKOH/g, the colloidal silica may have a volume-average particle diameter of from 3 nm to 50 nm, and the ratio of the content of colloidal silica to the content of the water-insoluble resin (colloidal silica/water-insoluble resin) may be from 0.0001 to 0.3; and in more preferable embodiments, in the ink composition, the water-insoluble resin may have an acid value of from 55 mgKOH/g to 80 mgKOH/g, the colloidal silica may have a volume-average particle diameter of from 3 nm to 25 nm, and the ratio of the content of colloidal silica to the content of the water-insoluble resin (colloidal silica/water-insoluble resin) may be from 0.001 to 0.05.

[Hydrophilic Organic Solvent]

The ink composition of the exemplary embodiment of the invention preferably includes a water-based medium. The water-based medium contains at least water as a solvent, but preferably contains water and at least one hydrophilic organic solvent. The hydrophilic organic solvent is capable of enhancing effects such as anti-drying, wetting, or penetration promoting.

An anti-drying agent or a wetting agent is used for the purpose of preventing the clogging caused as the ink for inkjet recording dries up at the ink spray orifice of a nozzle. The anti-drying agent or wetting agent is preferably a hydrophilic organic solvent having a lower vapor pressure than water.

Furthermore, for the purpose of making the ink composition penetrate easily into paper, a hydrophilic organic solvent is suitably used as a penetration promoting agent.

The ink composition of the exemplary embodiment of the invention preferably includes at least one type of a first hydrophilic organic solvent having an I/O value of from 0.70 to less than 1.0. When the I/O value of the first hydrophilic organic solvent is less than 1.00, compatibility with the self-dispersing polymer particles is enhanced, the fixability of the image formed is more effectively enhanced, and the abrasion resistance of the image is further enhanced. When the I/O value of the first hydrophilic organic solvent is 0.70 or more, the stability of the ink composition is enhanced.

The I/O value of the hydrophilic organic solvent has the same definition as that in the self-dispersing polymer which is described below, and is calculated in a manner substantially similar to that in the calculation of the I/O value for the self-dispersing polymer.

It is preferable that the ink composition of the exemplary embodiment of the invention further includes at least one of a second hydrophilic organic solvent having an I/O value of 1.00 to 1.50, in addition to the first hydrophilic organic solvent. When the I/O value of the second hydrophilic organic solvent is 1.00 or more, the stability of the ink composition is more effectively enhanced. When the I/O value of the second hydrophilic organic solvent is 1.50 or less, deterioration of the fixation properties of the formed image can be suppressed.

Specific examples of the first hydrophilic organic solvent having an I/O value of 0.70 or more and less than 1.00 include glycol ethers. Propylene glycol ether or ethylene glycol ether is preferable, and propylene glycol ether is more preferable. Specific examples include triprolene glycol monomethyl ether (I/O value: 0.80), triprolene glycol monoethyl ether (I/O value: 0.73), triprolene glycol monobutyl ether (I/O value: 0.61), diprolene glycol monoethyl ether (I/O value: 0.78), diprolene glycol monobutyl ether (I/O value: 0.70), and prolene glycol monobutyl ether (I/O value: 0.88).

Among these, triprolene glycol monomethyl ether (I/O value: 0.80) is preferable from the viewpoints of image fixability and ink stability.

Specific examples of the second hydrophilic organic solvent having an I/O value of 1.0 to 1.5, include propylene glycol monomethyl ether (I/O value: 1.50), propylene glycol monoethyl ether (I/O value: 1.20), diethylene glycol monobutyl ether (I/O value: 1.40), triethylene glycol monobutyl ether (I/O value: 1.20), 2,2-diethyl-1,3-propanediol (I/O value: 1.43), 2-methyl-2-propyl-1,3-propanediol (I/O value: 1.43), 2,4-dimethyl-2,4-pentanediol (I/O value: 1.43), 2,5-dimethyl-2,5-hexanediol (I/O value: 1.25), tripropylene glycol (I/O value: 1.33), SANNIX GP250 (trade name, I/O value: 1.30, manufactured by Sanyo Chemical Industries, Ltd.), and the like. Among them, SANNIX GP250 is preferable from the viewpoints of image fix properties and ink stability.

The content of the first hydrophilic organic solvent in the ink composition for inkjet recording of the exemplary embodiment of the invention is preferably 0.1% by mass to 20% by mass, more preferably 1% by mass to 16% by mass, and further preferably 2% by mass to 12% by mass, from the viewpoints of image fix properties and ink stability.

Furthermore, it is preferable that the ink composition includes, as the first hydrophilic organic solvent, a hydrophilic organic solvent whose I/O value is selected from the range of 0.70 or more and less than 1.00, in an amount of 1 to 16% by mass, and it is more preferable that the ink composition includes a hydrophilic organic solvent whose I/O value is selected from the range of 0.70 or more and less than 0.90, in an amount of 2% by mass to 12% by mass.

The content of the second hydrophilic organic solvent in the ink composition for inkjet recording of the exemplary embodiment of the invention is preferably 0.1% by mass to 20% by mass, more preferably 1% by mass to 16% by mass, and further preferably 2% by mass to 12% by mass, from the viewpoints of image fix properties and ink stability.

Furthermore, it is preferable that the ink composition includes, as the second hydrophilic organic solvent, a hydrophilic organic solvent whose I/O value is selected from the range of 1.00 to 1.50, in an amount of 1% by mass to 16% by mass, and it is more preferable that the ink composition includes a hydrophilic organic solvent whose I/O value is selected from the range of 1.20 to 1.40, in an amount of 2% by mass to 12% by mass.

Furthermore, the content ratio of the second hydrophilic organic solvent to the first hydrophilic organic solvent in the ink composition for inkjet recording of the exemplary embodiment of the invention (second hydrophilic organic solvent/first hydrophilic organic solvent) is preferably 1/10 to 10/1, more preferably 1/4 to 4/1, and further preferably 1/2 to 2/1, from the viewpoints of image fix properties and ink stability.

The ink composition of the exemplary embodiment of the invention may further include another hydrophilic organic solvent, in addition to the first hydrophilic organic solvent and the second hydrophilic organic solvent. As for the other hydrophilic organic solvent, polyhydric alcohols are useful for the purpose of functioning as an anti-drying agent or a wetting agent, and examples include glycerin (I/O value: 5.00), ethylene glycol (I/O value: 2.00), diethylene glycol (I/O value: 5.00), triethylene glycol (I/O value: 3.43), propylene glycol (I/O value: 2.50), dipropylene glycol (I/O value: 2.00), 1,3-butanediol (I/O value: 2.50), 2,3-butanediol (I/O value: 2.50), 1,4-butanediol (I/O value: 2.50), 3-methyl-1,3-butanediol (I/O value: 2.00), 1,5-pentanediol (I/O value: 2.00), tetraethylene glycol (I/O value: 2.91), 1,6-hexanediol (I/O value: 1.67), 2-methyl-2,4-pentanediol (I/O value: 1.67), polyethylene glycol (I/O value depends on the number of repetition of the ethylene chain), 1,2,4-butanetriol (I/O value: 3.75), 1,2,6-hexanetriol (I/O value: 2.50), and the like. These may be used individually, or may be used in combination of two or more types.

For the purpose of functioning as a permeation agent, a polyol compound is preferable, and preferable examples of aliphatic diol include 2-ethyl-2-methyl-1,3-propanediol (I/O value: 1.67), 3,3-dimethyl-1,2-butanediol (I/O value: 1.67), 5-hexene-1,2-diol, 2-ethyl-1,3-hexanediol (I/O value: 2.00), and 2,2,4-trimethyl-1,3-pentanediol (I/O value: 1.88).

The content of the other hydrophilic organic solvent may be, for example, 16% by mass or less, and is preferably 12% by mass or less, and more preferably 8% by mass or less.

The hydrophilic organic solvent in the ink composition of the exemplary embodiment of the invention may be used individually, or may be used as mixtures of two or more types. The content of the hydrophilic organic solvent is preferably 1% by mass to 60% by mass, more preferably 5% by mass to 40% by mass, and particularly preferably 10% by mass to 30% by mass, from the viewpoints of stability and ejection properties.

The amount of addition of water used in the exemplary embodiment of the invention is not particularly limited, but the amount is preferably 10% by mass to 99% by mass, more preferably 30% by mass to 80% by mass, and further preferably 50% by mass to 70% by mass, in the ink composition, from the viewpoints of securing stability and ejection reliability.

(Resin Particles)

An ink composition according to the exemplary embodiment of the invention preferably includes at least one kind of resin particles from viewpoints of fixability of image formed, abrasion resistance of the image, and aggregation property of the ink composition. Further, the resin particles are more preferably particles of self-dispersing polymers.

The self-dispersing polymer according to the exemplary embodiment of the invention means a water-insoluble polymer which can be in a dispersed state in an aqueous medium due to the functional group (particularly, an acidic group or a salt thereof) of the polymer itself when brought to a dispersed state by an phase inversion emulsification method in the absence of a surfactant.

Here, the term dispersed state includes both an emulsified state (emulsion) in which a water-insoluble polymer is dispersed in an aqueous medium in the liquid state, and a dispersed state (suspension) in which a water-insoluble polymer is dispersed in an aqueous medium in the solid state.

In regard to the self-dispersing polymer according to the exemplary embodiment of the invention, it is preferable that the water-insoluble polymer is a self-dispersing polymer capable of being in a dispersed state in the solid state, from the viewpoint of ink fixation properties obtainable when incorporated in an ink composition.

The method for preparing the emulsified or dispersed state of the self-dispersing polymer, that is, an aqueous dispersion of the self-dispersing polymer, may be a phase inversion emulsification method. The phase inversion emulsification method may be, for example, a method of dissolving or dispersing the self-dispersing polymer into a solvent (for example, a hydrophilic organic solvent or the like), subsequently introducing the solution or dispersion directly into water without adding a surfactant, mixing under stirring the system while a salt-producing group (for example, an acidic group) carried by the self-dispersing polymer is neutralized, removing the solvent, and then obtaining an aqueous dispersion that has been brought to an emulsified or dispersed state.

A stable emulsified or dispersed state for the self-dispersing polymer of the exemplary embodiment of the invention means that even when a solution prepared by dissolving 30 g of a water-insoluble polymer in 70 g of an organic solvent (for example, methyl ethyl ketone), a neutralizing agent capable of neutralizing 100% of the salt-producing group of the water-insoluble polymer (if the salt-producing group is anionic, sodium hydroxide, and if the salt-producing group is cationic, acetic acid), and 200 g of water are mixed and stirred (apparatus: a stirring apparatus equipped with a stirring blade, speed of rotation 200 rpm, for 30 minutes, 25° C.), and then the organic solvent is removed from the liquid mixture, the emulsified or dispersed state remains stable for at least one week at 25° C., so that the generation of precipitates cannot be verified by visual inspection.

The stability of the emulsified or dispersed state for the self-dispersing polymer can be confirmed by a precipitation acceleration test based on centrifugation. The stability obtained by a precipitation acceleration test based on centrifugation can be evaluated by, for example, adjusting the aqueous dispersion of the polymer particles obtained by the method described above to a solids concentration of 25% by mass, subsequently centrifuging the dispersion for one hour at 12,000 rpm, and measuring the solids concentration of the supernatant obtained after centrifugation.

When the ratio of the solids concentration after centrifugation to the solids concentration before centrifugation is large (a value close to 1), it means that precipitation of the polymer particles resulting from centrifugation does not occur, that is, the aqueous dispersion of the polymer particles is more stable. According to the present invention, the ratio of the solids concentration before and after centrifugation is preferably 0.8 or greater, more preferably 0.9 or greater, and particularly preferably 0.95 or greater.

Further, the water-insoluble polymer means a polymer showing an amount of dissolution of 10 g or less when the polymer is dried at 105° C. for 2 hr and then dissolved in 100 g of water at 25° C. The amount of dissolution is, preferably, 5 g or less and, more preferably, 1 g or less. The amount of dissolution is the amount of dissolution when the polymer is neutralized with sodium hydroxide or acetic acid to 100% in accordance with the kind of the salt-forming group of the water-insoluble polymer.

The self-dispersing polymer according to the exemplary embodiment of the invention is such that the content of the water-soluble component exhibiting water-solubility when brought to a dispersed state is preferably 10% by mass or less, more preferably 8% by mass or less, and even more preferably 6% by mass or less. When the water-soluble component is 10% by mass or less, swelling of the polymer particles or fusion of the polymer particles is effectively suppressed, and a more stable dispersed state can be maintained. Viscosity increase of the ink composition can also be suppressed, and the ejection stability becomes better when, for example, the ink composition is used for an inkjet recording method.

Here, the water-soluble component means a compound contained in the self-dispersing polymer, where the compound dissolves in water when the self-dispersing polymer is brought to a dispersed state. The water-soluble component is a water-soluble compound that is side-produced or incorporated during the production of the self-dispersing polymer.

The self-dispersing polymer according to the exemplary embodiment of the invention includes at least one hydrophilic constituent unit derived from a hydrophilic monomer, and at least one hydrophobic constituent unit derived from a hydrophobic monomer. The main chain skeleton of the self-dispersing polymer is not particularly limited, but from the viewpoint of the dispersion stability of the polymer particles, the main chain skeleton is preferably a vinyl polymer, and preferably a (meth)acrylic polymer. Here, the (meth)acrylic polymer means a polymer including at least one of a constituent unit derived from a methacrylic acid derivative and a constituent unit derived from an acrylic acid derivative.

—Hydrophilic Constituent Unit—

The hydrophilic constituent unit in the self-dispersing polymer is not particularly limited so long as it is derived from a hydrophilic group-containing monomer and it may be either a unit derived from one hydrophilic group-containing monomer (hydrophilic monomer) or a unit derived from two or more hydrophilic group-containing monomers. The hydrophilic group is not particularly limited and it may be either a dissociative group or a nonionic hydrophilic group.

The hydrophilic group is preferably a dissociative group from the viewpoints of promoting the self-dispersibility and stability of the formed emulsified or dispersed state and, more preferably, an anionic dissociative group. Examples of the dissociative group include a carboxy group, a phosphoric acid group, and a sulfonic acid group and, among them, a carboxy group is preferred from the viewpoint of the fixing property when used in the ink composition.

The hydrophilic group-containing monomer is preferably a dissociative group-containing monomer and, preferably, a dissociative group-containing monomer having a dissociative group and an ethylenically unsaturated bond from the viewpoint of self-dispersibility.

Examples of the dissociative group-containing monomer include an unsaturated carboxylic acid monomer, an unsaturated sulfonic acid monomer, and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid, and 2-(methacryloyloxy)methyl succinicate, etc. Specific examples of the unsaturated sulfonic acid monomer include styrenesulfonic acid, 2-acrylamido-2-methylpropanesulfonic acid, 3-sulfopropyl (meth)acrylate, and bis(3-sulfopropyl) itaconate. Specific examples of the unsaturated phosphoric acid monomer include vinylphosphonic acid, vinylphosphate, bis(methacryloyloxyethyl) phosphate, diphenyl-2-acryloyloxyethyl phosphate, diphenyl-2-methacryloyloxyethyl phosphate, and dibutyl-2-acryloyloxyethyl phosphate.

Among the dissociative group-containing monomers, an unsaturated carboxylic acid monomer is preferred and, at least one kind of acrylic acid and methacrylic acid is more preferred from the viewpoints of the dispersion stability and ejection stability.

Examples of the monomer having a nonionic hydrophilic group include ethylenically unsaturated monomers containing a (poly)ethyleneoxy group or a polypropyleneoxy group, such as 2-methoxyethyl acrylate, 2-(2-methoxyethoxy)ethyl acrylate, 2-(2-methoxyethoxy)ethyl methacrylate, ethoxytriethylene glycol methacrylate, methoxypolyethylene glycol (molecular weight 200 to 1000) monomethacrylate, and polyethylene glycol (molecular weight 200 to 1000) monomethacrylate; and ethylenically unsaturated monomers having a hydroxyl group, such as hydroxymethyl (meth)acrylate, 2-hydroxyethyl (meth)acrylate, 2-hydroxypropyl (meth)acrylate, 4-hydroxybutyl (meth)acrylate, and hydroxypentyl (meth)acrylate, hydroxyhexyl (meth)acrylate.

The monomer having a nonionic hydrophilic group is preferably an ethylenically unsaturated monomer having an alkyl ether at the end, rather than an ethylenically unsaturated monomer having a hydroxyl group at the end, from the viewpoints of the stability of the particles and the content of the water-soluble component.

The hydrophilic constituent unit in the self-dispersing polymer is preferably any of an embodiment containing only a hydrophilic constituent unit having an anionic dissociative group, and an embodiment containing both a hydrophilic constituent unit having an anionic dissociative group and a hydrophilic constituent unit having a nonionic hydrophilic group.

Furthermore, an embodiment containing two or more types of hydrophilic constituent units having an anionic dissociative group, or an embodiment having two or more of a hydrophilic constituent unit having an anionic dissociative group and a hydrophilic constituent unit having a nonionic hydrophilic group in combination, is also preferable.

The content of the hydrophilic constituent unit in the self-dispersing polymer is preferably 25% by mass or less, more preferably from 1 to 25% by mass, further preferably from 2 to 23% by mass, and particularly preferably from 4 to 20% by mass, from the viewpoints of viscosity and stability over time.

When the polymer has two or more types of hydrophilic constituent units, it is preferable that the total content of the hydrophilic constituent unit is within the range described above.

The content of the hydrophilic constituent unit having an anionic dissociative group in the self-dispersing polymer is preferably in the range such that the acid value falls in the suitable range described below.

The content of the constituent unit having a nonionic hydrophilic group is preferably from 0% by mass to 25% by mass, more preferably from 0% by mass to 20% by mass, and particularly preferably from 0% by mass to 15% by mass, from the viewpoints of ejection stability and stability over time.

When the self-dispersing polymer has an anionic dissociative group, the acid value (mg KOH/g) is preferably 20 to 200, more preferably 22 to 120, and particularly preferably 25 to 100, from the viewpoint of self-dispersibility, content of the water-soluble component, and fixation properties when the polymer constitutes an ink composition. The acid value is particularly preferably 30 to 80. When the acid value is 20 or greater, the particles can be dispersed more stably, and when the acid value is 200 or less, the content of the water-soluble component can be reduced.

—Hydrophobic Constituent Unit—

The hydrophobic constituent unit in the self-dispersing polymer is not particularly limited so long as it is derived from a hydrophobic group-containing monomer (hydrophobic monomer), and may be a constituent unit derived from a monomer containing one type of hydrophobic group, or may be a constituent unit derived from a monomer containing two or more types of hydrophobic groups. The hydrophobic group is not particularly limited, and may be any of a chain-like aliphatic group, a cyclic aliphatic group, and an aromatic group.

The hydrophobic monomer is preferably such that at least one is a cyclic aliphatic group-containing monomer, and more preferably a cyclic aliphatic group-containing (meth)acrylate (hereinafter, may be referred to as "alicyclic (meth)acrylate"), from the viewpoints of blocking resistance, abrasion resistance and dispersion stability.

The alicyclic (meth)acrylate is a compound including a structural site derived from (meth)acrylic acid and a structural site derived from alcohol, and having a structure containing at least one unsubstituted or substituted alicyclic hydrocarbon group (cyclic aliphatic group) in the structural site derived from alcohol. The alicyclic hydrocarbon group may be the structural site derived from alcohol itself, or may be linked to the structural site derived from alcohol via a linking group.

The "alicyclic (meth)acrylate" means a methacrylate or acrylate having an alicyclic hydrocarbon group.

The alicyclic hydrocarbon group is not particularly limited so long as it contains a cyclic non-aromatic hydrocarbon group, and may be a monocyclic hydrocarbon group, a bicyclic hydrocarbon group, or a polycyclic hydrocarbon group having three or more rings.

Examples of the alicyclic hydrocarbon group include a cycloalkyl group such as a cyclopentyl group or a cyclohexyl group, a cycloalkenyl group, a bicyclohexyl group, a norbornyl group, an isobornyl group, a dicyclopentanyl group, a dicyclopentenyl group, an adamantyl group, a decahydronaphthalenyl group, a perhydrofluorenyl group, a tricyclo[5.2.1.0$^{2,6}$]decanyl group, a bicyclo[4.3.0]nonane, and the like.

The alicyclic hydrocarbon group may be further substituted with a substituent. Examples of the substituent include an alkyl group, an alkenyl group, an aryl group, an aralkyl group, an alkoxy group, a hydroxyl group, a primary amino group, a secondary amino group, a tertiary amino group, an alkyl- or arylcarbonyl group, a cyano group, and the like.

The alicyclic hydrocarbon group may further form a condensed ring.

The alicyclic hydrocarbon group according to the exemplary embodiment of the invention preferably has 5 to 20 carbon atoms in the alicyclic hydrocarbon group moiety, from the viewpoint of viscosity or solubility.

The linking group that links the alicyclic hydrocarbon group and the structural site derived from alcohol may be suitably an alkylene group, an alkenylene group, an alkynylene group, an arylalkylene group, an alkylenoxy group, a mono- or oligoethylenoxy group, a mono- or oligopropylenoxy group, or the like, having 1 to 20 carbon atoms.

Specific examples of the alicyclic (meth)acrylate according to the exemplary embodiment of the invention will be shown below, but the invention is not limited to these.

Examples of monocyclic (meth)acrylate include cycloalkyl (meth)acrylates having a cycloalkyl group having 3 to 10 carbon atoms, such as cyclopropyl (meth)acrylate, cyclobutyl (meth)acrylate, cyclopentyl (meth)acrylate, cyclohexyl (meth)acrylate, cycloheptyl (meth)acrylate, cyclooctyl (meth)acrylate, cyclononyl (meth)acrylate, and cyclodecyl (meth)acrylate.

Examples of bicyclic (meth)acrylate include isobornyl (meth)acrylate, norbornyl (meth)acrylate, and the like.

Examples of tricyclic (meth)acrylate include adamantyl (meth)acrylate, dicyclopentanyl (meth)acrylate, dicyclopentenyloxyethyl (meth)acrylate, and the like.

These can be used individually, or as mixtures of two or more types.

Among these, at least one of the bicyclic (meth)acrylate and the polycyclic (meth)acrylate having three or more rings is preferable, and at least one selected from isobornyl (meth)acrylate, adamantyl (meth)acrylate and dicyclopentanyl (meth)acrylate is more preferable, from the viewpoints of the dispersion stability of the self-dispersing polymer particles, and fixability and blocking resistance of an image formed.

According to the exemplary embodiment of the invention, the content of the constituent unit derived from alicyclic (meth)acrylate contained in the self-dispersing polymer particles is preferably 20% by mass to 90% by mass, more preferably 40% by mass to 90% by mass, and particularly preferably 50% by mass to 80% by mass, from the viewpoints of the stability of the self-dispersed state, stabilization of particle shape in an aqueous medium due to the hydrophobic interaction between the alicyclic hydrocarbon groups, and a decrease in the amount of the water-soluble component due to an appropriate hydrophobization of particles.

When the content of the constituent unit derived from alicyclic (meth)acrylate is 20% by mass or more, fixation properties and blocking can be improved. On the other hand, when the content of the constituent unit derived from alicyclic (meth)acrylate is 90% by mass or less, the stability of the polymer particles is improved.

The self dispersing polymer according to the exemplary embodiment of the invention can be constituted to further include another constituent unit as the hydrophobic constituent unit if necessary, in addition to the constituent unit derived from alicyclic (meth)acrylate. The monomer forming the other constituent unit is not particularly limited so long as it is a monomer capable of copolymerizing with the alicyclic (meth)acrylate and the hydrophilic group-containing monomer, and any known monomer can be used.

Specific examples of the monomer forming the other constituent unit (hereinafter, may be referred to as "other copolymerizable monomer") include alkyl (meth)acrylates such as methyl (meth)acrylate, ethyl (meth)acrylate, isopropyl (meth)acrylate, n-propyl (meth)acrylate, n-butyl (meth)acrylate, isobutyl (meth)acrylate, t-butyl (meth)acrylate, hexyl (meth)acrylate, and ethylhexyl (meth)acrylate; aromatic ring-containing (meth)acrylates such as benzyl (meth)acrylate and phenoxyethyl (meth)acrylate; stryrenes such as styrene, α-methylstyrene, and chlorostyrene; dialkylaminoalkyl (meth)acrylates such as dimethylaminoethyl (meth)acrylate; N-hydroxyalkyl (meth)acrylamides such as N-hydroxymethyl (meth)acrylamide, N-hydroxyethyl (meth)acrylamide, and N-hydroxybutyl (meth)acrylamide; N-alkoxyalkyl (meth)acrylamides such as N-methoxymethyl (meth)acrylamide, N-ethoxymethyl (meth)acrylamide, N-(n-, iso-)butoxymethyl (meth)acrylamide, N-methoxyethyl (meth)acrylamide, N-ethoxyethyl (meth)acrylamide, and N-(n-, iso-)butoxyethyl (meth)acrylamide; and the like.

Among them, the other constituent unit is preferably at least one (meth)acrylate containing a chain-like alkyl group having 1 to 8 carbon atoms, from the viewpoint of the flexibility of the polymer skeleton or the ease of control of the glass transition temperature (Tg) and from the viewpoint of the dispersion stability of the self-dispersing polymer, and is more preferably a (meth)acrylate having a chain-like alkyl group having 1 to 4 carbon atoms, and particularly preferably methyl (meth)acrylate or ethyl (meth)acrylate. Here, the chain-like alkyl group refers to an alkyl group having a linear or branched chain.

According to the exemplary embodiment of the invention, a (meth)acrylate containing an aromatic group can also be preferably used.

When an aromatic-containing (meth)acrylate is contained as the other copolymerizable monomer, the content of the constituent unit derived from the aromatic-containing (meth) acrylate is preferably 40% by mass or less, more preferably 30% by mass or less, and particularly preferably 20% by mass or less, from the viewpoint of the dispersion stability of the self-dispersing polymer particles.

Furthermore, when a styrene-type monomer is used as the other copolymerizable monomer, the content of the constituent unit derived from the styrene-type monomer is preferably 20% by mass or less, more preferably 10% by mass or less, and further preferably 5% by mass or less, from the viewpoint of stability when the self-dispersing polymer is made into particles, and it is particularly preferable that the polymer does not include a constituent unit derived from a styrene-type monomer.

Here, the styrene-type monomer refers to styrene, substituted styrene (α-methylstyrene, chlorostyrene, or the like), or a styrene macromer having a polystyrene structural unit.

The other copolymerizable monomer in the self-dispersing polymer may be used individually, or in combination of two or more types.

When the self-dispersing polymer includes the other constituent unit, the content is preferably from 10% by mass to 80% by mass, more preferably from 15% by mass to 75% by mass, and particularly preferably from 20% by mass to 70% by mass. When two or more types of the monomer forming the other constituent unit are used in combination, the total content is preferably in the range mentioned above.

The self-dispersing polymer according to the exemplary embodiment of the invention is preferably a polymer obtainable by polymerizing at least three types of an alicyclic (meth) acrylate, another copolymerizable monomer and a hydrophilic group-containing monomer, and more preferably a polymer obtainable by polymerizing at least three types of an alicyclic (meth)acrylate, an alkyl group-containing (meth) acrylate having a linear or branched chain having 1 to 8 carbon atoms, and a hydrophilic group-containing monomer, from the viewpoint of dispersion stability.

According to the exemplary embodiment of the invention, it is preferable that the content of the (meth)acrylate having a linear or branched alkyl group having 9 or more carbon atoms, and the constituent unit having a substituent with high hydrophobicity, which is derived from an aromatic group-containing macromonomer or the like, is substantially none, and it is more preferable that the polymer does not include any of the constituent units at all, from the viewpoint of dispersion stability.

The self-dispersing polymer according to the exemplary embodiment of the invention may be a random copolymer having the respective constituent units introduced irregularly, or may be a block copolymer having the respective constituent units introduced regularly. If the first polymer is a block copolymer, the respective constituent units may be synthesized in a certain order of introduction, or the same constituent component may be used two or more times. However, it is preferable that the first polymer is a random copolymer, from the viewpoints of all-purpose usability and manufacturability.

The range of molecular weight of the self-dispersing polymer according to the exemplary embodiment of the invention is preferably from 3000 to 200,000, more preferably from 10,000 to 200,000, and further preferably from 30,000 to 150,000, in terms of weight average molecular weight. When the weight average molecular weight is 3,000 or more, the amount of the water-soluble component can be effectively suppressed. When the weight average molecular weight is 200,000 or less, the self-dispersion stability can be enhanced.

Here, the weight average molecular weight can be measured by gel permeation chromatography (GPC).

From the viewpoint of controlling the hydrophilicity and hydrophobicity of the polymer, the self-dispersing polymer according to the exemplary embodiment of the invention is preferably a vinyl polymer which includes a structure derived from an alicyclic (meth)acrylate at a copolymerization ratio of 20% by mass to 90% by mass, and at least one of a structure derived from a dissociative group-containing monomer and a structure derived from a (meth)acrylate containing a chain-like alkyl group having 1 to 8 carbon atoms, and has an acid value of from 20 to 120, a total content of the hydrophilic structural units of 25% by mass or less, and a weight average molecular weight of from 3,000 to 200,000.

The first polymer is more preferably a vinyl polymer which includes a structure derived from a bicyclic (meth)acrylate or a polycyclic (meth)acrylate having three or more rings at a copolymerization ratio of 20% by mass or more and less than 90% by mass, and a structure derived from a (meth)acrylate containing a chain-like alkyl group having 1 to 4 carbon atoms at a copolymerization ratio of 10% by mass or more and less than 80% by mass, and a structure derived from a carboxy group-containing monomer at an acid value in the range of 25 to 100, and has a total content of the hydrophilic structural unit of 25% by mass or less, and a weight average molecular weight of from 10,000 to 200,000.

Furthermore, the first polymer is particularly preferably a vinyl polymer which includes a structure derived from a bicyclic (meth)acrylate or a polycyclic (meth)acrylate having three or more rings at a copolymerization ratio of 40% by mass or more and less than 80% by mass, and at least a structure derived from methyl (meth)acrylate or ethyl (meth) acrylate at a copolymerization ratio of 20% by mass or more and less than 60% by mass, and a structure derived from acrylic acid or methacrylic acid at an acid value in the range of 30 to 80, and has a total content of the hydrophilic structural unit of 25% by mass or less, and a weight average molecular weight of from 30,000 to 150,000.

In embodiments of the invention, the glass transition temperature of the self-dispersible polymer is not particularly limited, but is preferably 150° C. to 250° C., and is more preferably 160° C. to 200° C. from the viewpoints of the block resistance and the abrasion resistance of the image.

When the glass transition temperature of the self-dispersing polymer is 150° C. or higher, the blocking resistance (particularly, under the high temperature and high humidity conditions) may be improved. When the glass transition temperature is 250° C. or lower, the abrasion resistance of the image is enhanced.

The glass transition temperature of the self-dispersing polymer can be appropriately controlled according to methods conventionally used. For example, the glass transition temperature of the self-dispersing polymer can be controlled to a desired range by appropriately selecting the type of the polymerizable group of the monomer constituting the self-dispersing polymer, the type or the composition ratio of the substituent on the monomer, the molecular weight of the polymer molecule, or the like.

For the glass transition temperature (Tg) of the self-dispersing polymer according to the exemplary embodiment of the invention, a measured Tg that is obtainable by actual measurement is applied. Specifically, the measured Tg means a value measured under conventional measurement conditions using a differential scanning calorimeter (DSC) EXSTAR6220 (trade name) manufactured by SII Nanotechnology, Inc.

However, if measurement is difficult due to degradation of the polymer or the like, a calculated Tg that is computed by the following calculation formula, is applied.

The calculated Tg is calculated by the following formula (1):

$$1/Tg = \Sigma(X_i/Tg_i) \quad (1)$$

Here, it is assumed that in the polymer serving as the object of calculation, n species of monomer components, with i being from 1 to n, are copolymerized. $X_i$ is the weight fraction of the $i^{th}$ monomer ($\Sigma X_i = 1$), and $Tg_i$ is the glass transition temperature (absolute temperature) of a homopolymer of the $i^{th}$ monomer, provided that E takes the sum of i=1 to i=n. Furthermore, for the value of the glass transition temperature of a homopolymer of each monomer ($Tg_i$), the values given in Polymer Handbook ($3^{rd}$ edition) (J. Brandrup, E. H. Immergut, (Wiley-Interscience, 1989)) are employed.

The I/O value of the self-dispersing polymer is not particularly limited, but from the viewpoints of blocking resistance and the stability of the ink composition, the value is preferably from 0.20 to 0.55, more preferably from 0.30 to 0.54, and even more preferably from 0.40 to 0.50.

If the I/O value of the self-dispersing polymer is less than 0.20, the stability of the ink composition may be decreased. If the I/O value is greater than 0.55, blocking resistance (particularly, under high temperature and high humidity conditions) may be decreased.

The I/O value, which is also called as an inorganicity value/organicity value, is a value that deals with the polarity of various organic compounds in an organic conceptual manner, and is one of functional group contribution methods setting parameters to each functional group.

The I/O value is explained in detail in "Organic Conceptual Diagram" (by Koda Yoshio, published by Sankyo Publishing Co., Ltd. (1984) and the like. The concept of the I/O value is to indicate the result of dividing the properties of a compound into organic groups representing covalent bonding properties and inorganic groups representing ion bonding properties, and rating every organic compound as a point on a Cartesian coordinate system designated as an organic axis and an inorganic axis.

The inorganicity value is a value obtained by evaluating the magnitude of the influence of various substituents or bonds carried by an organic compound on the boiling point, and converting the magnitude into a numerical data based on the hydroxyl group. Specifically, when the distance between the boiling point curve of a linear alcohol and the boiling point curve of a linear paraffin is taken in the vicinity of a compound of five carbon atoms, the result is about 100° C. Thus, the influence of one hydroxyl group is defined as 100 as a numerical value, and the value obtained by converting the influence of various substituents or various bonds on the boiling point into a numerical value based on this value of 100, serves as the inorganicity value of the substituent carried by an organic compound. For example, the inorganicity value of a —COOH group is 150, and the inorganicity value of a double bond is 2. Therefore, the inorganicity value of an organic compound of a certain type means the sum of the inorganicity values of various substituents, bonds and the like carried by the compound.

The organicity value is defined by taking a methylene group in the molecule as a unit, and defining the influence of a carbon atom representing the methylene group on the boiling point as the reference. That is, when one carbon atom is added to a linear saturated hydrocarbon compound having around 5 to 10 carbon atoms, the average value of an increase in the boiling point is 20° C. Thus, the organicity value of one carbon atom is defined as 20 based on this value, and the value of converting the influence of various substituents or bonds on the boiling point based on this value of 20, serves as the organicity value. For example, the organicity value of a nitro group (—NO$_2$) is 70.

An I/O value approximating to zero represents that the organic compound is non-polar (hydrophobic, high organicity), and a larger value represents that the organic compound is polar (hydrophilic, high inorganicity).

According to the present invention, the I/O value of the self-dispersing polymer means a value determined by the following method. The I/O value (=I value/O value) of each monomer constituting the self-dispersing polymer is calculated based on the organicity (O value) and the inorganicity (I value) described in Koda Yoshio, "Organic Conceptual Diagram—Fundamentals and Applications" (1984), p. 13. For each of the monomers constituting the polymer, a product of the (I/O value) and (mol % in the polymer) was calculated, these products were summed, and the value obtained by rounding off at the third decimal place was defined as the I/O value of the self-dispersing polymer.

As the method of calculating the inorganicity value of each monomer, generally a double bond is regarded as having an inorganicity of 2 upon addition; however, since the double bond disappears after polymerization, a value that does not add the portion of double bond as the inorganicity value of the monomers was used to calculate the I/O value of the self-dispersing polymer used in the present invention.

According to the exemplary embodiment of the invention, a polymer having a desired I/O value can be constructed by appropriately adjusting the structure and content of the monomers constituting the self-dispersing polymer.

Hereinafter, specific examples of the self-dispersing polymer will be listed as exemplary compounds, but the present invention is not limited to these. The numbers in the parentheses represent the mass ratio of the copolymerized components.

Methyl methacrylate/isobornyl methacrylate/methacrylic acid copolymer (20/72/8), glass transition temperature: 180° C., I/O value: 0.44

Methyl methacrylate/isobornyl methacrylate/methacrylic acid copolymer (40/52/8), glass transition temperature: 160° C., I/O value: 0.50

Methyl methacrylate/isobornyl methacrylate/dicyclopentanyl methacrylate/methacrylic acid copolymer (20/62/10/8), glass transition temperature: 170° C., I/O value: 0.44

Methyl methacrylate/dicyclopentanyl methacrylate/methacrylic acid copolymer (20/72/8), glass transition temperature: 160° C., I/O value: 0.47

For the calculation of the I/O value, the following values were used as the I/O values of the monomers constituting the polymer.

Methyl methacrylate: 0.60, isobornyl methacrylate: 0.29, dicyclopentanyl methacrylate: 0.32, methacrylic acid 0.47

The method for producing a self-dispersing polymer according to the exemplary embodiment of the invention is not particularly limited, and the polymer can be produced by copolymerizing a monomer mixture according to a known polymerization method. Among such polymerization methods, it is more preferable to perform polymerization in an organic medium from the viewpoint of droplet ejection properties when formed into an ink composition, and a solution polymerization method is particularly preferable.

In regard to the method for producing the self-dispersing polymer of the exemplary embodiment of the invention, the water-insoluble polymer as described above can be produced by subjecting a mixture including a monomer mixture and if necessary, an organic solvent and a radical polymerization initiator, to a copolymerization reaction under an inert gas atmosphere.

The method for producing an aqueous dispersion of self-dispersing polymer particles according to the exemplary embodiment of the invention is not particularly limited, and an aqueous dispersion of self-dispersing polymer particles can be obtained by a known method. The process of obtaining a self-dispersing polymer as an aqueous dispersion is preferably a phase inversion emulsification method including the following process (1) and process (2).

Process (1): a process of obtaining a dispersion by stirring a mixture containing a water-insoluble polymer, an organic solvent, a neutralizing agent and an aqueous medium.

Process (2): a process of removing at least a portion of the organic solvent from the dispersion.

The process (1) is preferably a treatment of first dissolving the water-insoluble polymer in an organic solvent, slowly adding a neutralizing agent and an aqueous medium thereto, and mixing and stirring the mixture to obtain a dispersion. As such, when a neutralizing agent and an aqueous medium are added into a solution of the water-insoluble polymer dissolved in an organic solvent, a self-dispersing polymer particle having a particle size with higher storage stability can be obtained without requiring a strong shear force.

The method of stirring the mixture is not particularly limited, and any generally used mixing and stirring apparatus, or if necessary, a dispersing machine such as an ultrasonic dispersing machine or a high pressure homogenizer can be used.

Preferable examples of the organic solvent include alcohol-based solvents, ketone-based solvents, and ether-based solvents.

Examples of the alcohol-based solvents include isopropyl alcohol, n-butanol, t-butanol, ethanol and the like. Examples of the ketone-based solvents include acetone, methyl ethyl ketone, diethyl ketone, methyl isobutyl ketone, and the like. Examples of the ether-based solvents include dibutyl ether, dioxane, and the like. Among these organic solvents, ketone-based solvents such as methyl ethyl ketone and alcohol-based solvents such as isopropyl alcohol are preferred.

It is also preferable to use isopropyl alcohol and methyl ethyl ketone in combination. When the solvents are used in combination, aggregation/precipitation or fusion between particles does not occur, and a self-dispersing polymer particle having a microparticle size with high dispersion stability can be obtained. This is thought to be because the polarity change upon phase inversion from an oil system to an aqueous system becomes mild.

The neutralizing agent is used to partially or entirely neutralize the dissociative groups so that the self-dispersing polymer can form a stable emulsified or dispersed state in water. In the case where the self-dispersing polymer of the exemplary embodiment of the invention has an anionic dissociative group as the dissociative group, examples of the neutralizing agent to be used include basic compounds such as organic amine compounds, ammonia, and alkali metal hydroxides. Examples of the organic amine compounds include monom-ethylamine, dimethylamine, trimethylamine, monoethylamine, diethylamine, triethylamine, monopropylamine, dipropylamine, monoethanolamine, diethanolamine, triethanolamine, N,N-dimethyl-ethanolamine, N,N-diethyl-ethanolamine, 2-diethylamino-2-methyl-1-propanol, 2-amino-2-methyl-1-propanol, N-methyldiethanolamine, N-ethyldiethanolamine, monoisopropanolamine, diisopropanolamine, and triisopropanolamine, etc. Examples of the alkali metal hydroxide include lithium hydroxide, sodium hydroxide and potassium hydroxide. Among them, sodium hydroxide, potassium hydroxide, triethylamine, and triethanolamine are preferred from the viewpoint of the stabilization of dispersion of the self-dispersing polymer particles of the exemplary embodiment of the invention into water.

These basic compounds are preferably used in an amount of from 5 mol % to 120 mol %, more preferably from 20 mol % to 100 mol %, and further preferably from 30 mol % to 80 mol %, based on 100 mol % of the dissociative group. When the content is 15 mol % or more, an effect of stabilizing the dispersion of particles in water is exhibited, and when the content is 80 mol % or less, an effect of reducing water-soluble components is obtained.

In the process (2), an aqueous dispersion of self-dispersing polymer particles can be obtained by distilling off the organic solvent from the dispersion obtained in the process (1) by a conventional method such as distillation under reduced pressure, to thereby bring about phase inversion into an aqueous system. The organic solvent in the obtained aqueous dispersion is substantially removed, and the amount of the organic solvent is preferably 0.2% by mass or less, and more preferably 0.1% by mass or less.

The average particle size of the self-dispersing polymer particles according to the exemplary embodiment of the invention is preferably in the range of 1 nm to 100 nm, more preferably 3 nm to 80 nm, and further preferably 5 nm to 60 nm. The average particle size is particularly preferably from 5 nm to 40 nm. With an average particle size of 1 nm or more, manufacturability is enhanced. Further, with an average particle size of 100 nm or less, storage stability is enhanced. Here, the average particle size means a volume average particle size.

The particle size distribution of the self-dispersing polymer particles is not particularly limited, and the polymer particles may have a broad particle size distribution or a mono-dispersed particle size distribution. Water-insoluble particles may also be used as mixtures of two or more types.

The average particle size and particle size distribution of the self-dispersing polymer particles can be measured using, for example, a light scattering method.

In the ink composition of the exemplary embodiment of the invention, the self-dispersing polymer particles preferably exist in a form that does not substantially contain a colorant.

The self-dispersing polymer particles of the exemplary embodiment of the invention have excellent self-dispersibility, and the stability of a dispersion of the polymer alone is very high. However, for example, since the function as a so-called dispersant for stably dispersing a pigment is not very significant, if the self-dispersing polymer according to the exemplary embodiment of the invention is present in the ink composition in a form containing a pigment, consequently the stability of the ink composition as a whole may be greatly decreased.

The ink composition of the present invention may contain one type of self-dispersing polymer particles alone, or may contain two or more types of such particles.

The content of the self-dispersing polymer particles in the ink composition of the exemplary embodiment of the invention is preferably from 1% by mass to 30% by mass, more preferably from 2% by mass to 20% by mass, and particularly preferably from 2% by mass to 10% by mass, based on the ink composition for inkjet recording, from the viewpoint of the glossiness of the image.

The content ratio of the coloring particles and the self-dispersing polymer particles (coloring particles/self-dispersing polymer particles) in the ink composition of the exemplary embodiment of the invention is preferably from 1/0.5 to 1/10, and more preferably from 1/1 to 1/4, from the viewpoint of abrasion resistance of the image.

(Other Additives)

The ink composition of the exemplary embodiment of the invention can further include other additives if necessary, in addition to the components mentioned above.

Examples of the other additives according to the exemplary embodiment of the invention include known additives such as color fading inhibitor, emulsion stabilizer, permeation accelerator, ultraviolet absorber, preservative, mildew-proofing agent, pH adjusting agent, surface tension regulator, defoamer, viscosity adjusting agent, dispersant, dispersed stabilizer, anti-rust agent and chelating agent. These various additives may be added directly after the preparation of the ink composition, or may be added during the preparation of the ink composition. Specifically, the other additives and the like described in paragraphs [0153] to [0162] of JP-A No. 2007-100071 are included.

The surface tension adjusting agent may be a nonionic surfactant, a cationic surfactant, an anionic surfactant, a betaine surfactant or the like.

The amount of addition of the surface tension adjusting agent is preferably an amount of addition that adjusts the surface tension of the ink composition to 20 mN/m to 60 mN/m, more preferably an amount of addition that adjusts the surface tension to 20 mN/m to 45 mN/m, and further preferably an amount of addition that adjusts the surface tension to 25 mN/m to 40 mN/m, in order to spot the ink composition satisfactorily by the inkjet method. The surface tension of the ink composition can be measured, for example, using a plate method at 25° C.

Specific examples of the surfactant as a hydrocarbon type preferably include anionic surfactants such as fatty acid salts, alkyl sulfuric acid ester salts, alkyl benzenesulfonates, alkyl naphthalenesulfonates, dialkyl sulfosuccinates, alkyl phosphoric acid ester salts, naphthalenesulfonic acid-formalin condensates and polyoxyethylene alkyl sulfuric acid salts; and nonionic surfactants such as polyoxyethylene alkyl ether, polyoxyethylene alkyl allyl ether, polyoxyethylene fatty acid ester, sorbitan fatty acid ester, polyoxyethylene sorbitan fatty acid ester, polyoxyethylene alkyl amine, glycerin fatty acid ester and oxyethylene oxypropylene block copolymer. SURFYNOLS (trade name, products of Air Products & Chemicals) and OLFINE E1010 (trade name, surfactant, manufactured by Nisshin Chemical Industry Co., Ltd.) which are an acetylene type polyoxyethylene oxide surfactant) are preferably used. Furthermore, amine oxide type amphoteric surfactants such as N,N-dimethyl-N-alkyl amine oxide are preferred.

Additionally, materials described on pages (37) to (38) of JP-A No. 59-157636 and Research Disclosure No. 308119 (1989) as surfactants can be used.

When fluorocarbon (alkyl fluoride type) surfactants, silicone surfactants or the like, such as those described in JP-A Nos. 2003-322926, 2004-325707 and 2004-309806 are used, abrasion resistance can be improved.

The surface tension regulator can be used as an antifoamer, and fluorine compounds, silicone compounds, chelating agents represented by EDTA, and the like can be used.

When the application of ink is carried out by the inkjet method, the viscosity of the ink composition of the exemplary embodiment of the invention is preferably in the range of 1 mPa·s to 30 mPa·s, more preferably in the range of 1 mPa·s to 20 mPa·s, further preferably in the range of 2 mPa·s to 15 mPa·s, and particularly preferably in the range of 2 mPa·s to 10 mPa·s, from the viewpoints of the droplet ejection stability and rate of aggregation.

The viscosity of the ink composition can be measured by, for example, Brookfield Viscometer at 20° C.

In the exemplary embodiment of the invention, the pH of the ink composition is preferably 7.5 to 10, and more preferably 8.0 to 9.5, from the viewpoints of the ink stability and rate of aggregation. The pH of the ink composition may be measured using a conventional pH measurement apparatus (for example, HM-30R; trade name, manufactured by DKK-TOA CORPORATION) at a temperature of 25° C. The pH of the ink composition is appropriately controlled by applying an acidic compound or basic compound. A conventional acidic compound or basic compound may be used as the acidic compound or basic compound without any restriction.

In an image forming method according to the exemplary embodiment of the invention, an exemplary embodiment of forming an image by using an ink set of the invention which includes at least one of the ink compositions, and at least one treatment liquid configured to form aggregates when contacted with the ink composition, is preferable.

The ink set can be used in the form of an ink cartridge holding these inks collectively or independently, and is preferable in view of the ease of handling. The ink cartridge constituted to include the ink set is known in the related technical field, and can be prepared as an ink cartridge by appropriately using a known method.

(Treatment Liquid)

The treatment liquid in the exemplary embodiment of the invention is an aqueous composition which forms an aggregate when contacted with the ink composition for inkjet recording, and specifically, contains at least an aggregating component which may aggregate the dispersed particles such as the coloring particles (pigments) in the ink composition to form an aggregate and, if necessary, may contain other components. By using the treatment liquid together with the ink composition, inkjet recording may be speeded up and, even when high speed recording is performed, an image having high density and high resolution is obtained.

The treatment liquid contains at least one aggregating component which forms an aggregate when contacted with the ink composition. By mixing the treatment liquid into the ink composition ejected by an inkjet method, aggregation of a pigment or the like which has been stably dispersed in the ink composition is promoted.

Examples of the treatment liquid include a liquid composition which may generate an aggregate by changing the pH of the ink composition. Thereupon, the pH (25° C.) of the treatment liquid is preferably from 1 to 6, more preferably from 1.2 to 5, and further preferably from 1.5 to 4 from the viewpoints of the aggregation rate of the ink composition. In this case, the pH (25° C.) of the ink composition used in the ejection step is preferably 7.5 to 9.5 (more preferably 8.0 to 9.0).

In embodiments, it is preferable that the pH (25° C.) of the ink composition is 7.5 or higher, and the pH (25° C.) of the treatment liquid is 3 to 5, from the viewpoint of the image density, the resolution, and speeding-up of inkjet recording.

The aggregating component may be used alone, or two or more of them may be used by mixing them.

The treatment liquid may be prepared by using at least one acidic compound as the aggregating component. As the acidic compound, compounds having a phosphoric acid group, a phosphonic acid group, a phosphinic acid group, a sulfuric acid group, a sulfonic acid group, a sulfinic acid group, or a carboxy group, or salts thereof (e.g. polyvalent metal salts) may be used. Among them, from the viewpoint of the aggregation rate of the ink composition, compounds having a phosphoric acid group or a carboxy group are more preferable, and compounds having a carboxy group are further preferable.

The compound having a carboxy group is preferably selected from polyacrylic acid, acetic acid, glycoric acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrole carboxylic acid, furan carboxylic acid, pyridine carboxylic acid, coumalic acid, thiophene carboxylic acid, nicotinic acid, or derivatives of such compound or salts thereof (for example, polyvalent metal salts, etc.) One of these compounds may be used alone or two or more of these compounds may be used together.

The treatment liquid in the exemplary embodiment of the invention may further include an aqueous solvent (for example, water) in addition to the acidic compound described above.

The content of the acidic compound in the treatment liquid is, preferably, from 5% by mass to 95% by mass and, more preferably, from 10% by mass to 80% by mass based on the entire mass of the treatment liquid from the viewpoint of aggregation effect.

Preferred examples of the treatment liquid that may improve the high speed aggregation property include a treatment liquid including a polyvalent metal salt or a polyallyl amine. Examples of the polyvalent metal salt and a polyallyl amine include salts of alkaline earth metals belonging to group 2 of the periodic table (for example, magnesium and calcium), salts of a transition metal belonging to group 3 of the periodic table (for example, lanthanum), salts of a cation of a metal belonging to group 13 of the periodic table (for example, aluminum), salts of a lanthanide (for example, neodium), polyallylamine and polyallylamine derivatives. As the metal salts, carboxylic acid salts (such as, salts of formic acid, salts of acetic acid, and salts of benzoic acid), nitric acid salts, chlorides, and thiocyanic acid salts are preferred, and calcium salts or magnesium salt of a carboxylic acid (such as salts of formic acid, salts of acetic acid, and salts of benzoic acid), calcium salt of nitric acid or magnesium salt of nitric acid, calcium chloride, magnesium chloride, and calcium salt of thiocyanic acid or magnesium salt of thiocyanic acid are more preferred.

The content of the metal salt in the treatment liquid is preferably from 1% by mass to 10% by mass, more preferably, from 1.5% by mass to 7% by mass and, further preferably, from 2% by mass to 6% by mass.

The viscosity of the treatment liquid is, preferably, in a range from 1 mPa·s to 30 mPa·s, more preferably, in a range from 1 mPa·s to 20 mPa·s, further preferably, in a range from 2 mPa·s to 15 mPa·s, and, particularly preferably, in a range from 2 mPa·s to 10 mPa·s from the viewpoint of the aggregation rate of the ink composition. The viscosity is measured by using VISCOMETER TV-22 (trade name, manufactured by TOKI SANGYO CO., LTD.) under the condition at 20° C.

The surface tension of the treatment liquid is, preferably, from 20 mN/m to 60 mN/m, more preferably, from 20 mN/m to 45 mN/m and, further preferably, from 25 mN/m to 40 mN/m from the viewpoint of the aggregation rate of the ink composition. The surface tension is measured by using Automatic Surface Tensiometer CBVP-Z (trade name, manufactured by Kyowa Interface Science Co. Ltd.) under the condition of being at 25° C.

EXAMPLES

Hereinafter, the present invention will be specifically described with respect to Examples, but the present invention is not limited to these Examples unless exceeds the subject matter of the invention. Unless stated otherwise, the "parts" and "%" are based on mass.

The weight average molecular weight was measured by using a gel permeation chromatography (GPC). HLC-8220 GPC (trade name, manufactured by Tosoh Corp.) was used for the GPC, and TSKgeL SuperHZM-H, TSKgeL SuperHZ4000, and TSKgeL SuperHZ2000 (trade names, all manufactured by Tosoh Corp.) were used as the columns and were connected in a series of three. The eluent liquid was THF (tetrahydrofuran). For the conditions, the sample concentration was 0.35% by mass, the flow rate was 0.35 ml/min, the amount of sample injection was 10 μl, the measurement temperature was 40° C., and an RI detector was used. A calibration curve was produced from 8 samples of the 2 standard sample TSK standard, polystyrene": "F-40", "F-20", "F-4", "F-1", "A-5000", "A-2500", "A-1000" and "n-propylbenzene" (trade names) manufactured by Tosoh Corp.

Example 1

Preparation of Ink Composition>

—Synthesis of Resin Dispersant P-1—

88 g of methyl ethyl ketone was added to a 1000-mL three-necked flask equipped with an agitator and a cooling tube, and was heated to 72° C. under a nitrogen atmosphere. To this, a solution of 0.85 g of dimethyl-2,2'-azobisisobutyrate, 50 g of phenoxyethyl methacrylate, 11 g of methacrylic acid and 39 g of methyl methacrylate dissolved in 50 g of methyl ethyl ketone was added dropwise over 3 hours. After the addition was completed, the mixture was reacted for one more hour, and then a solution of 0.42 g of dimethyl-2, 2'-azobisisobutyrate dissolved in 2 g of methyl ethyl ketone was added. The temperature was raised to 78° C., and the mixture was heated for 4 hours. Methyl ethyl ketone (MEK) was added to the obtained reaction solution to obtain 36.8% MEK solution of a phenoxyethyl methacrylate/methyl methacrylate/methacrylic acid copolymer (copolymerization ratio by mass percent=50/39/11) (resin dispersant P-1).

The composition of the obtained resin dispersant P-1 was confirmed by $^1$H-NMR, and the weight average molecular weight (Mw) determined by GPC was 49,400. The acid value of the copolymer was determined by the method described in JIS Standards (JIS K0070: 1992), and the value was 71.7 mgKOH/g. The measured Tg of the copolymer (resin dispersant P-1) was 94° C.

—Synthesis of resin dispersant P-2—

240 g of methyl ethyl ketone, 30 g of a mixture of N-(4-vinylbenzyl)-10H-acridin-9-one and N-(3-vinylbenzyl)-10H-acridin-9-one (mixture mass ratio 1 to 1), 20 g of methacrylic acid and 150 g of ethyl methacrylate were added to a 1000-mL three-necked flask equipped with an agitator and a cooling tube, and heated to 75° C. under a nitrogen atmosphere. To this, a solution of 2.44 g of dimethyl-2,2'-azobisisobutyrate dissolved in 16 g of methyl ethyl ketone, was added. The mixture was reacted with stirring while maintaining the temperature of 75° C. for two hours, followed by an addition of a solution of 1.0 g of dimethyl-2,2'-azobisisobutyrate dissolved in 2.0 g of methyl ethyl ketone and further reaction for two hours. To the mixture, a solution of 1.0 g of dimethyl-2,2'-azobisisobutyrate dissolved in 2.0 g of methyl ethyl ketone was added. The temperature of the mixture was raised to 80° C., and the mixture was heated for 4 hours. Methyl ethyl ketone (MEK) was added to the obtained reaction solution to obtain MEK solution of a mixture of N-(4-vinylbenzyl)-10H-acridin-9-one and N-(3-vinylbenzyl)-10H-acridin-9-one (mixture mass ratio 1 to 1)/ethyl methacrylate/methacrylic acid copolymer (copolymerization ratio by mass percent=15/75/10) (resin dispersant P-2).

The measured Tg of the copolymer (resin dispersant P-2) was 124° C. A content of a non-volatile component in the obtain MEK solution of the copolymer (resin dispersant P-2) was measured by weighing after drying a part of the obtain MEK solution by heating under reduced pressure. The value was 36.8% by weight. The composition of the obtained resin dispersant P-2 was confirmed by $^1$H-NMR, and the weight average molecular weight (Mw) determined by GPC was 44,200. The acid value of the copolymer was determined by the method described in JIS Standards (JIS K0070: 1992), and the value was 65.2 mgKOH/g.

—Production of Self-Dispersing Polymer Particles B-01—

560.0 g of methyl ethyl ketone was introduced into a two litter three-necked flask equipped with an agitator, a thermometer, a reflux cooling tube and a nitrogen gas inlet tube, and the temperature was increased to 87° C. under a nitrogen atmosphere. While maintaining a condition of reflux in the reaction vessel (until finishing the reaction), a mixed solution formed from 220.4 g of methyl methacrylate (MMA), 301.6 g of isobornyl methacrylate (IBOMA), 58.0 g of methacrylic acid (MAA), 108 g of methyl ethyl ketone and 2.32 g of "V-601" (trade name, manufactured by Wako Pure Chemical Industries, Ltd.) was added dropwise at a constant rate so that dropping would be completed in 2 hours. After stirring the reaction mixture for one hour after the addition was completed, a solution formed from 1.16 g of "V-601" and 6.4 g of methyl ethyl ketone was added, and the mixture was stirred for 2 hours (referred as a reaction step (1)). The reaction step (1) was repeated four times and then a solution formed from 1.16 g of "V-601" and 6.4 g of methyl ethyl ketone was further added, and the mixture was stirred for 3 hours. The temperature was lowered to 65° C. after performing the polymerization reaction, and 163 g of isopropanol was added. The reaction mixture was rendered to cool in the atmosphere.

The weight average molecular weight (Mw) of the obtained copolymer was 63,000, and the acid value was 65.1 (mg KOH/g).

Next, 317.3 g of the polymerized solution (solid content 41.0%) was weighed, and 46.4 g of isopropanol, 1.65 g of a 20% aqueous solution of maleic anhydride (which is correspond to 0.3% by weight as maleic acid to the amount of the copolymer) and 40.77 g of a 2 mol/L aqueous NaOH solution were added. The temperature in the reaction vessel was increased to 70° C. Subsequently, 380 g of distilled water was added dropwise at a rate of 10 mL/min to achieve dispersion in water (dispersion step). Subsequently, 287.0 g of the solvent including isopropanol, methyl ethyl ketone and water was distilled off under the reduced pressure, while holding for 1.5 hours at a temperature of 70° C. in the reactive vessel (solvent removing step). Then, 0.278 g of PROXEL GXL(S) (trade name, manufactured by Arch Chemicals Japan Inc.) (which corresponds 440 ppm as benzoisothiazoline to a solid of the copolymer) was added. Then the resulting liquid was filtered with a filter having a pore diameter of 1 μm to obtain a dispersion of a self-dispersing polymer particle (B-01) at a solids concentration of 26.5%. The obtained self-dispersing polymer particle was diluted with ion exchanged water to obtain aqueous dispersion of 25.0% concentration for measurement of physical properties. The obtained values for the physical properties were followings. a pH; 7.8, electric(al) conductivity; 461 mS/m, viscosity; 14.8 mPa·s, and volume average particle diameter; 2.8 nm.

<Measurement of Glass Transition Temperature Tg>

The glass transition temperature of the obtained polymer (particles B-01) was measured by the following method, and was 160° C.

The polymer solution after polymerization in an amount of 0.5 g in terms of solid fraction was dried under reduced pressure at 50° C. for 4 hours to obtain a polymer solid fraction. The obtained polymer solid fraction was used to measure Tg by a differential scanning calorimeter (DSC) EXSTAR6220 (trade name) manufactured by SII Nanotechnology, Inc. The measurement conditions were such that 5 mg of a sample was sealed in an aluminum pan, and the value of the peak top of DDSC from the measurement data obtained at the time of second temperature increase in the following temperature profile under a nitrogen atmosphere, was designated as Tg.

from 30° C. to −50° C. (cooled at 50° C./min)
from −50° C. to 120° C. (heated at 20° C./min)
from 120° C. to −50° C. (cooled at 50° C./min)
from −50° C. to 120° C. (heated at 20° C./min)

<Measurement of Volume Average Particle Diameter (Mv)>

An aqueous dispersion of the resultant self-dispersible polymer particle was arbitrarily diluted to the concentration (loading index of the range of 0.1 to 10) suitable for measurement, the volume average particle diameter of all aqueous dispersions was measured under same measurement conditions by a dynamic light scattering method, using an ULTRA FINE PARTICLE DIAMETER DISTRIBUTION MEASURER NANOTRACK UPA-EX150 (trade name, manufactured by Nikkiso Co., Ltd.). That is to say, it was measured under the following conditions: particle permeability of transmission, particle refractive index of 1.51, particle shape of nonsphere, density of 1.2 g/cm$^3$, water as the solvent, cell temperature of 18° C. to 25° C.

~Production of Dispersion of Resin-Coated Pigment Particle~

(Production of Cyan Pigment Dispersion C)

100 g of Pigment Blue 15:3 (phthalocyanine blue A 220 wet cake (pigment solid content 33.5%), made from Dainichiseika Color & Chemicals Mfg. Co., Ltd.) as pigment solid content, 45 g of the phenoxy ethyl methacrylate/methyl methacrylate/methacrylic acid copolymer (resin dispersant P-1) as the solid content, 140 g of methyl ethyl ketone, 50.6 g of 1 mol/L aqueous sodium hydroxide solution (degree of neutralization with respect to the methacrylic acid: 88 mol %) as a pH adjuster, 331 g of ion exchanged water is dispersed with disperser in advance as a pigment, a further eight-pass process was performed by a disperser (trade name; MICROFLUIDIZER M-140K, manufactured by Microfluidic™ Corporation, 150 MPa).

Subsequently, methyl ethyl ketone in the resultant dispersion was removed under reduced pressure at 56° C., a further 1 part of water was removed, a centrifugal treatment was performed at 8,000 rpm for 30 minutes by a 50 mL centrifugal tube, using HIGH SPEED CENTRIFUGAL COOLER 7550

(trade name, manufactured by Hisamitsu Pharmaceutical Co., Inc.), the supernatant solution, other than the precipitates, was collected.

Subsequently, the resultant dispersion (supernatant liquid) was heated to 70° C. for 4 hours, and then 80 ppm of 2-methyl-4-isothiazolin-3-on, 40 ppm of 5-chloro-2-methyl-isothiazolin-3-on, 10 ppm of 2-bromo-2-nitropropan-1,3-diol, 30 ppm of 4,4-dimethyloxazolidine, 80 ppm of 1,2-benzisothiazolin-3-on, and 30 ppm of 2-n-octyl-4-isothiazolin-3-on as an antiseptic agent were added thereto, followed by filtration, and the filtrate was collected. The pigment concentration was calculated from the absorption spectrum, a pigment concentration of 15% resin-coated pigment particle dispersion (cyan pigment dispersion C) was obtained. The dispersion was pH 8.5 and viscosity of 2.9 mPa·s.

<Measurement of Particle Diameter of Resin-Coated Pigment Particle>

With respect to the resultant resin-coated pigment particle dispersion, the volume average particle diameter was measured by a dynamic light scattering method, using PARTICLE DIAMETER DISTRIBUTION MEASURER NANOTRACK UPA-EX150 (trade name, manufactured by Nikkiso Co., Ltd.). Measurement was performed by adding 10 mL of the ion exchange water to 10 μL of the resin-coated pigment particle dispersion to produce a measurement sample liquid, followed by adjusting the temperature to 25° C. As a measurement result, volume average particle diameter of the resin-coated pigment particle was 88 nm.

(Production of Magenta Pigment Dispersion M)

100 g of Pigment Red 122 (CROMOPHTAL JET MAGENTA DMQ; trade name, manufactured by Chiba specialty corporation; Magenta pigment), 30 g of the resin dispersant P-2 as the solid content, 133 g of methyl ethyl ketone, 27.2 g of 1 mol/L aqueous NaOH solution (degree of neutralization with respect to the methacrylic acid: 78 mol %), and 424 g of ion exchanged water were mixed, further dispersed by disperser mixing in advance, and a 10-pass process was performed by a disperser (MICROFLUIDIZER M-140K; trade name, 150 MPa).

Subsequently, the same operation as performed for the cyan pigment dispersion C was performed to obtain a pigment concentration of 15% resin-coated pigment particle dispersion (Magenta pigment dispersion M). Further, the volume average particle diameter, pH, and viscosity of the resultant dispersion using the same method as described above were measured to have a diameter of 76 nm, pH 8.6, and viscosity of 2.8 mPa·s.

~Preparation of Ink~

(Preparation of Cyan Ink)

Each component was mixed so as to have the ink composition described below, using cyan pigment dispersion C as obtained above and a self-dispersible polymer particle B-01. The resultant was charged by a disposable syringe made of a plastic. The resultant was filtrated with PVDF 5 μm filter (trade name; MILLEX-SV, diameter of 25 nm, manufactured by Millipore corporation) to produce cyan ink (ink composition for inkjet) C-01.

<Composition of Cyan Ink>
Cyan pigment (Pigment Blue 15:3) 2.5%
The resin dispersant P-1 (solid content) 1.125%
The self-dispersible polymer particle B-01 (solid content) 8.5%
Colloidal silica (solid content) 0.05%
(trade name; SNOWTEX XS, volume average particle diameter: 4 to 6 nm, manufactured by Nissan Chemical Industries, Ltd.)
SUNNIX GP 250 8%
(trade name, manufactured by Sanyo Chemical Industries, Ltd., hydrophilic organic solvent, I/O value 1.30)
Tripropylene glycol monomethyl ether (TPGmME) 8%
(trade name; MFTG, manufactured by Nippon Nyukazai Co., Ltd., hydrophilic organic solvent, I/O value 0.80)
Urea (manufactured by Nissan Chemical Industries, Ltd., solid wetting agent) 5%
NEWPOLE PE-108 (trade name, manufactured by Sanyo Chemical Industries, Ltd., thickening agent) 0.15%
OLFINE E1010 (trade name, manufactured by Nissin Chemical Industry Co., Ltd., surfactant) 1%
Ion exchanged water remainder (up to the total amount of 100%)

(Preparation of Magenta Ink)

Magent ink (ink composition for inkjet) M-01 was prepared in a manner substantially same as that in preparation of the cyan ink C-01 except that each component was mixed so as to have the ink composition described below, using the magenta pigment dispersion M as obtained above and a resin dispersant P-2.

<Composition of Magenta Ink>
Magenta pigment (Pigment Red 122) 5.0%
The resin dispersant P-2 (solid content) 1.5%
The self-dispersible polymer particle B-01 (solid content) 7.25%
SUNNIX GP 250 10%
(trade name, manufactured by Sanyo Chemical Industries, Ltd., hydrophilic organic solvent, I/O value 1.30)
Tripropylene glycol monomethyl ether (TPGmME) 6%
(trade name; MFTG, manufactured by Nippon Nyukazai Co., Ltd., hydrophilic organic solvent, I/O value 0.80)
Urea (manufactured by Nissan Chemical Industries, Ltd., solid wetting agent) 5%
NEWPOLE PE-108 (trade name, manufactured by Sanyo Chemical Industries, Ltd., thickening agent) 0.05%
OLFINE E1010 (trade name, manufactured by Nissin Chemical Industry Co., Ltd., surfactant) 1%
Ion exchanged water remainder (up to the total amount of 100%)

Preparation of Treatment Liquid

Each component was mixed so as to have the composition described below to prepare the treatment liquid T-1. The viscosity and surface tension of the obtained treatment liquid was measured by the same method as described above to have a viscosity of 2.3 mPa·s, surface tension of 42.5 mN/m, and pH 1.0.

<Composition>
malonic acid (manufactured by Tateyama Kasei Co., Ltd.) 11.3%
DL-malic acid (manufactured by Fuso Chemical Co., Ltd.) 14.5%
Diethylene glycol monobutyl ether 4%
(trade name; BDG, manufactured by Nippon Nyukazai Co., Ltd.)
Tripropylene glycol monomethyl ether 4%
(trade name; MFTG, manufactured by Nippon Nyukazai Co., Ltd.)
Ion exchanged water 66.2%<

<Image Forming and Evaluation>
~Image Forming~

An Inkjet head 1 constituted as shown in FIGS. 6 to 8 and with the silicon nozzle plate was prepared, and the magenta ink as obtained above was charged to the connected storage tank thereto. The silicon nozzle plate is formed of single crystal silicon, and a silicon oxide film ($SiO_2$ film) is formed on the surface thereof at a side toward the ink ejection direction of the nozzle by a CVD method by introducing $SiCl_4$ and water vapor to a chemical vapor deposition (CVD) reactor. The thickness of $SiO_2$ film is 50 nm. Further, after performing an oxygen plasma process, chemical vapor deposition (CVD) was performed using $C_8F_{17}C_2H_4SiCl_3$, and the liquid repellent film was formed on $SiO_2$ film. The liquid repellent film was formed by introducing $C_8F_{17}C_2H_4SiCl_3$ and water vapor at the low pressure into CVD reactor. The thickness of the liquid repellent film is 10 nm. Further, plural nozzles as shown in FIGS. 2 to 4 are arranged two-dimensionally in a matrix form in the silicon nozzle plate, and ink droplets can be ejected with high precision as shown in FIG. 5. As a recording medium, TOKUBISHI ART BOTH FACES N (trade name, manufactured by Mitsubishi Paper Mills, Ltd.) was prepared.

The recording medium was fixed on a transferable stage in the predetermined straight line direction at 500 mm/second, stage temperature was held at 30° C., the treatment liquid as obtained above was coated at a thickness of about 1.2 µm with a bar coater, followed by drying at 50° C. for 2 seconds immediately after coating. The prepared inkjet head was fixed and disposed such that the line direction (w, 310, 320, 330, 340 etc. in FIG. 5) where nozzle was aligned to an inclination of 75.7° (90°-α in FIGS. 2 and 5) with respect to the direction (principal scanning direction) orthogonal to the movement direction (sub-scanning direction) of the stage. While the recording medium was moved at the constant speed in the sub-scanning direction, ink was ejected linearly under conditions of an ink droplet volume of 6.0 pL, ejection frequency of 25.7 kHz, resolution of 1200 dpi×1200 dpi, and an image was recorded which contained a 50% solid image with an area of 2 square cm, a 4 to 8 pt image of the character of 轟 (TODOROKI)", and a 4 pt image of the character of 轟 (TODOROKI)" as a white letter on a solid image.

Immediately after recording, the image was passed between a pair of fixing rollers, which were dried at 60° C. for 3 seconds and at the 60° C., and fixing process was performed at a NIP pressure of 0.25 MPa and a NIP width of 4 mm to obtain an evaluation sample.

~Image Evaluation~

—1. Resolution of Image—

Among image of the resultant evaluation sample, the resolution was evaluated according to evaluation criteria described below by visual observation with respect to a 4 to 8 pt image of the character of 轟 (TODOROKI)" and a 4 pt image of the character of 轟 (TODOROKI)" as a white letter on a solid image. The evaluation results are shown in Table 2 below.

<Evaluation Criteria>
AA: Resolution is good for a 4 pt character, and the resolution is at a level having no problems in practical application.
A: The decrease in resolution was recognized at a part of the 4 pt characters, but the resolution is at a level having no problems in practical application.
B: The decrease in resolution is recognized even in characters larger than 4 pt and the resolution was at a level having low practicality.
C: The character is lost and the decrease in resolution was prominent, and the resolution was at a level having extremely low practicality.

—2. Image Density—

The density of the image section of the obtained evaluation sample was measured using Reflection Densitometer (trade name; XRITE 938, manufactured by X-rite corporation) and was evaluated by the evaluation criteria described below. The evaluation results are shown in Table 2 below.

<Evaluation Criteria>
AA: Sufficient density is obtained, and the density is of an extremely good level.
A: Density is obtained, and the density is of a good level.
B: Practical application presents no problem at this level.
C: Density is reduced, and the density is at a level having low practicality.
D: Density is highly reduced and the density is at a level having very low practicality.

—3. Ink Ejection Property—

Ejection ratio was measured by conditions below and image unevenness was observed visually and was evaluated using the evaluation criteria below.
(1) ejection ratio [%] after continuous ejection test for 60 minutes
(2) ejection ratio [%] after stopping for 30 minutes after ejection for 1 minute <Evaluation Criteria>
AA: (1) and (2) are 99% or more, and image unevenness is not recognized at all.
A: (1) and (2) are 95% or more, and there are no practical issues with image unevenness.
B: (1) and (2) are 90% or more, and image unevenness is recognized, but there are no practical issues.
C: (1) and (2) are 80% or more, and image unevenness can be clearly recognized, but is of a low level causing practical problems.
D: (1) and (2) are less than 80%, image unevenness is conspicuous, and practicality is of a very low level.

<Ejection Ratio>
Ejection ratio was calculated by Formula below

Ejection ratio [%]=(number of nozzles capable of ejecting under the conditions)/(total number of nozzles)×b 100.

—4. Head Reliability—

The inkjet head was continuously ejected at 25.7 kHz for 6000 hundred million times, and then image is recorded, and line image of 75×2400 dpi was drawn at an ejection frequency of 25.7 kHz using 96 nozzles. With respect to the line image, the center value of the line was measured using a DOT ANALYZER DA-6000, trade name, manufactured by Oji Scientific Instruments Co., Ltd., and a standard deviation σ of misalignment of each line was calculated. The evaluation results are shown in Table 2 below.

<Evaluation Criteria>

| | |
|---|---|
| σ<2 µm | AA: |
| 2 µm≦σ≦3 µm | A: |
| 3 µm≦σ≦5 µm | B: |
| 5 µm≦σ<7 µm | C: |
| 7 µm≦σ | D: |

—5. State of Liquid Repellent Film—

The ink-jet head was continuously ejected at 25.7 kHz six hundred billion times, and then an image was recorded, the state of the film (liquid repellent film) formed by using $C_8F_{17}C_2H_4SiCl_3$ around 2048 nozzle holes was observed by an optical microscope, and change in the film formed by using $C_8F_{17}C_2H_4SiCl_3$ was evaluated according to evaluation criteria below. The evaluation results are shown in Table 2 below.

<Evaluation Criteria>

AA: The state of the liquid repellent film around all the nozzle holes is good
A: The number of the nozzle around which the state of the liquid repellent film is changed is less than 5
B: The number of the nozzle around which the state of the liquid repellent film is changed is 5 or more and less than 10.
C: The number of the nozzle around which the state of the liquid repellent film is changed is 10 or more and less than 20.
D: The number of the nozzle around which the state of the liquid repellent film is changed is 20 or more.

Example 2

An image was recorded and evaluated in substantially the same manner as that in Example 1, except that the amount of colloidal silica used in the preparation of the ink in Example 1 was changed from 0.05% by mass to 1% by mass with respect to the total mass of the ink composition. The evaluation results are shown in Table 2 below.

Example 3

An image was recorded and evaluated in a manner substantially same as that in Example 1 except that the inkjet head 1 in Example 1 was replaced with the inkjet head 2 of configuration which have a silicon nozzle plate but did not have a rear flow path, that is to say, a configuration where the common liquid chamber was disposed on the same side as the pressure chamber. Plural nozzles were provided in the silicon nozzle plate as shown in FIGS. 2 to 4, and ink droplets with high precision can be ejected as shown in FIG. 5. Further, the silicon nozzle plate was formed of single crystal silicon as similar to that in Example 1, and silicon oxide film ($SiO_2$ film) was formed on the surface of the single crystal silicon at a side toward the ink ejection direction of the nozzle by an oxidization treatment. Further, a film obtained by using $C_8F_{17}C_2H_4SiCl_3$ was formed on the $SiO_2$ film. The evaluation results are shown in Table 2 below.

Example 4

An image was recorded and evaluated in a manner substantially same as that in Example 1 except a self-dispersible polymer particle dispersion B-01 used in ink production in Example 1 was replaced with a polymer particle dispersion C obtained by an emulsion polymerization process as described below. The evaluation results are shown in Table 2 below.
Production of Polymer Particle Dispersion C
To a 1 L three-necked flask equipped with stirrer and reflux condenser were placed 8.1 g of PIONIN A-43s (trade name, manufactured by Takemoto Oil & Fat Co., Ltd., emulsifier) and 236.0 g of distilled water, followed by heat and stirring at 70° C. under nitrogen gas flow. 6.2 g of styrene, 3.5 g of n-butyl acrylate, 0.3 g of acrylic acid, 1.0 g of ammonium persulfate, and 40 g of distilled water were added thereto, and after stirring for 30 minutes, dropwise addition was performed at a steady speed such that this dropwise addition of a monomer solution consisting of 117.8 g of styrene, 66.5 g of n-butyl acrylate and 5.7 g of acrylic acid completes in 2 hours. After completion of the dropwise addition, a water solution consisting of 0.5 g of ammonium persulfate and 20 g of distilled water was added thereto, followed by stirring at 70° C. for 4 hours, and then the temperature was raised to 85° C. and was stirred for 2 hours. A reaction solution was cooled down, and neutralization degree was neutralized to be 0.5 using 2 mol/L aqueous NaOH solution. Through successive filtration, a polymer particle BH-1 dispersion was obtained represented by the structure below. The physical properties of the obtained polymer particle have weight-average molecular weight of 232,000, acid value of 23 mgKOH/g, and volume average particle diameter of 70 nm.

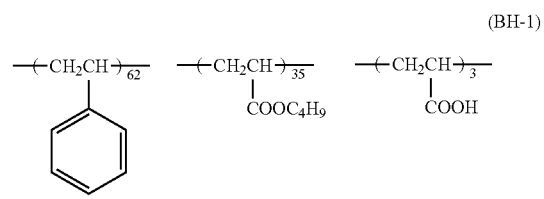

Example 5

An image was recorded and evaluated in a manner substantially same as that in Example 4 except that the inkjet head 1 in Example 4 was replaced with the inkjet head 2 of configuration which had a silicon nozzle plate but did not have a rear flow path, that is to say, a configuration where the common liquid chamber was disposed on the same side as the pressure chamber. Plural nozzles were provided in the silicon nozzle plate as shown in FIGS. 2 to 4, and ink droplets could be ejected with high precision as shown in FIG. 5. Further, the silicon nozzle plate was formed of single crystal silicon as similar to that in Example 1, and silicon oxide film ($SiO_2$ film) was formed on the surface of the single crystal silicon at a side toward the ink ejection direction of the nozzle by an oxidization treatment. Further, a film obtained by using $C_8F_{17}C_2H_4SiCl_3$ was formed on the $SiO_2$ film. The evaluation results are shown in Table 2 below.

Comparative Example 1

An image was recorded and evaluated in a manner substantially same as that in Example 1 except that colloidal silica used in the ink production in Example 1 was not contained. The evaluation results are shown in Table 2 below.

Comparative Example 2

An image was recorded and evaluated in a manner substantially same as that in Comparative Example 1 except that the inkjet head 1 in Comparative Example 1 was replaced with the inkjet head 2 of configuration which had a silicon nozzle plate but did not have a rear flow path, that is to say, a configuration where the common liquid chamber was disposed on the same side as the pressure chamber. Plural nozzles were provided in the silicon nozzle plate as shown in FIGS. 2 to 4, and ink droplets could be ejected with high precision as shown in FIG. 5. Further, the silicon nozzle plate was formed of single crystal silicon, as similar to that in Example 1, and silicon oxide film ($SiO_2$ film) was formed on the surface of the single crystal silicon at a side toward the ink ejection direction of the nozzle by an oxidization treatment. Further, a film obtained by using $C_8F_{17}C_2H_4SiCl_3$ was formed on the $SiO_2$ film. The evaluation results are shown in Table 2 below.

Comparative Example 3

An image was recorded and evaluated in substantially the same manner as that in Example 1 except that the ink jet head 1 in Example 1 was replaced with the comparative head 3 which is constituted by having a silicon nozzle plate and does not have a rear flow path, that is to say, constituted with the common liquid chamber disposed at the same side as the pressure chamber, and having a silicon nozzle plate with a plating layer containing a fluorocarbon-based polymer formed by a eutectoid plating process.

Plural nozzles are provided in the silicon nozzle plate as shown in FIGS. 2 to 4, and ink droplets can be ejected with high precision as shown in FIG. 5. Further, the silicon nozzle plate is formed of single crystal silicon, and the surface of the silicon nozzle plate at a side toward the ink ejection direction of the nozzle is oxidized to have an $SiO_2$ film, and a plating layer containing fluorocarbon-based polymer formed as described below is provided on the $SiO_2$ film. The evaluation results are shown in Table 2 below.

Formation of Plating Layer Containing Fluorocarbon-Based Polymer

The surface of $SiO_2$ film on the single crystal silicon was washed with an acid, and then, the single crystal silicon with the $SiO_2$ film was immersed in a liquid where a polytetrafluoroethylene particle (fluorocarbon-based polymer) is dispersed in a water solution containing nickel and cobalt as a matrix metal ion, the fluorocarbon-based polymer particle was adhered on the surface of the $SiO_2$ film on the single crystal silicon through the matrix metal ion to form a coated film. The coated film was heated at 350° C. to form a plating film.

Comparative Example 4

An image was recorded and evaluated in substantially the same manner as that in Example 4 except that the ink jet head 1 in Example 4 was replaced with the comparative head 3 which is constituted by having a silicon nozzle plate and does not have a rear flow path, that is to say, constituted with the common liquid chamber disposed at the same side as the pressure chamber, and having a silicon nozzle plate with a plating layer containing a fluorocarbon-based polymer formed by a eutectoid plating process.

Plural nozzles are provided in the silicon nozzle plate as shown in FIGS. 2 to 4, and ink droplets can be ejected with high precision as shown in FIG. 5. Further, the silicon nozzle plate is formed of single crystal silicon, and the surface of the silicon nozzle plate at a side toward the ink ejection direction of the nozzle is oxidized to have an $SiO_2$ film, and a plating layer containing a fluorocarbon-base polymer formed in substantially the same manner as that in Comparative Example 3 is formed on the $SiO_2$ film. The evaluation results are shown in Table 2 below.

Comparative Example 5

An image was recorded and evaluated in substantially the same manner as that in Comparative Example 1 except that the ink jet head 1 in Comparative Example 1 was replaced with the comparative head 3 which is constituted by having a silicon nozzle plate and does not have a rear flow path, that is to say, constituted with the common liquid chamber disposed at the same side as the pressure chamber, and having a silicon nozzle plate with a plating layer containing a fluorocarbon-based polymer formed by a eutectoid plating process in substantially the same manner as that in Comparative Example 3.

Plural nozzles are provided in the silicon nozzle plate as shown in FIGS. 2 to 4, and ink droplets can be ejected with high precision as shown in FIG. 5. Further, the silicon nozzle plate is formed of single crystal silicon, and the surface of the silicon nozzle plate at a side toward the ink ejection direction of the nozzle is oxidized to have $SiO_2$ film, and a plating layer containing the fluorocarbon-base polymer formed in substantially the same manner as that in Comparative Example 3 is provided on the $SiO_2$ film. The evaluation results are shown in Table 2 below.

Comparative Example 6

An image was recorded and evaluated in substantially the same manner as that in Example 1 except that the ink jet head 1 in Example 1 was replaced with the comparative head 4 which has a configuration which does not have a rear flow path, that is to say, a configuration where the common liquid chamber is disposed at the same side as the pressure chamber, where the nozzle plate is formed of a stainless steel alloy (SUS316L), and in which the nozzles are not arranged two-dimensionally in a matrix. Further, there is a plating layer containing a fluorocarbon-based polymer formed in substantially the same manner as that in Comparative Example 3 on the surface of the silicon nozzle plate at a side toward the ink ejection direction of the nozzle. In this regard, ejection conditions were changed to an ink droplet amount of 2.4 pL, an ejection frequency of 25.7 kHz, and a resolution of 300 dpi× 300 dpi to record the image. The evaluation results are shown in Table 2 below.

Comparative Example 7

An image was recorded and evaluated in substantially the same manner as that in Example 1 except that colloidal silica used in ink preparation in Comparative Example 6 was not contained. The evaluation results are shown in Table 2 below.

TABLE 1

| | Head 1 | Head 2 | Comparative Head 3 | Comparative Head 3 |
|---|---|---|---|---|
| Lquid Repellent Film | $C_8F_{17}C_2H_4SiCl_3$ | $C_8F_{17}C_2H_4SiCl_3$ | Polytetrafluoro-ethylene | Polytetrafluoro-ethylene |
| Forming Method of Lquid Repellent Film | Chemical Vapor Deposition | Chemical Vapor Deposition | Eutectoid Plating | Eutectoid Plating |
| Substrate of nozzle plate | Silicon | Silicon | Silicon | SUS |
| Protective film of nozzle plate | Silicon oxide | Silicon oxide | Silicon oxide | non |
| Piezoelectric body | disposed | disposed | disposed | disposed |
| Two-dimensional matrix form | arranged | arranged | non | non |
| Rear face flow path design | adopted | non | non | non |
| Resolution | 1200 dpi (single-pass) | 1200 dpi (single-pass) | 1200 dpi (single-pass) | 300 dpi (single-pass) |

TABLE 2

In Table 2, the abbreviation "Conternt*1" denotes "A content % by mass of the colloidal silica with respect to the total mass of the ink composition"; and the abbreviation "S.L.R.F*2" denotes "State of the liquid repellent film".

|  | Inkjet Head | Colloidal Silica Kind | Conternt*1 | Resin Particles | Evaluation Image Resolution | Image Density | Ejection Property | Head Reliability | S.L.R.F*2 |
|---|---|---|---|---|---|---|---|---|---|
| Example 1 | Head 1 | used | 0.05 | Self-dispersing Polymer | AA | AA | AA | AA | AA |
| Example 2 | Head 1 | used | 1 | Self-dispersing Polymer | AA | AA | B | AA | AA |
| Example 3 | Head 2 | used | 0.05 | Self-dispersing Polymer | A | A | A | AA | AA |
| Example 4 | Head 1 | used | 0.05 | Emulsion polymerized | A | AA | AA | AA | AA |
| Example 5 | Head 2 | used | 0.05 | Emulsion polymerized | B | B | A | AA | AA |
| Comparative Example 1 | Head 1 | non | 0 | Self-dispersing Polymer | AA | AA | AA | D | C |
| Comparative Example 2 | Head 2 | non | 0 | Self-dispersing Polymer | A | A | A | C | C |
| Comparative Example 3 | Comparative Head 3 | used | 0.05 | Self-dispersing Polymer | A | A | B | B | B |
| Comparative Example 4 | Comparative Head 3 | used | 0.05 | Emulsion polymerized | B | B | B | B | B |
| Comparative Example 4 | Comparative Head 3 | non | 0 | Self-dispersing Polymer | A | A | B | D | D |
| Comparative Example 6 | Comparative Head 4 | used | 0.05 | Self-dispersing Polymer | C | C | B | A | B |
| Comparative Example 7 | Comparative Head 4 | non | 0 | Self-dispersing Polymer | C | C | B | A | B |

As shown in Table 2, in Examples, the resolution and density of the image and the head performance were good and deterioration of the liquid repellent property of the liquid repellent film of the head plate was suppressed, images of higher precision could be formed stably, while in Comparative Examples 1, 2 and 5 not containing colloidal silica, deterioration of the liquid repellent property of the liquid repellent film was not suppressed, but the head reliability was reduced. Further, in Comparative Examples 6 to 7, the head material of the conventional nozzle plates not using silicon was SUS, and therefore head reliability was maintained, but the resolution of the nozzle arrangement itself was not increased and the resolution and density of the recorded image were insufficient.

Examples 6 to 10

An image was recorded and evaluated in substantially the same manner as that in Examples 1 to 5 respectively except that magenta ink used Examples 1 to 5 was changed to cyan ink individually.

As a result, in all Examples 6 to 10, deterioration of the head plate was suppressed in a manner substantially same as that in each of Examples 1 to 5, and higher precise images were stably formed.

Examples 11 to 15

An image was recorded and evaluated in substantially the same manner as that in Examples 1 to 5 respectively except that colloidal silica (trade name SNOWTEX XS) used in Examples 1 to 5 was replaced with sodium silicate individually.

As a result, deterioration of head plate was suppressed in a manner substantially same as that in each of Examples 1 to 5, and higher precise images were stably formed.

The invention provides an image forming method and an ink composition whereby deterioration of the liquid repellent property of the inkjet head member can be suppressed and higher precise images can be stably formed.

The foregoing description of the exemplary embodiments of the present invention has been provided for the purposes of illustration and description. It is not intended to be exhaustive or to limit the invention to the precise forms disclosed. The embodiments were chosen and described in order to best explain the principles of the invention and its practical applications, thereby enabling others skilled in the art to understand the invention for various embodiments and with the various modifications as are suited to the particular use contemplated.

All publications, patent applications, and technical standards mentioned in this specification are herein incorporated by reference to the same extent as if such individual publication, patent application, or technical standard was specifically and individually indicated to be incorporated by reference. It will be obvious to those having skill in the art that many changes may be made in the above-described details of the preferred embodiments of the present invention. It is intended that the scope of the invention be defined by the following claims and their equivalents.

What is claimed is:

1. An image forming method comprising ejecting an ink composition comprising an inorganic silicate compound from an inkjet head having a nozzle plate to form an image, the nozzle plate comprising a liquid repellent film, and the liquid repellent film comprising a fluoroalkylsilane moiety, wherein a content of the inorganic silicate compound in the ink composition is in a range of from 0.0005% by mass to 0.5% by mass with respect to a total mass of the ink composition.

2. The image forming method according to claim 1, wherein the liquid repellent film comprising a fluoroalkylsilane moiety is formed by using a compound represented by the following Formula (1):

$$C_nF_{2n+1}\text{—}C_mH_{2m}\text{—Si—}X_3 \qquad \text{Formula (1)}$$

wherein, in Formula (1), n represents an integer of 1 or more; m represents an integer of 0 or more; X represents an alkoxy group, an amino group, or a halogen atom; and a part of X may be substituted with an alkyl group.

3. The image forming method according to claim 2, wherein the liquid repellent film is formed by chemical vapor deposition.

4. The image forming method according to claim 2, wherein at least a part of the nozzle plate comprises silicon.

5. The image forming method according to claim 2, wherein the nozzle plate has plural ejection ports which eject the ink composition, the inkjet head further comprises plural pressure chambers respectively communicating with the plural ejection ports of the nozzle plate, plural ink supply flow paths respectively supplying the ink composition to the plural pressure chambers, a common liquid chamber supplying the ink composition to the plural ink supply flow paths, and plural pressure generation units respectively deforming the plural pressure chambers, and an amount of change in volume within each pressure chamber is controlled by driving the respective pressure generation unit to eject the ink composition.

6. The image forming method according to claim 5, wherein the pressure generation units are piezo elements.

7. The image forming method according to claim 5, wherein the plural ejection ports are arranged two-dimensionally in a matrix form.

8. The image forming method according to claim 5, wherein the inkjet head further comprises electrical wiring which is arranged so as to penetrate the common liquid chamber and supplies driving signals to the pressure generation units.

9. The image forming method according to claim 8, wherein the pressure generation units are disposed on the opposite side of the pressure chamber from a side thereof where the nozzle plate is arranged, and the common liquid chamber is disposed on the opposite side of the pressure generation units from a side thereof where the pressure chambers are arranged.

10. The image forming method according to claim 2, wherein the ink composition further comprises a pigment, a water-soluble organic solvent, and resin particles.

11. The image forming method according to claim 10, wherein the resin particles are self-dispersing polymer particles.

12. The image forming method according to claim 2, wherein the inorganic silicate compound is colloidal silica.

13. An ink composition comprising an inorganic silicate compound and being used for the image forming method according to claim 2.

* * * * *